(12) United States Patent  (10) Patent No.: US 7,211,131 B2
Banning et al.  (45) Date of Patent: May 1, 2007

(54) PHASE CHANGE INKS

(75) Inventors: Jeffrey H. Banning, Hillsboro, OR (US); Wolfgang G. Wedler, Tualatin, OR (US); C. Wayne Jaeger, Beaverton, OR (US)

(73) Assignee: Xerox Corporation, Stamford, CT (US)

( * ) Notice: Subject to any disclaimer, the term of this patent is extended or adjusted under 35 U.S.C. 154(b) by 502 days.

(21) Appl. No.: 10/918,619

(22) Filed: Aug. 13, 2004

(65) Prior Publication Data

US 2006/0032397 A1  Feb. 16, 2006

(51) Int. Cl.
*C09D 11/00* (2006.01)
(52) U.S. Cl. .................. 106/31.29; 106/31.61
(58) Field of Classification Search ............ 106/31.29, 106/31.61
See application file for complete search history.

(56) References Cited

U.S. PATENT DOCUMENTS

| | | | |
|---|---|---|---|
| 2,644,821 A | 7/1953 | Peter et al. ............... | 260/278 |
| 3,653,932 A | 4/1972 | Berry et al. ............... | 106/22 |
| 3,734,934 A | 5/1973 | Kolliker et al. ........... | 260/376 |
| 4,316,918 A | 2/1982 | Bunes et al. | |
| 4,386,206 A | 5/1983 | Wingard, Jr. et al. ..... | 546/76 |
| 4,390,369 A | 6/1983 | Merritt et al. ............. | 106/31 |
| 4,446,470 A | 5/1984 | Sugiyama et al. | |
| 4,484,948 A | 11/1984 | Merritt et al. ............. | 106/31 |
| 4,684,956 A | 8/1987 | Ball ........................ | 346/1.1 |
| 4,745,174 A | 5/1988 | Pruett et al. .............. | 528/289 |
| 4,851,045 A | 7/1989 | Taniguchi ................. | 106/31 |
| 4,889,560 A | 12/1989 | Jaeger et al. ............. | 106/27 |

(Continued)

FOREIGN PATENT DOCUMENTS

BR  PI01035819  3/2002

(Continued)

OTHER PUBLICATIONS

Copending U.S. Appl. No. 10/902,594, filed Jul. 29, 2004, entitled "Colorant Compounds," with the named inventors Jeffery H. Banning, Wolfgang.

(Continued)

*Primary Examiner*—J. A. Lorengo
*Assistant Examiner*—Veronica Faison-Gee
(74) *Attorney, Agent, or Firm*—Judith L. Byorick

(57) ABSTRACT

Phase change inks comprising a phase change ink carrier and a colorant compound of the formula

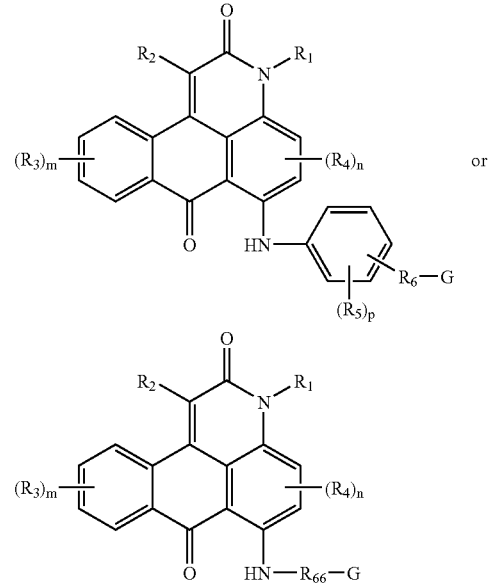

wherein $R_1$, $R_2$, $R_3$, $R_4$, $R_5$, m, n, and p are as defined herein, $R_6$ is a direct bond, an alkylene group, an arylene group, an arylalkylene group, or an alkylarylene group, $R_{66}$ is an alkylene group, an arylene group, an arylalkylene group, or an alkylarylene group, G is a hydroxy group, a carboxylic acid group, an alkyl group having at least about 8 carbon atoms, an aryl group, an arylalkyl group having at least about 14 carbon atoms, an alkylaryl group having at least about 14 carbon atoms, a group of the formula

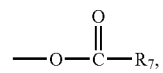

a group of the formula

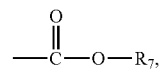

a group of the formula

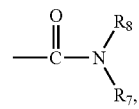

or a group of the formula

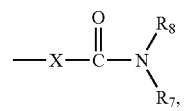

X is —O— or —$NR_9$—, and $R_7$, $R_8$, and $R_9$ are as defined herein.

120 Claims, No Drawings

U.S. PATENT DOCUMENTS

| | | | |
|---|---|---|---|
| 4,889,761 A | 12/1989 | Titterington et al. | 428/195 |
| 5,006,170 A | 4/1991 | Schwarz et al. | 106/20 |
| 5,151,120 A | 9/1992 | You et al. | 106/27 |
| 5,221,335 A | 6/1993 | Williams et al. | 106/23 A |
| 5,340,910 A | 8/1994 | Chamberlin et al. | 528/289 |
| 5,372,852 A | 12/1994 | Titterington et al. | 427/288 |
| 5,496,879 A | 3/1996 | Griebel et al. | 524/320 |
| 5,507,864 A | 4/1996 | Jaeger et al. | 106/22 A |
| 5,621,022 A | 4/1997 | Jaeger et al. | 523/161 |
| 5,902,841 A | 5/1999 | Jaeger et al. | 523/161 |
| 6,159,969 A | 12/2000 | Matsumoto et al. | 514/235.8 |
| 6,174,937 B1 | 1/2001 | Banning et al. | 523/160 |
| 6,235,094 B1 | 5/2001 | Banning et al. | 106/31.29 |
| 6,395,078 B1 | 5/2002 | Jaeger | 106/31.44 |
| 6,422,695 B1 | 7/2002 | Jaeger | 347/88 |
| 2004/0077887 A1 | 4/2004 | Banning et al. | 552/237 |
| 2004/0082801 A1 | 4/2004 | Jaeger et al. | 552/225 |
| 2004/0102540 A1 | 5/2004 | Jaeger et al. | 523/160 |
| 2004/0106782 A1 | 6/2004 | Iwamoto et al. | |

FOREIGN PATENT DOCUMENTS

| | | |
|---|---|---|
| CA | 2355533 | 2/2002 |
| EP | 0 206 286 | 6/1986 |
| EP | 0 187 352 | 7/1986 |
| EP | 0 927 747 A | 7/1999 |
| EP | 1 182 232 | 2/2002 |
| EP | 1 281 737 A | 2/2003 |
| GB | 687807 | 2/1953 |
| GB | 2 021 138 A | 11/1979 |
| WO | WO 94/04619 | 3/1994 |

OTHER PUBLICATIONS

Copending U.S. Appl. No. 10/902,602, filed Jul. 29, 2004, entitled "Phase Change Inks," with the named inventors Jeffery H. Banning, Wolfgang.

Copending U.S. Appl. No. 10/918,619, filed concurrently herewith, entitled "Phase Change Inks," with the named inventors Jeffery H. Banning, Wolfgang.

English abstract for German Patent Publication DE 4205636AL.

English abstract for German Patent Publication DE 4205713AL.

English abstract for Japanese Patent Publication JP 2002129044.

R. Butnaru et al., "Researches on Dyeing of Cotton Fabrics with Acid Dyestuffs, Concomitantly with Crease-Resist Treatments," *Cellulose Chem. Technol.*, 29, p. 471 (1995).

English abstract Japanese Patent Publication JP 63223064.

PHASE CHANGE INKS

CROSS-REFERENCE TO RELATED APPLICATIONS

Copending application U.S. Ser. No. 10/260,146, filed Sep. 27, 2002, entitled "Colorant Compounds," U.S. Publication 20040077887, with the named inventors Jeffery H. Banning and C. Wayne Jaeger, the disclosure of which is totally incorporated herein by reference, discloses compounds of the formula

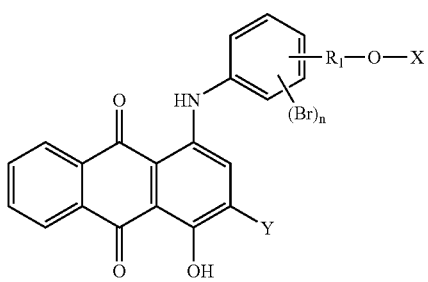

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

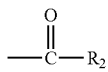

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

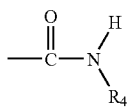

wherein $R_4$ is an alkyl group, an aryl group, an arylalkyl group, or an alkylaryl group.

Copending application U.S. Ser. No. 10/260,376, filed Sep. 27, 2002, U.S. Publication 20040102540, entitled "Phase Change Inks," with the named inventors C. Wayne Jaeger and Jeffery H. Banning, the disclosure of which is totally incorporated herein by reference, discloses a phase change ink composition comprising a phase change ink carrier and a colorant compound of the formula

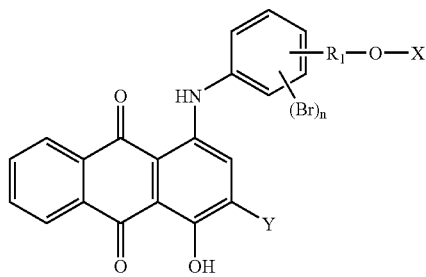

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

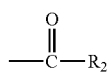

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

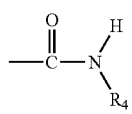

wherein $R_4$ is an alkyl group, an aryl group, an arylalkyl group, or an alkylaryl group.

Copending application U.S. Ser. No. 10/260,379, filed Sep. 27, 2002, U.S. Publication 20040082801, entitled "Methods for Making Colorant Compounds," with the named inventors C. Wayne Jaeger and Jeffery H. Banning, the disclosure of which is totally incorporated herein by reference, discloses a process for preparing a colorant of the formula

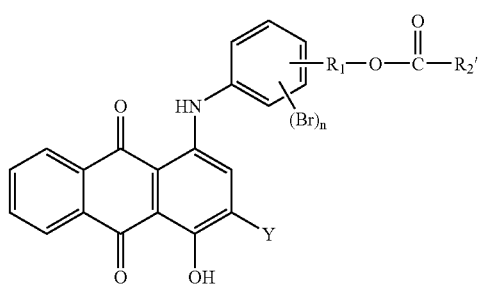

or

-continued

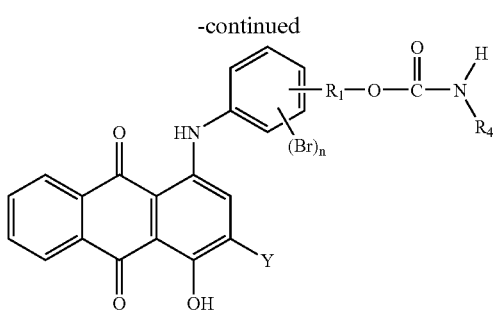

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a) preparing a first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture to prepare an alcohol-substituted colorant of the formula

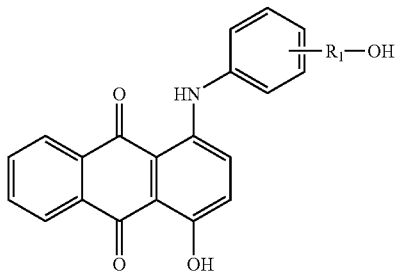

followed by (b) converting the colorant thus prepared to either (i) an ester-substituted colorant by reaction with an esterification compound which is either (A) an anhydride of the formula

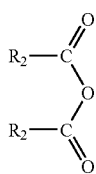

or (B) an acid of the formula $R_2COOH$ in the presence of an optional esterification catalyst, or (ii) a urethane-substituted colorant by reaction with an isocyanate compound of the formula

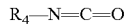

and (c) brominating the colorant thus prepared, wherein either conversion to ester or urethane can be performed before bromination or bromination can be performed before conversion to ester or urethane.

Copending U.S. application Ser. No. 10/902,594, filed Jul. 29, 2004, entitled "Colorant Compounds," with the named inventors Jeffery H. Banning, Wolfgang G. Wedler, and C. Wayne Jaeger, the disclosure of which is totally incorporated herein by reference, discloses a colorant compound of the formula

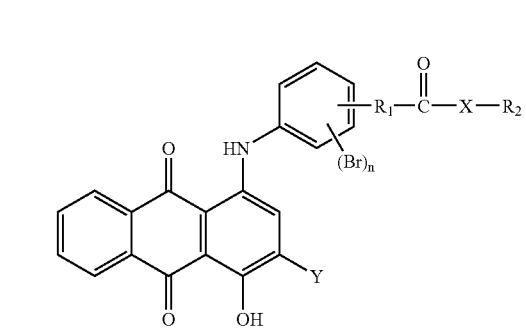

wherein Y is a hydrogen atom or a bromine atom, n is an integer of 0, 1, 2, 3, or 4, $R_1$ is an alkylene group, an arylene group, an arylalkylene group, or an alkylarylene group, provided that no oxygen atom creates a

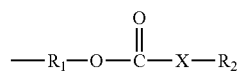

linkage, X is —O— or —$NR_3$— wherein $R_3$ is a hydrogen atom, an alkyl group, an aryl group, an arylalkyl group, or an alkylaryl group, and $R_2$ is a hydrogen atom, an alkyl group, an aryl group, an arylalkyl group, or an alkylaryl group.

Copending U.S. application Ser. No. 10/902,602, filed Jul. 29, 2004, entitled "Phase Change Inks," with the named inventors Jeffery H. Banning, Wolfgang G. Wedler, and C. Wayne Jaeger, the disclosure of which is totally incorporated herein by reference, discloses a phase change ink composition comprising a phase change ink carrier and a colorant compound of the formula

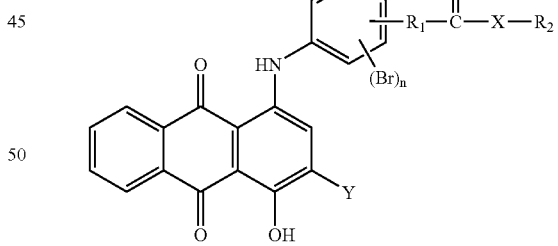

wherein Y is a hydrogen atom or a bromine atom, n is an integer of 0, 1, 2, 3, or 4, $R_1$ is an alkylene group, an arylene group, an arylalkylene group, or an alkylarylene group, provided that no oxygen atom creates a

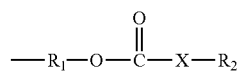

linkage, X is —O— or —$NR_3$— wherein $R_3$ is a hydrogen atom, an alkyl group, an aryl group, an arylalkyl group, or an alkylaryl group, and R₂ is a hydrogen atom, an alkyl group, an aryl group, an arylalkyl group, or an alkylaryl group.

Copending U.S. application Ser. No. 10/918,053, filed concurrently herewith, entitled "Colorant Compounds," with the named inventors Jeffery H. Banning, Wolfgang G. Wedler, and C. Wayne Jaeger, the disclosure of which is totally incorporated herein by reference, discloses compounds of the formula

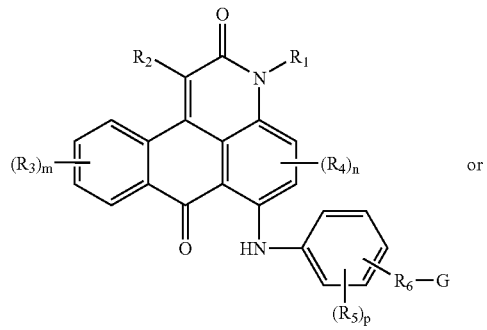

or

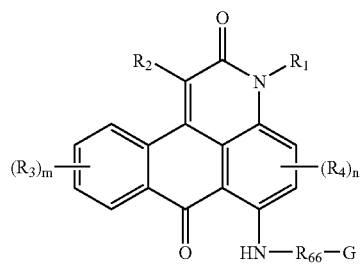

wherein $R_1$, $R_2$, $R_3$, $R_4$, $R_5$, $R_6$, $R_{66}$, m, n, p, and G are as defined therein.

BACKGROUND

Disclosed herein are phase change inks. More specifically, disclosed herein are hot melt or phase change inks containing specific colorant compounds. One embodiment is directed to a phase change ink composition comprising a phase change ink carrier and a colorant compound of the formula

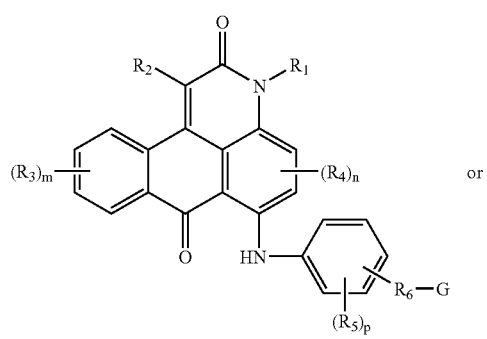

or

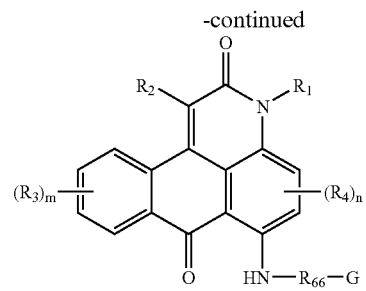

wherein $R_1$ is (i) a hydrogen atom, (ii) an alkyl group, (iii) an aryl group, (iv) an arylalkyl group, or (v) an alkylaryl group, $R_2$ is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, $R_3$ is (i) an alkyl group, (ii) an aryl group, (iii) an arylalkyl group, (iv) an alkylaryl group, or (v) a substituent other than an alkyl, aryl, arylalkyl, or alkylaryl group, m is an integer of 0, 1, 2, 3, or 4, $R_4$ is (i) an alkyl group, (ii) an aryl group, (iii) an arylalkyl group, (iv) an alkylaryl group, or (v) a substituent other than an alkyl, aryl, arylalkyl, or alkylaryl group, n is an integer of 0, 1, 2, 3, or 4, $R_5$ is (i) an alkyl group, (ii) an aryl group, (iii) an arylalkyl group, (iv) an alkylaryl group, or (v) a substituent other than an alkyl, aryl, arylalkyl, or alkylaryl group, p is an integer of 0, 1, 2, 3, or 4, $R_6$ is (i) a direct bond, (ii) an alkylene group, (iii) an arylene group, (iv) an arylalkylene group, or (v) an alkylarylene group, $R_{66}$ is (i) an alkylene group, (ii) an arylene group, (iii) an arylalkylene group, or (iv) an alkylarylene group, G is (1) a hydroxy group, (2) a carboxylic acid group, (3) an alkyl group having at least about 8 carbon atoms, (4) an aryl group, (5) an arylalkyl group having at least about 14 carbon atoms, (6) an alkylaryl group having at least about 14 carbon atoms, (7) a group of the formula

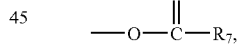

(8) a group of the formula

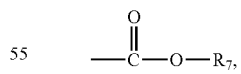

(9) a group of the formula

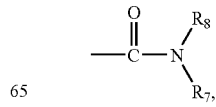

or (10) a group of the formula

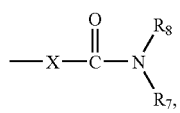

$R_7$ is (i) an alkyl group, (ii) an aryl group, (iii) an arylalkyl group, or (iv) an alkylaryl group, $R_8$ is (i) a hydrogen atom, (ii) an alkyl group, (iii) an aryl group, (iv) an arylalkyl group, or (v) an alkylaryl group, X is —O— or —$NR_9$—, and $R_9$ is (i) a hydrogen atom, (ii) an alkyl group, (iii) an aryl group, (iv) an arylalkyl group, or (v) an alkylaryl group.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,395,078 (Jaeger), U.S. Pat. No. 6,422,695 (Jaeger), Canadian Patent Publication 2 355 533 (filed Aug. 20, 2001, published Feb. 23, 2002), European Patent Publication EP 1 182 232 (filed Aug. 17, 2001, published Feb. 27, 2001), Japanese Patent Publication JP 2002129044 (filed Aug. 8, 2001, published May 9, 2002), Brazilian Patent Publication PI01035819 (filed Aug. 22, 2001, published Mar. 26, 2002), and Mexican Patent Application 2001008418 (filed Aug. 20, 2001), the disclosures of each of which are totally incorporated herein by reference, disclose a compound having the formula

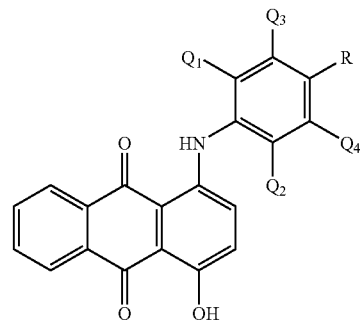

wherein at least one $Q_1$, $Q_2$, $Q_3$, and $Q_4$ is a halogen atom and any of $Q_1$, $Q_2$, $Q_3$ and $Q_4$ which is not a halogen atom is a hydrogen atom; and wherein R comprises at least two carbon atoms. The invention further encompasses inclusion of such compound into phase change ink carrier compositions, as well as printing methods utilizing such compound.

British Patent Publication GB 2 021 138 (Hohmann et al.), the disclosure of which is totally incorporated herein by reference, discloses mixtures of dyestuffs of the formula

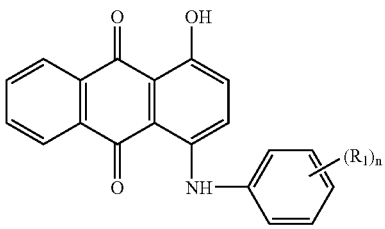

and of the formula

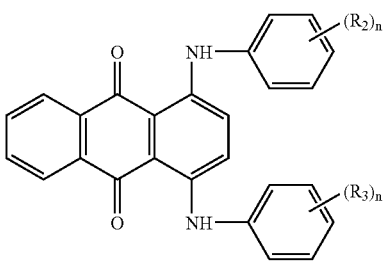

wherein $R_1$, $R_2$, and $R_3$ denote $C_1$–$C_4$ alkyl, $C_1$–$C_4$ alkoxy, or halogen, and n denotes 2 or 3, which are suitable for dyeing polyester fibers by the exhaustion process. Dark blue and navy blue dyeings with good fastness properties are obtained.

U.S. Pat. No. 6,174,937 (Banning et al.), the disclosure of which is totally incorporated herein by reference, discloses a phase change ink comprising a material of the formula

wherein $X_1$, $X_2$, $X_3$ and $X_4$ are segments comprising atoms selected from groups V and VI of the periodic table; wherein at least one $R_1$ and $R_5$ comprises at least 37 carbon units; and wherein $R_2$, $R_3$ and $R_4$ each comprise at least one carbon unit. The invention further encompasses a composition of matter, as well as methods of reducing coefficients of friction of phase change ink formulations.

U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the invention, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

U.S. Pat. No. 5,902,841 (Jaeger et al.), the disclosure of which is totally incorporated herein by reference, discloses a phase change ink composition wherein the ink composition utilizes a colorant in combination with a selected phase change ink carrier composition containing at least one hydroxy-functional fatty amide compound.

R. Butnaru et al.; "Researches on Dyeing of Cotton Fabrics with Acid Dyestuffs, Concomitantly with Crease-Resist Treatments," *Cellulose Chem. Technol.*, 29, p. 471 (1995), the disclosure of which is totally incorporated herein by reference, discloses an analysis of the results obtained on dyeing of cotton cellulosic fabrics with acid dyestuffs, on employing crease-resist agents with polyfunctional structure. The conclusion was reached that no chemical or physical bonds occur between dyestuffs and the fiber, the dyestuffs being fixed onto the resin's aminic groups formed as a result of the thermal, crease-resist treatment. Washing resistance of the cellulosic materials thus dyed attained the values obtained as a result of dyeing with direct dyestuffs, specific for these types of fibers.

U.S. Pat. No. 6,235,094 (Banning et al.), the disclosure of which is totally incorporated herein by reference, discloses a compound having the formula

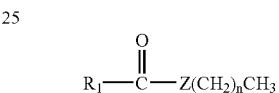

wherein $R_1$, Z and the carbonyl can be comprised by a common ring, wherein $R_1$ comprises a chromophore that absorbs light from the visible wavelength range, and wherein n is an integer that is at least 12. The invention also encompasses a solid phase change ink composition. Such composition includes a phase change ink carrier and a colorant. The colorant comprises a chromophore that absorbs light from the visible wavelength range, and has the formula

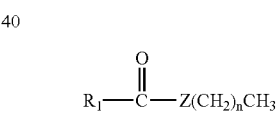

wherein $R_1$, Z and the carbonyl can be comprised by a common ring, wherein n is an integer that is at least 12. Additionally, the invention encompasses a method of forming a colorant. A first compound having the formula

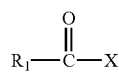

is reacted with a second compound having the formula $Z(CH_2)_nCH_3$, wherein n is an integer that is at least 12, to form a third compound having the formula

wherein the third compound comprises a chromophore that absorbs light from the visible wavelength range.

U.S. Pat. No. 3,734,934 (Kolliker et al.), the disclosure of which is totally incorporated herein by reference, discloses dyestuffs of the formula

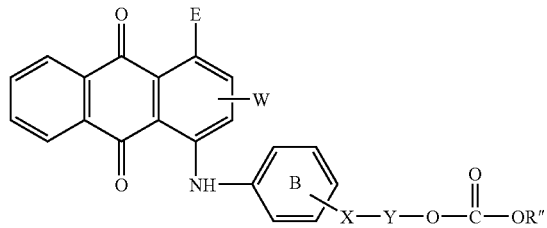

wherein W is chlorine, bromine, cyano, lower alkyl, lower alkoxy, carbonyl, phenoxycarbonyl, lower alkylthio, phenylthio, lower alkyl sulfonyl, or a grouping of the formula

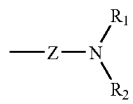

wherein Z is —CO— or —SO$_2$— and R$_1$ and R$_2$ are each independently hydrogen or lower alkyl, Y is lower alkylene, —CH$_2$CH$_2$OCH$_2$CH$_2$—, or —CH$_2$CH$_2$CH$_2$OCH$_2$CH$_2$CH$_2$—, X is a direct bond, —O—, —S—, —NH—, —COHN—, or —SO$_2$NH—, R" is lower alkyl, cyclohexyl, phenyl, or phenyl substituted by chlorine, lower alkyl, or lower alkoxy, or bromine, the nucleus B is either unsubstituted or further monosubstituted by chlorine, lower alkyl, or lower alkoxy, E is NH$_2$, OH, or NHT, and T is lower alkyl, cyclohexyl, phenyl, lower alkyl phenyl, or phenoxyphenyl.

British Patent 687,807, the disclosure of which is totally incorporated herein by reference, discloses hydroxyethoxymethyl phenyl-amino-anthraquinone dyestuffs and derivatives thereof of the formula

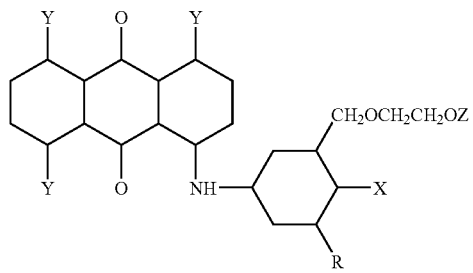

wherein X is hydrogen or methyl, R is hydrogen or CH$_3$OCH$_2$CH$_2$OZ, Z is hydrogen, hydroxy alkyl, or alkoxy alkyl, and Y is hydrogen, hydroxy, or

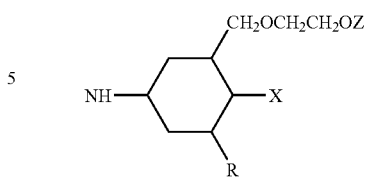

These compounds exhibit substantially enhanced substantivity for acetate rayon and have the ability to withstand the action of acid gas fumes such as the combustion products of industrial and engine fuels.

Japanese Patent Publication 63223064, the disclosure of which is totally incorporated herein by reference, discloses a blue coloring material for use in optical filters which is of the formula

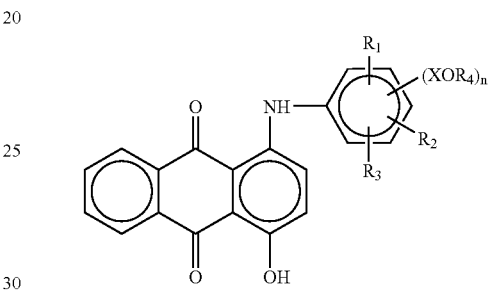

wherein R$_1$ to R$_3$ are each H, alkyl, alkoxy alkyl, hydroxy alkyl, or halogen, R$_4$ is acyl, (alkyl)carbamoyl, arylcarbamoyl, aralkylcarbamoyl, alkenylcarbamoyl, methanesulfonyl, or H, X is alkylene, alkylene-O-alkylene, or alkylene-S-alkylene, and n is 1 or 2. An example is 1-{4-(2-benzoyloxyethyl)anilino}-4-hydroxyanthraquinone.

"British Intelligence Objectives Subcommittee Report 1484", Publication Board No. 86139, Library of Congress, Washington, D.C., 1947, p. 46–47, the disclosure of which is totally incorporated by reference, discloses the synthesis of 4-bromo-1:9-N-methylanthrapyridone and similar compounds.

U.S. Pat. No. 6,152,969 (Matsumoto et al.), the disclosure of which is totally incorporated herein by reference, discloses a coloring matter which has a moderately bluish magenta color and an excellent lightfastness and can provide a wide range of color tones in the visible range when used together with yellow and cyan inks. A water-base ink composition or the like is prepared by using a sulfonic acid derivative of an anthrapyridone compound represented by general formula

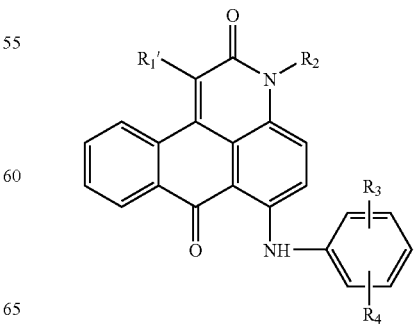

as a magenta dye, wherein $R_1'$ represents alkoxycarbonyl, carbonyl, or benzoyl; $R_2$ represents hydrogen or alkyl; and $R_3$ and $R_4$ represent each independently hydrogen, halogeno, alkyl, or alkoxy.

U.S. Pat. No. 5,340,910 (Chamberlin et al.), the disclosure of which is totally incorporated herein by reference, discloses an improved process for the synthesis of 1-cyano-3H-dibenz(f,ij) isoquinoline-2,7-dione compounds, and a process exhibiting improvements in quality of products, safety, fewer environmental concerns, and economics when compared to presently known processes. The compounds are useful as colorants for polyesters and selected compounds, and when combined with small quantities of certain red colorants are particularly efficacious as blue toners for polyesters.

U.S. Pat. No. 4,386,206 (Wingard, Jr. et al.), the disclosure of which is totally incorporated herein by reference, discloses anthrapyridones prepared in high yields from 1-aminoanthraquinones or 1-alkylaminoanthraquinones and phenylacetyl halides when tertiary amides are employed as reaction media. The phenylacetyl halides can be generated in situ from phenylacetic acid and thionyl halide or phosgene.

U.S. Pat. No. 2,644,821 (Peter et al.), the disclosure of which is totally incorporated herein by reference, discloses anthrapyridone dyestuffs of the general formula

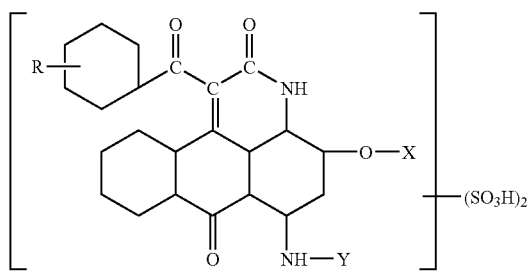

wherein X stands for phenyl or alkylphenyl and Y stands for phenyl or tetrahydronaphthyl, either of which may carry any desired substituent or substituents other than solubilizing groups, such as sulfonic acid or carboxylic acid groups, and R represents hydrogen, methyl, Cl, Br, methoxy, or nitro.

U.S. Pat. No. 4,745,174 (Pruett et al.), the disclosure of which is totally incorporated herein by reference, discloses fiber forming polyester compositions that exhibit improved whiteness by incorporating derivatives of dibenzoisoquinolinediones of the formula

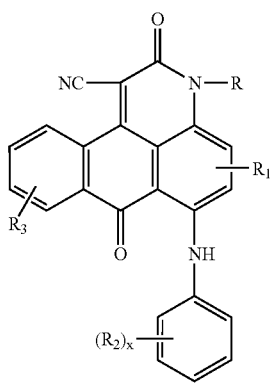

wherein R is hydrogen, cycloalkyl, allyl, alkyl, aralkyl, alkoxyalkyl, or cycloalkylalkylene; $R_1$ is hydrogen, halogen, alkyl, alkoxy, aryloxy, alkylthio, or arylthio; $R_2$ is hydrogen, halogen, alkyl, aryl, alkoxy, aryloxy, alkylthio, arylthio, carbalkoxy, carbaryloxy, carbaralkyloxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido, or N-alkylacylamido; $R_3$ is one or more groups selected from the group consisting of hydrogen, halogen, alkyl, and alkoxy; and x is an integer of 1 to 5; wherein one or more alkyl, alkoxy, aryl, aryloxy, alkylthio, arylthio or aralkyl residues may contain one or more reactive groups selected from the group consisting of carboxy, carbalkoxy, carbaryloxy, N-alkyl-carbamoyloxy, carbamoyloxy, acyloxy, chlorocarbonyl, hydroxyl, cycloalkylcarbonyloxy, N-arylcarbamoyloxy, and N,N-dialkylcarbamoyloxy, wherein said alkyl and aryl groups may also have common substituents such as alkoxy, acyloxy, cyano, halogen, hydroxy, and acylamido.

While known compositions and processes are suitable for their intended purposes, a need remains for improved colorant compounds. In addition, a need remains for colorant compositions particularly suitable for use in phase change inks. Further, a need remains for colorant compounds with a desirable magenta color. Additionally, a need remains for colorant compounds with desirable thermal stability. There is also a need for colorant compounds with good lightfastness. In addition, there is a need for colorant compounds that exhibit desirable solubility characteristics in phase change ink carrier compositions. Further, there is a need for colorant compounds that, when incorporated into phase change inks, exhibit reduced migration within a layer of printed ink. Additionally, there is a need for colorant compounds that, when incorporated into phase change inks, exhibit reduced crystallization within a layer of printed ink. A need also remains for colorant compounds that, when incorporated into phase change inks, enable production of prints that maintain uniform color over long periods of time without unevenness or blotching. In addition, a need remains for colorant compounds that, when incorporated into phase change inks, enable production of prints that retain their original color over long periods of time. Further, a need remains for colorant compounds that, when incorporated into phase change inks, enable production of prints that exhibit reduced sensitivity to image discoloration upon contact with human fingertips. Additionally, a need remains for colorant compounds that can be incorporated into phase change inks in desirably high concentrations. There is also a need for colorant compounds that can be manufactured easily and practically.

SUMMARY

Disclosed herein are phase change ink compositions comprising a phase change ink carrier and a colorant compound of the formula

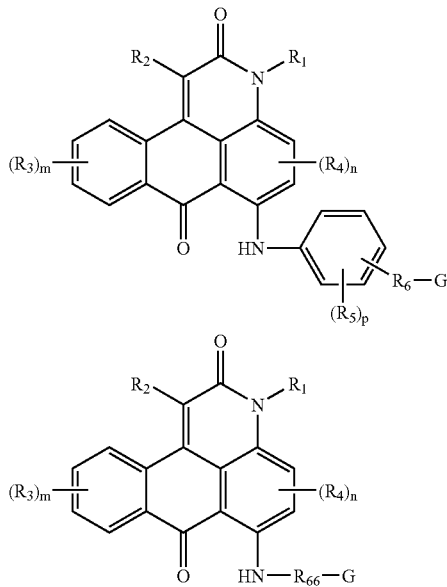

or

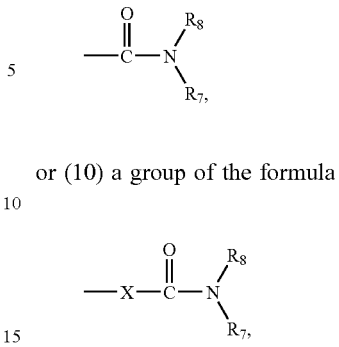

or (10) a group of the formula

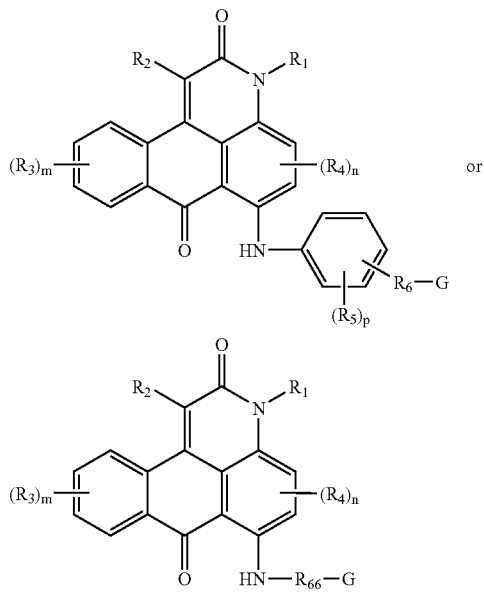

$R_7$ is (i) an alkyl group, (ii) an aryl group, (iii) an arylalkyl group, or (iv) an alkylaryl group, $R_8$ is (i) a hydrogen atom, (ii) an alkyl group, (iii) an aryl group, (iv) an arylalkyl group, or (v) an alkylaryl group, X is —O— or —NR$_9$—, and $R_9$ is (i) a hydrogen atom, (ii) an alkyl group, (iii) an aryl group, (iv) an arylalkyl group, or (v) an alkylaryl group.

DETAILED DESCRIPTION

The phase change ink compositions disclosed herein contain colorant compounds of the formula wherein $R_1$ is (i) a hydrogen atom, (ii) an alkyl group, (iii) an aryl group, (iv) an arylalkyl group, or (v) an alkylaryl group, $R_2$ is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, $R_3$ is (i) an alkyl group, (ii) an aryl group, (iii) an arylalkyl group, (iv) an alkylaryl group, or (v) a substituent other than an alkyl, aryl, arylalkyl, or alkylaryl group, m is an integer of 0, 1, 2, 3, or 4, $R_4$ is (i) an alkyl group, (ii) an aryl group, (iii) an arylalkyl group, (iv) an alkylaryl group, or (v) a substituent other than an alkyl, aryl, arylalkyl, or alkylaryl group, n is an integer of 0, 1, 2, 3, or 4, $R_5$ is (i) an alkyl group, (ii) an aryl group, (iii) an arylalkyl group, (iv) an alkylaryl group, or (v) a substituent other than an alkyl, aryl, arylalkyl, or alkylaryl group, p is an integer of 0, 1, 2, 3, or 4, $R_6$ is (i) a direct bond, (ii) an alkylene group, (iii) an arylene group, (iv) an arylalkylene group, or (v) an alkylarylene group, $R_{66}$ is (i) an alkylene group, (ii) an arylene group, (iii) an arylalkylene group, or (iv) an alkylarylene group, G is (1) a hydroxy group, (2) a carboxylic acid group, (3) an alkyl group having at least about 8 carbon atoms, (4) an aryl group, (5) an arylalkyl group having at least about 14 carbon atoms, (6) an alkylaryl group having at least about 14 carbon atoms, (7) a group of the formula

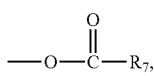

(8) a group of the formula

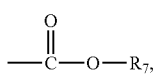

(9) a group of the formula wherein $R_1$ is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, with specific examples of $R_1$ groups including (but not being limited to) a hydrogen atom, a methyl group, and the like, $R_2$ is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, or (vi) a substituent other than an alkyl, aryl, arylalkyl, or alkylaryl group, including (but not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, with some specific examples of $R_2$ groups including (but not being limited to) —H, —CN, a phenyl group (—$C_6H_5$), an ester group of the formula —C(=O)O$R_{88}$ wherein $R_{88}$ is an alkyl group, such as methyl, ethyl, propyl, or the like, and the like, $R_3$ is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, (iv) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, or (v) a substituent other than an alkyl, aryl, arylalkyl, or alkylaryl group, including (but not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, m is an integer of 0, 1, 2, 3, or 4, $R_4$ is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, (iv) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, or (v) a substituent other than an alkyl, aryl, arylalkyl, or alkylaryl group, including (but not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrite groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, n is an integer of 0, 1, 2, 3, or 4, $R_5$ is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, (iv) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, or (v) a substituent other than an alkyl, aryl, arylalkyl, or alkylaryl group, including (but not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, p is an integer of 0, 1, 2, 3, or 4, $R_6$ is (i) a direct bond (i.e., $R_6$ can be missing entirely and the G group can be directly bonded to the aromatic ring), (ii) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 1 carbon atom, and in one embodiment with no more than about 50 carbon atoms, in another embodiment with no more than about 18 carbon atoms, in yet another embodiment with no more than about 12 carbon atoms, in still another embodiment with no more than about 2 carbon atoms, and in another embodiment with exactly 1 carbon atom, although the number of carbon atoms can be outside of these ranges, (iii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, (iv) an arylalkylene group (including unsubstituted and substituted arylalkylene groups, and wherein hetero atoms, such as oxygen, nitrogen, sulfur, silicon, phosphorus, and the like either may or may not be present in either or both of the aryl and the alkyl portions of the arylalkylene group), in one embodiment with at least about 6 carbon atoms, and in another embodiment with at least about 7 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, such as benzyl or the like, including (a) arylalkylene groups wherein both the aryl and the alkyl portions form the linkage between the

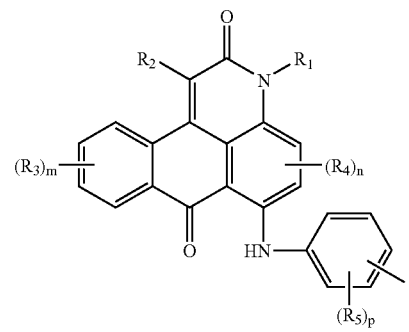

moiety and the

-G moiety, such as

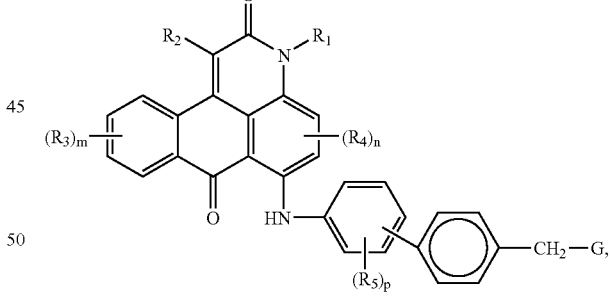

and the like, and (b) arylalkylene groups wherein only the alkyl portion forms the linkage between the

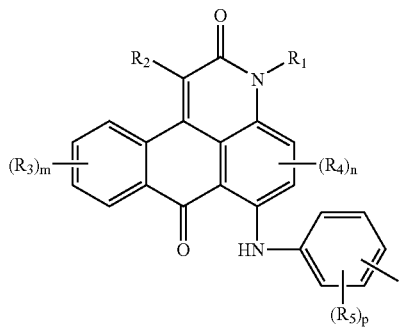

moiety and the

-G moiety and the alkyl portion has aryl portions pending therefrom, such as

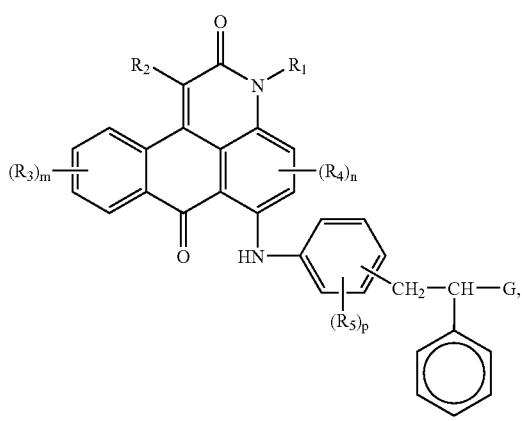

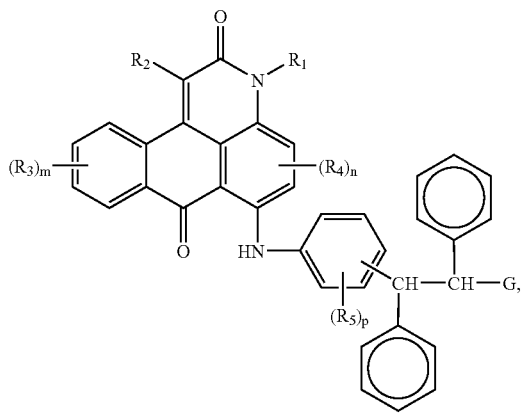

and the like, or (v) an alkylarylene group (including unsubstituted and substituted alkylarylene groups, and wherein hetero atoms, such as oxygen, nitrogen, sulfur, silicon, phosphorus, and the like either may or may not be present in either or both of the aryl and the alkyl portions of the alkylarylene group), in one embodiment with at least about 6 carbon atoms, and in another embodiment with at least about 7 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, such as tolyl, phenylethyl, or the like, including (a) alkylarylene groups wherein both the aryl and the alkyl portions form the linkage between the

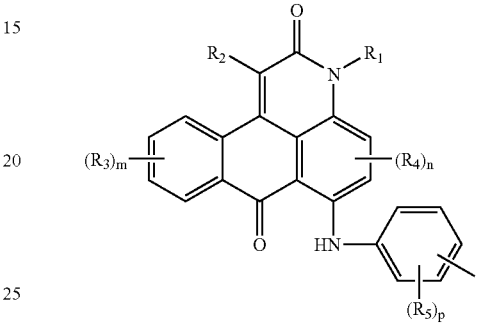

moiety and the

-G moiety, such as

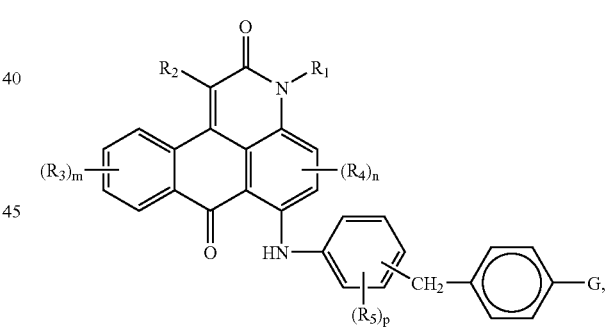

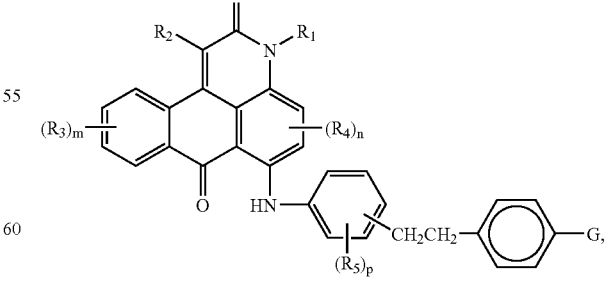

and the like, and (b) alkylarylene groups wherein only the aryl portion forms the linkage between the

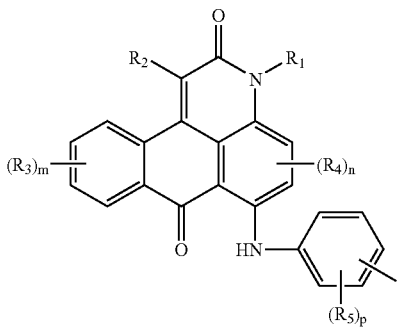

moiety and the

-G moiety and the aryl portion has alkyl portions pending therefrom, such as

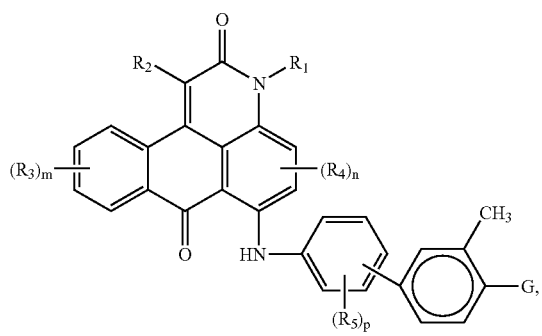

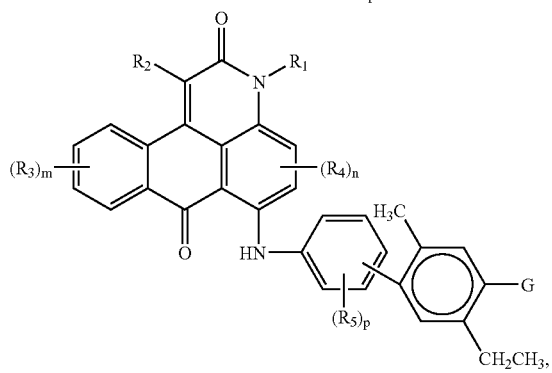

and the like, with specific examples of $R_6$ including (but not being limited to) —$CH_2$—, —$CH_2CH_2$—, and the like, $R_{66}$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 1 carbon atom, and in one embodiment with no more than about 50 carbon atoms, in another embodiment with no more than about 18 carbon atoms, in yet another embodiment with no more than about 12 carbon atoms, in still another embodiment with no more than about 2 carbon atoms, and in another embodiment with exactly 1 carbon atom, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, (iii) an arylalkylene group (including unsubstituted and substituted arylalkylene groups, and wherein hetero atoms, such as oxygen, nitrogen, sulfur, silicon, phosphorus, and the like either may or may not be present in either or both of the aryl and the alkyl portions of the arylalkylene group), in one embodiment with at least about 6 carbon atoms, and in another embodiment with at least about 7 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, such as benzyl or the like, including (a) arylalkylene groups wherein both the aryl and the alkyl portions form the linkage between the

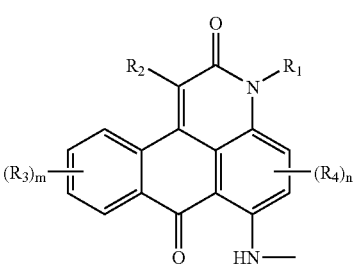

moiety and the

-G moiety, such as

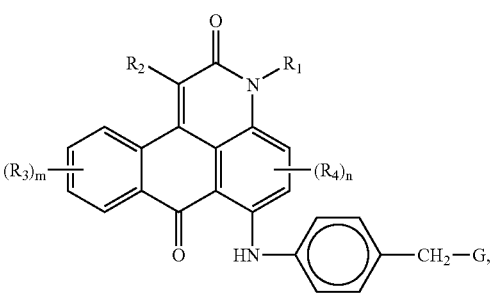

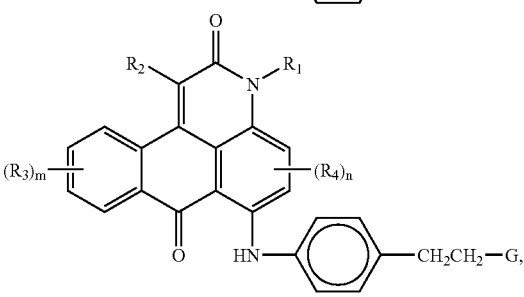

and the like, and (b) arylalkylene groups wherein only the alkyl portion forms the linkage between the

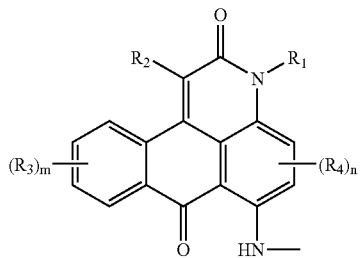

moiety and the

-G moiety and the alkyl portion has aryl portions pending therefrom, such as

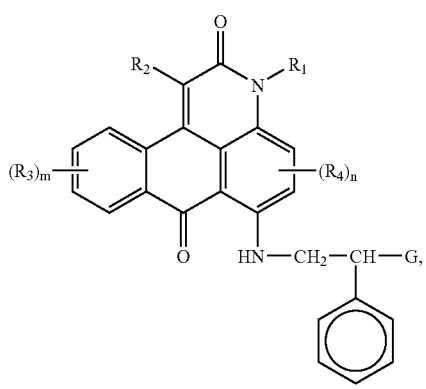

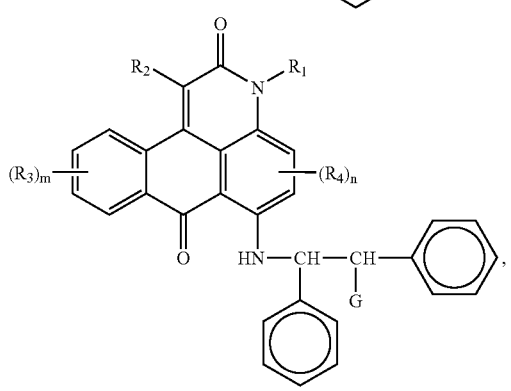

and the like, or (iv) an alkylarylene group (including unsubstituted and substituted alkylarylene groups, and wherein hetero atoms, such as oxygen, nitrogen, sulfur, silicon, phosphorus, and the like either may or may not be present in either or both of the aryl and the alkyl portions of the alkylarylene group), in one embodiment with at least about 6 carbon atoms, and in another embodiment with at least about 7 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, such as tolyl, phenylethyl, or the like, including (a) alkylarylene groups wherein both the aryl and the alkyl portions form the linkage between the

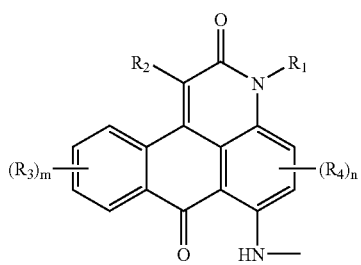

moiety and the

-G moiety, such as

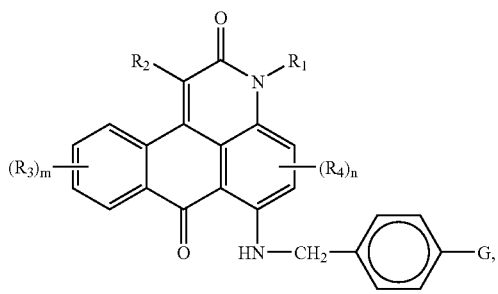

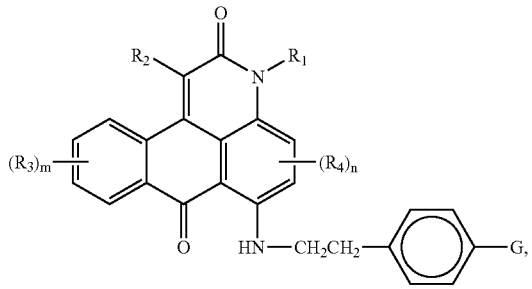

and the like, and (b) alkylarylene groups wherein only the aryl portion forms the linkage between the

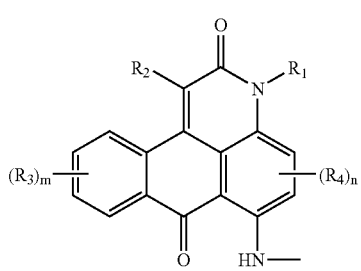

moiety and the

-G moiety and the aryl portion has alkyl portions pending therefrom, such as

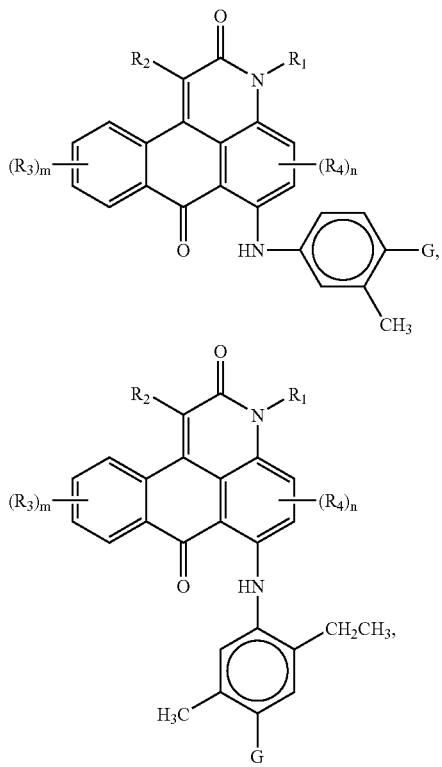

and the like, with specific examples of $R_{66}$ including (but not being limited to) —$CH_2$—, —$CH_2CH_2$—, and the like, G is (1) a hydroxy group, (2) a carboxylic acid group, (3) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 8 carbon atoms, in another embodiment with at least about 9 carbon atoms, in yet another embodiment with at least about 10 carbon atoms, in still another embodiment with at least about 11 carbon atoms, in another embodiment with at least about 12 carbon atoms, in yet another embodiment with at least about 13 carbon atoms, in still another embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, and in still another embodiment with at least about 20 carbon atoms, and in one embodiment with no more than about 50 carbon atoms, although the number of carbon atoms can be outside of these ranges, (4) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, in yet another embodiment with at least about 7 carbon atoms, in still another embodiment with at least about 8 carbon atoms, in another embodiment with at least about 9 carbon atoms, in yet another embodiment with at least about 10 carbon atoms, in still another embodiment with at least about 11 carbon atoms, in another embodiment with at least about 12 carbon atoms, in yet another embodiment with at least about 13 carbon atoms, in still another embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, and in still another embodiment with at least about 20 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (5) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, in still another embodiment with at least about 20 carbon atoms, in another embodiment with at least about 21 carbon atoms, in yet another embodiment with at least about 22 carbon atoms, in still another embodiment with at least about 23 carbon atoms, in another embodiment with at least about 24 carbon atoms, in yet another embodiment with at least about 25 carbon atoms, and in still another embodiment with at least about 26 carbon atoms, and in one embodiment with no more than about 50 carbon atoms, although the number of carbon atoms can be outside of these ranges, (6) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, in still another embodiment with at least about 20 carbon atoms, in another embodiment with at least about 21 carbon atoms, in yet another embodiment with at least about 22 carbon atoms, in still another embodiment with at least about 23 carbon atoms, in another embodiment with at least about 24 carbon atoms, in yet another embodiment with at least about 25 carbon atoms, and in still another embodiment with at least about 26 carbon atoms, and in one embodiment with no more than about 50 carbon atoms, although the number of carbon atoms can be outside of these ranges, (7) a group of the formula

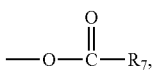

(8) a group of the formula

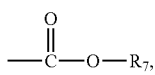

(9) a group of the formula

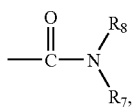

or (10) a group of the formula

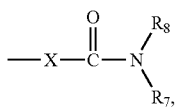

$R_7$ is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (ii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, or (iv) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, $R_8$ is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, X is —O— or —$NR_9$—, and $R_9$ is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, and wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

It should be noted that since hetero atoms can be present in the alkyl, alkylene, aryl, arylene, arylalkyl, arylalkylene, alkylaryl, and alkylarylene groups, these groups also include alkoxy, alkyleneoxy, aryloxy, aryleneoxy, arylalkyloxy, arylalkyleneoxy, alkylaryloxy, alkylaryleneoxy, and the like, including those wherein an oxygen atom thereof is the point of attachment of the R group, and including (but not limited to) those of the formulae

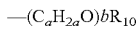

and

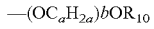

wherein a is an integer representing the number of carbon atoms in the alkyleneoxy, aryleneoxy, arylalkyleneoxy, or alkylaryleneoxy group, being in various embodiments 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, although the value of a can be outside of these ranges, b is an integer representing the number of repeat alkyleneoxy, aryleneoxy, arylalkyleneoxy, or alkylaryleneoxy units, being in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the value of b can be outside of these ranges, and $R_{10}$ is (i) a hydrogen atom, (ii) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 2 carbon atoms, in another embodiment with at least about 4 carbon atoms, in yet another embodiment with at least about 6 carbon atoms, in still another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in still another embodiment with at least about 38 carbon atoms, in another embodiment with at least about 40 carbon atoms, in yet another embodiment with at least about 42 carbon atoms, in still another embodiment with at least about 44 carbon atoms, in another embodiment with at least about 46 carbon atoms, in yet another embodiment with at least about 48 carbon atoms, and in still another embodiment with at least about 50 carbon atoms, and in one embodiment with no more than about 100 carbon atoms, in another embodiment with no more than about 70 carbon atoms, in yet another embodiment with no more than about 60 carbon atoms, and in still another embodiment with no more than about 50 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in still another embodiment with at least about 38 carbon atoms, in another embodiment with at least about 40 carbon atoms, in yet another embodiment with at least about 42 carbon atoms, in still another embodiment with at least about 44 carbon atoms, in another embodiment with at least about 46 carbon atoms, in yet another embodiment with at least about 48 carbon atoms, and in still another embodiment with at least about 50 carbon atoms, and in one embodiment with no more than about 100 carbon atoms, in another embodiment with no more than about 75 carbon atoms, in yet another embodiment with no more than about 60 carbon atoms, and in still another embodiment with no more than about 50 carbon atoms, although the number of carbon atoms can be outside of these ranges, (iv) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in yet another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, in still another embodiment with at least about 42 carbon atoms, in another embodiment with at least about 44 carbon atoms, in yet another embodiment with at least about 46 carbon atoms, in still another embodiment with at least about 48 carbon atoms, and in another embodiment with at least about 50 carbon atoms, and in one embodiment with no more than about 200 carbon atoms, in another embodiment with no more than about 100 carbon atoms, in yet another embodiment with no more than about 60 carbon atoms, and in still another embodiment with no more than about 50 carbon atoms, although the number of carbon atoms can be outside of these ranges, or (v) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in yet another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, in still another embodiment with at least about 42 carbon atoms, in another embodiment with at least about 44 carbon atoms, in yet another embodiment with at least about 46 carbon atoms, in still another embodiment with at least about 48 carbon atoms, and in another embodiment with at least about 50 carbon atoms, and in one embodiment with no more than about 200 carbon atoms, in another embodiment with no more than about 100 carbon atoms, in yet another embodiment with no more than about 60 carbon atoms, and in still another embodiment with no more than about 50 carbon atoms, although the number of carbon atoms can be outside of these ranges.

Further, since hetero atoms can be present in these groups, these groups also include heterocyclic groups.

In one specific embodiment, the total number of carbon atoms in $R_1+R_2+R_3+R_4+R_5+(R_6$ or $R_{66})+R_7+R_8+R_9$ is no more than about 200, in another embodiment no more than about 100, and in yet another embodiment no more than about 70, although the total number of carbon atoms can be outside of these ranges.

In one specific embodiment, the total number of carbon atoms in $R_1+R_2+R_3+R_4+R_5+(R_6$ or $R_{66})+R_7+R_8+R_9$ is at least about 12, in another embodiment at least about 13, in yet another embodiment at least about 14, in still another embodiment at least about 15, in another embodiment at least about 16, in yet another embodiment at least about 17, in still another embodiment at least about 18, in another embodiment at least about 19, in yet another embodiment at least about 20, in yet another embodiment at least about 21, in another embodiment at least about 22, in yet another embodiment at least about 23, in yet another embodiment at least about 24, in another embodiment at least about 25, in yet another embodiment at least about 26, in yet another embodiment at least about 27, in another embodiment at least about 28, in yet another embodiment at least about 29, in yet another embodiment at least about 30, in another embodiment at least about 31, in yet another embodiment at least about 32, in yet another embodiment at least about 33, in another embodiment at least about 34, in yet another embodiment at least about 35, in yet another embodiment at least about 36, in another embodiment at least about 37, in yet another embodiment at least about 38, in yet another embodiment at least about 39, in another embodiment at least about 40, in yet another embodiment at least about 41, in yet another embodiment at least about 42, in another embodiment at least about 43, in yet another embodiment at least about 44, in yet another embodiment at least about 45, in another embodiment at least about 46, in yet another embodiment at least about 47, and in yet another embodiment at least about 48, although the total number of carbon atoms can be outside of these ranges.

In one specific embodiment, G is (I) an alkyl group having in one embodiment at least about 8 carbon atoms, in another embodiment at least about 9 carbon atoms, in yet another embodiment at least about 10 carbon atoms, in still another embodiment at least about 11 carbon atoms, in another embodiment at least about 12 carbon atoms, in yet another embodiment at least about 13 carbon atoms, in still another embodiment at least about 14 carbon atoms, in another embodiment at least about 15 carbon atoms, in yet another embodiment at least about 16 carbon atoms, in still another embodiment at least about 17 carbon atoms, in another embodiment at least about 18 carbon atoms, in yet another embodiment at least about 19 carbon atoms, in still another embodiment at least about 20 carbon atoms, in another embodiment at least about 21 carbon atoms, in yet another embodiment at least about 22 carbon atoms, in still another embodiment at least about 23 carbon atoms, in another embodiment at least about 24 carbon atoms, in yet another embodiment at least about 25 carbon atoms, in still another embodiment at least about 26 carbon atoms, in another embodiment at least about 27 carbon atoms, in yet another embodiment at least about 28 carbon atoms, in still another embodiment at least about 29 carbon atoms, in another embodiment at least about 30 carbon atoms, in yet another embodiment at least about 31 carbon atoms, and in still another embodiment at least about 32 carbon atoms, (II) an arylalkyl group having at least about 14 carbon atoms, wherein the alkyl portion thereof has in one embodiment at least about 8 carbon atoms, in another embodiment at least about 9 carbon atoms, in yet another embodiment at least about 10 carbon atoms, in still another embodiment at least about 11 carbon atoms, in another embodiment at least about 12 carbon atoms, in yet another embodiment at least about 13 carbon atoms, in still another embodiment at least about 14 carbon atoms, in another embodiment at least about 15 carbon atoms, in yet another embodiment at least about 16 carbon atoms, in still another embodiment at least about 17 carbon atoms, in another embodiment at least about 18 carbon atoms, in yet another embodiment at least about 19 carbon atoms, in still another embodiment at least about 20 carbon atoms, in another embodiment at least about 21 carbon atoms, in yet another embodiment at least about 22 carbon atoms, in still another embodiment at least about 23 carbon atoms, in another embodiment at least about 24 carbon atoms, in yet another embodiment at least about 25 carbon atoms, in still another embodiment at least about 26 carbon atoms, in another embodiment at least about 27 carbon atoms, in yet another embodiment at least about 28 carbon atoms, in still another embodiment at least about 29 carbon atoms, in another embodiment at least about 30 carbon atoms, in yet another embodiment at least about 31 carbon atoms, and in still another embodiment at least about 32 carbon atoms, (III) an alkylaryl group having at least about 14 carbon atoms, wherein the alkyl portion thereof has in one embodiment at least about 8 carbon atoms, in another embodiment at least about 9 carbon atoms, in yet another embodiment at least about 10 carbon atoms, in still another embodiment at least about 11 carbon atoms, in another embodiment at least about 12 carbon atoms, in yet another embodiment at least about 13 carbon atoms, in still another embodiment at least about 14 carbon atoms, in another embodiment at least about 15 carbon atoms, in yet another embodiment at least about 16 carbon atoms, in still another embodiment at least about 17 carbon atoms, in another embodiment at least about 18 carbon atoms, in yet another embodiment at least about 19 carbon atoms, in still another embodiment at least about 20 carbon atoms, in another embodiment at least about 21 carbon atoms, in yet another embodiment at least about 22 carbon atoms, in still another embodiment at least about 23 carbon atoms, in another embodiment at least about 24 carbon atoms, in yet another embodiment at least about 25 carbon atoms, in still another embodiment at least about 26 carbon atoms, in another embodiment at least about 27 carbon atoms, in yet another embodiment at least about 28 carbon atoms, in still another embodiment at least about 29 carbon atoms, in another embodiment at least about 30 carbon atoms, in yet another embodiment at least about 31 carbon atoms, and in still another embodiment at least about 32 carbon atoms, or (IV) a group of one of the formulae

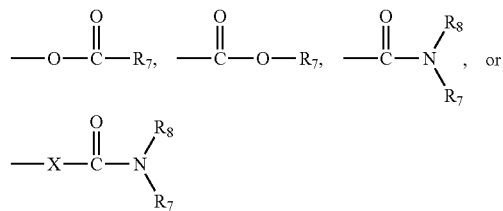

wherein $R_7$ is (i) an alkyl group having in one embodiment at least about 8 carbon atoms, in another embodiment at least about 9 carbon atoms, in yet another embodiment at least about 10 carbon atoms, in still another embodiment at least about 11 carbon atoms, in another embodiment at least about 12 carbon atoms, in yet another embodiment at least about 13 carbon atoms, in still another embodiment at least about 14 carbon atoms, in another embodiment at least about 15 carbon atoms, in yet another embodiment at least about 16 carbon atoms, in still another embodiment at least about 17 carbon atoms, in another embodiment at least about 18 carbon atoms, in yet another embodiment at least about 19 carbon atoms, in still another embodiment at least about 20 carbon atoms, in another embodiment at least about 21 carbon atoms, in yet another embodiment at least about 22 carbon atoms, in still another embodiment at least about 23 carbon atoms, in another embodiment at least about 24 carbon atoms, in yet another embodiment at least about 25 carbon atoms, in still another embodiment at least about 26 carbon atoms, in another embodiment at least about 27 carbon atoms, in yet another embodiment at least about 28 carbon atoms, in still another embodiment at least about 29 carbon atoms, in another embodiment at least about 30 carbon atoms, in yet another embodiment at least about 31 carbon atoms, and in still another embodiment at least about 32 carbon atoms, (ii) an arylalkyl group having at least about 14 carbon atoms, wherein the alkyl portion thereof has in one embodiment at least about 8 carbon atoms, in another embodiment at least about 9 carbon atoms, in yet another embodiment at least about 10 carbon atoms, in still another embodiment at least about 11 carbon atoms, in another embodiment at least about 12 carbon atoms, in yet another embodiment at least about 13 carbon atoms, in still another embodiment at least about 14 carbon atoms, in another embodiment at least about 15 carbon atoms, in yet another embodiment at least about 16 carbon atoms, in still another embodiment at least about 17 carbon atoms, in another embodiment at least about 18 carbon atoms, in yet another embodiment at least about 19 carbon atoms, in still another embodiment at least about 20 carbon atoms, in another embodiment at least about 21 carbon atoms, in yet another embodiment at least about 22 carbon atoms, in still another embodiment at least about 23 carbon atoms, in another embodiment at least about 24 carbon atoms, in yet another embodiment at least about 25 carbon atoms, in still another embodiment at least about 26 carbon atoms, in another embodiment at least about 27 carbon atoms, in yet another embodiment at least about 28 carbon atoms, in still another embodiment at least about 29 carbon atoms, in another embodiment at least about 30 carbon atoms, in yet another embodiment at least about 31 carbon atoms, and in still another embodiment at least about 32 carbon atoms, or (iii) an alkylaryl group having at least about 14 carbon atoms, wherein the alkyl portion thereof has in one embodiment at least about 8 carbon atoms, in another embodiment at least about 9 carbon atoms, in yet another embodiment at least about 10 carbon atoms, in still another embodiment at least about 11 carbon atoms, in another embodiment at least about 12 carbon atoms, in yet another embodiment at least about 13 carbon atoms, in still another embodiment at least about 14 carbon atoms, in another embodiment at least about 15 carbon atoms, in yet another embodiment at least about 16 carbon atoms, in still another embodiment at least about 17 carbon atoms, in another embodiment at least about 18 carbon atoms, in yet another embodiment at least about 19 carbon atoms, in still another embodiment at least about 20 carbon atoms, in another embodiment at least about 21 carbon atoms, in yet another embodiment at least about 22 carbon atoms, in still another embodiment at least about 23 carbon atoms, in another embodiment at least about 24 carbon atoms, in yet another embodiment at least about 25 carbon atoms, in still another embodiment at least about 26 carbon atoms, in another embodiment at least about 27 carbon atoms, in yet another embodiment at least about 28 carbon atoms, in still another embodiment at least about 29 carbon atoms, in another embodiment at least about 30 carbon atoms, in yet another embodiment at least about 31 carbon atoms, and in still another embodiment at least about 32 carbon atoms.

The above formula encompasses monomeric materials. In addition, the above formula encompasses dimeric materials containing two moieties of the formula

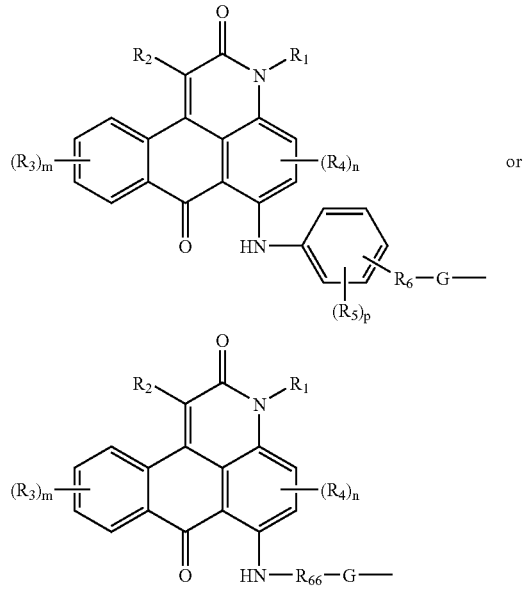

or

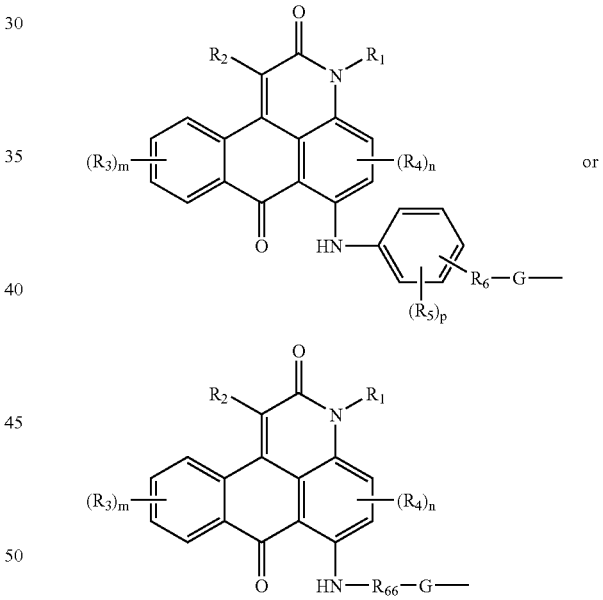

or wherein each G, independently of the other, is (1) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (2) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, (3) an arylalkylene group (including unsubstituted and substituted arylalkylene groups, and wherein hetero atoms, such as oxygen, nitrogen, sulfur, silicon, phosphorus, and the like either may or may not be present in either or both of the aryl and the alkyl portions of the arylalkylene group), in one embodiment with at least about 6 carbon atoms, and in another embodiment with at least about 7 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, such as benzylene or the like, including (a) arylalkylene groups wherein both the aryl and the alkyl portions form the linkage between the two moieties, such as

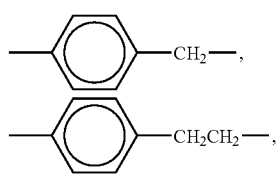

the like, and (b) arylalkylene groups wherein only the alkyl portion forms the linkage between the two

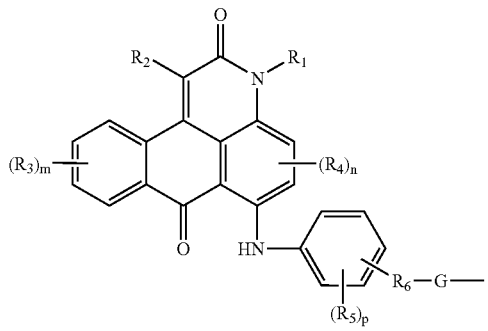

or

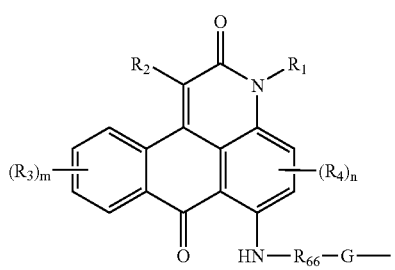

moieties, such as

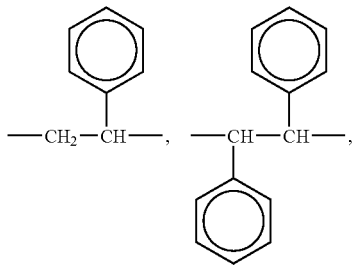

and the like, (4) an alkylarylene group (including unsubstituted and substituted alkylarylene groups, and wherein hetero atoms, such as oxygen, nitrogen, sulfur, silicon, phosphorus, and the like either may or may not be present in either or both of the aryl and the alkyl portions of the alkylarylene group), in one embodiment with at least about 6 carbon atoms, and in another embodiment with at least about 7 carbon atoms, and in one embodiment with no more than about 50 carbon atoms, in another embodiment with no more than about 18 carbon atoms, in yet another embodiment with no more than about 12 carbon atoms, although the number of carbon atoms can be outside of these ranges, such as tolylene, phenylethylene, or the like, including (a) alkylarylene groups wherein both the aryl and the alkyl portions form the linkage between the two

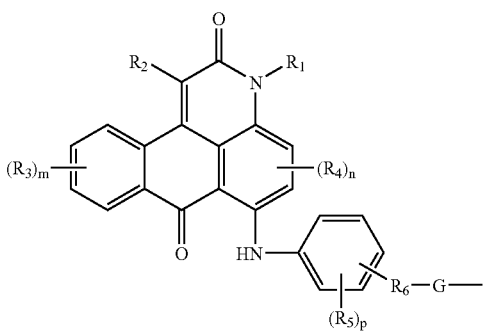

or

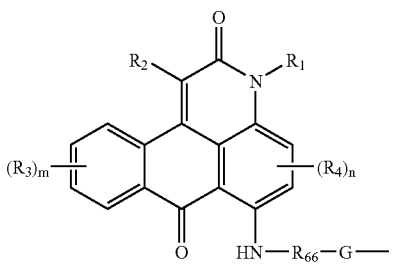

moieties, such as

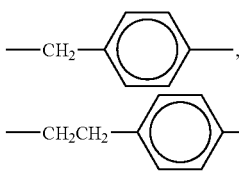

and the like, and (b) alkylarylene groups wherein only the aryl portion forms the linkage between the two

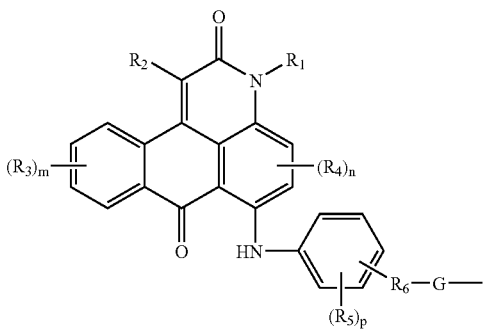

or

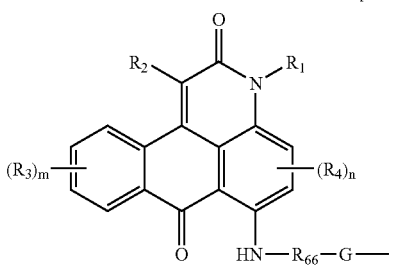

moieties, such as

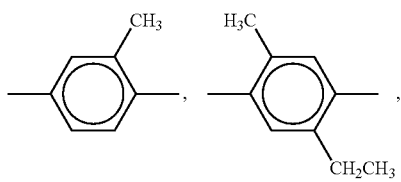

and the like, (5) a group of the formula

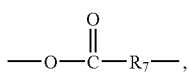

(6) a group of the formula

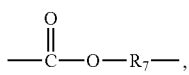

(7) a group of the formula

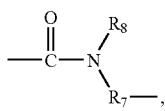

or (8) a group of the formula

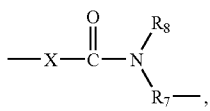

wherein each $R_7$, independently of the other, is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (ii) an arylene group (including substituted and unsubstituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an arylalkylene group (including substituted and unsubstituted arylalkylene groups, and wherein hetero atoms, such as oxygen, nitrogen, sulfur, silicon, phosphorus, and the like either may or may not be present in either the aryl or the alkyl portion of the arylalkylene group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzylene or the like, or (iv) an alkylarylene group (including substituted and unsubstituted alkylarylene groups, and wherein hetero atoms, such as oxygen, nitrogen, sulfur, silicon, phosphorus, and the like either may or may not be present in either the alkyl or the aryl portion of the alkylarylene group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolylene or the like, each $R_8$, independently of the other, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, each X, independently of the other, is —O— or —NR$_9$—, and each R$_9$, independently of the other, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as benzyl or the like, or (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 50 carbon atoms, in another embodiment with no more than about 18 carbon atoms, and in yet another embodiment with no more than about 12 carbon atoms, although the number of carbon atoms can be outside of these ranges, such as tolyl or the like, and wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

It should be noted that since hetero atoms can be present in the alkyl, alkylene, aryl, arylene, arylalkyl, arylalkylene, alkylaryl, and alkylarylene groups, these groups also include alkoxy, alkyleneoxy, aryloxy, aryleneoxy, arylalkyloxy, arylalkyleneoxy, alkylaryloxy, alkylaryleneoxy, and the like, including those wherein an oxygen atom thereof is the point of attachment of the R group, and including (but not limited to) those of the formulae

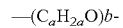

wherein a is an integer representing the number of carbon atoms in the alkyleneoxy, aryleneoxy, arylalkyleneoxy, or alkylaryleneoxy group, being in various embodiments 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, although the value of a can be outside of these ranges, b is an integer representing the number of repeat alkyleneoxy, aryleneoxy, arylalkyleneoxy, or alkylaryleneoxy groups, being in one embodiment at least 1, in another embodiment at least about 2, in yet another embodiment at least about 5, and in still another embodiment at least about 10, and being in one embodiment no more than about 200, in another embodiment no more than about 150, in yet another embodiment no more than about 100, and in still another embodiment no more than about 50, although the value of b can be outside of these ranges.

Further, since hetero atoms can be present in these groups, these groups also include heterocyclic groups.

Examples of such dimeric materials include (but are not limited to) those of the formulae

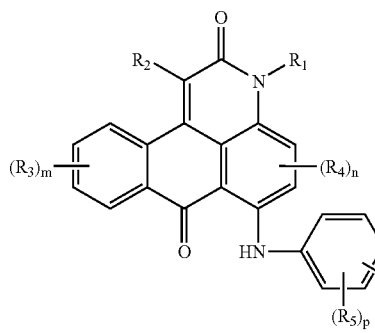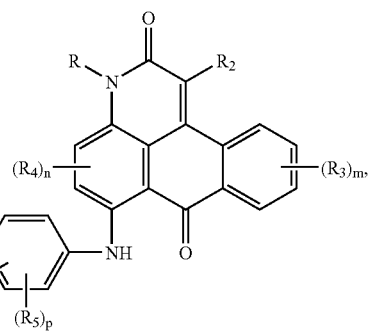

-continued
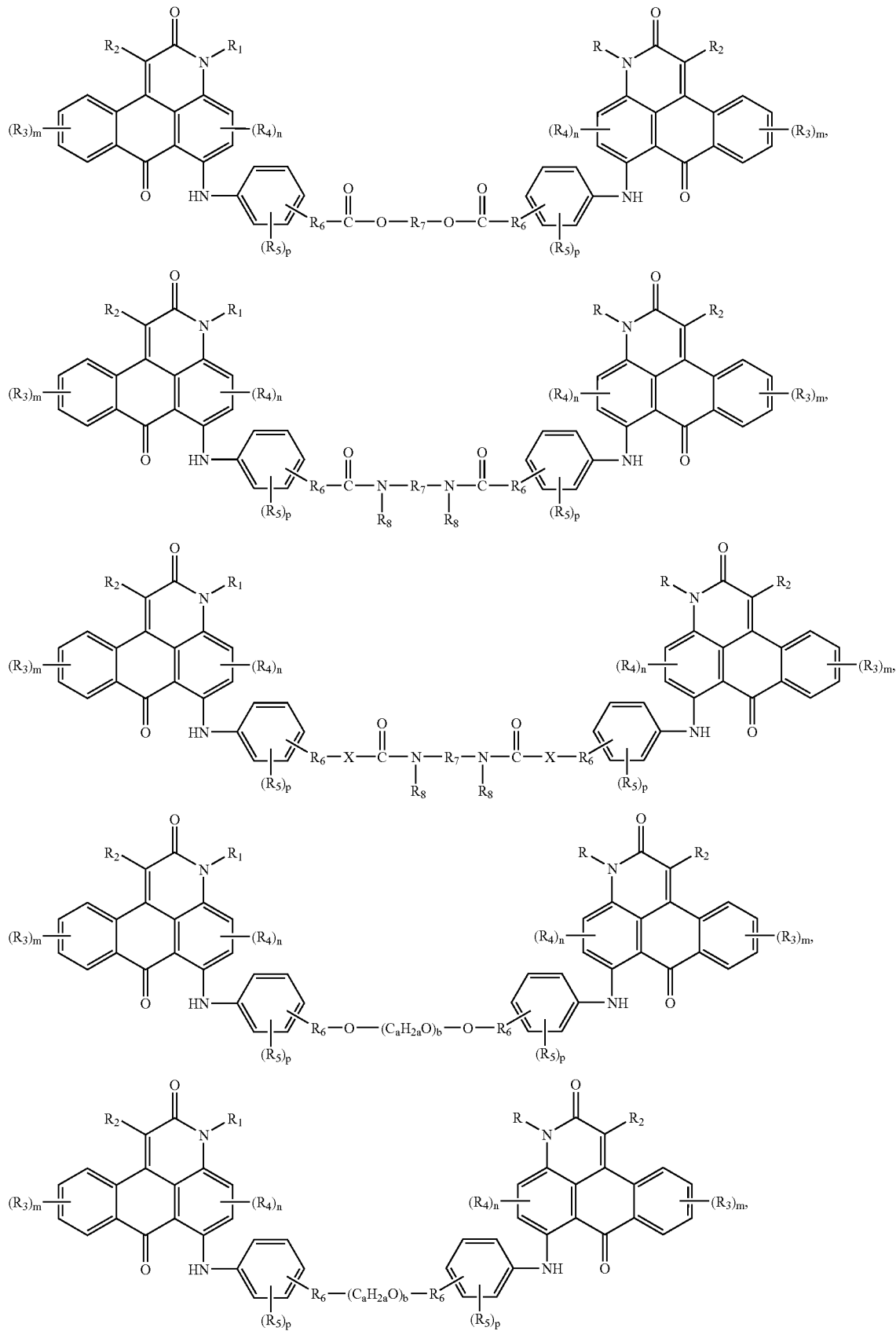

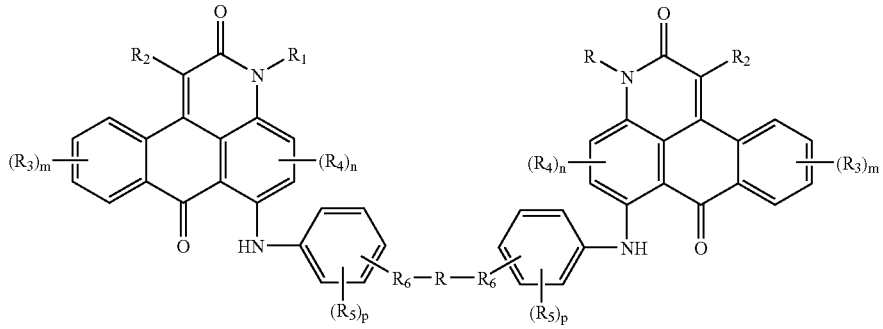
wherein R represents an alkyl, aryl, arylalkyl, or alkylaryl group as defined hereinabove having no substituents thereon and no hetero atoms therein,
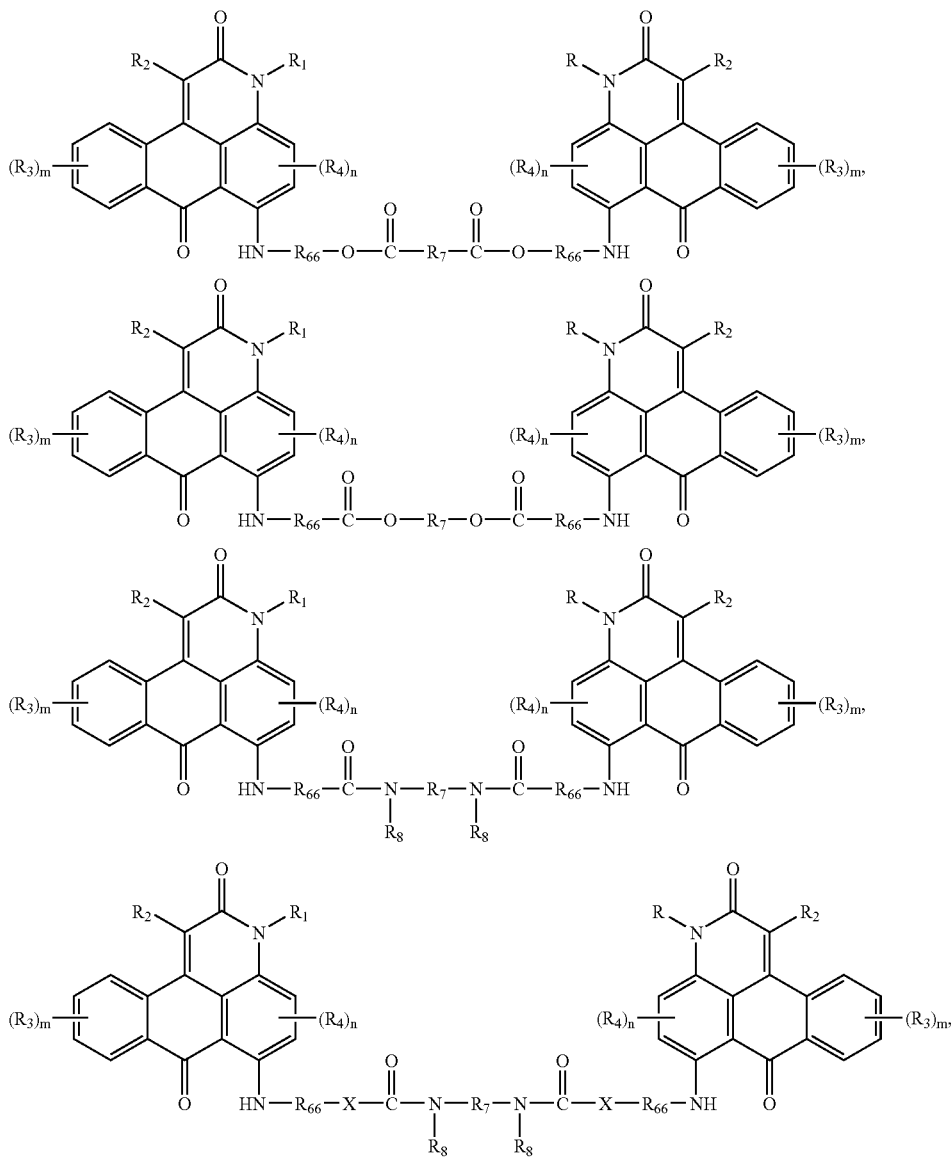

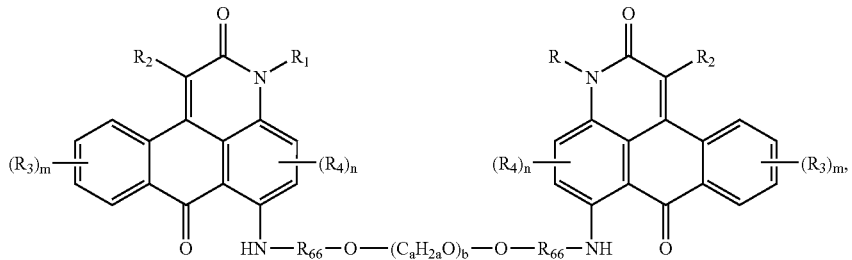

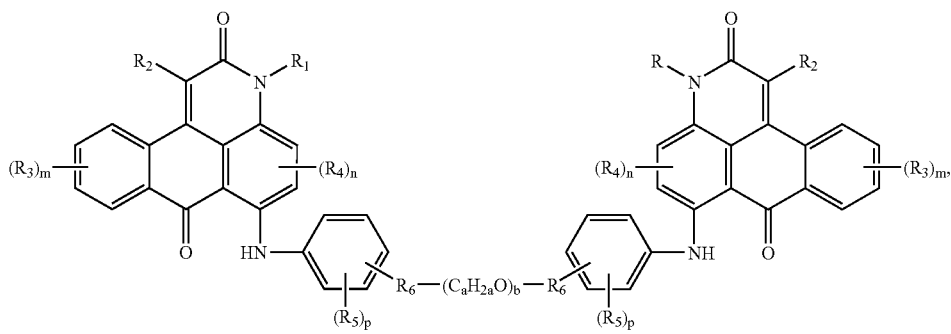

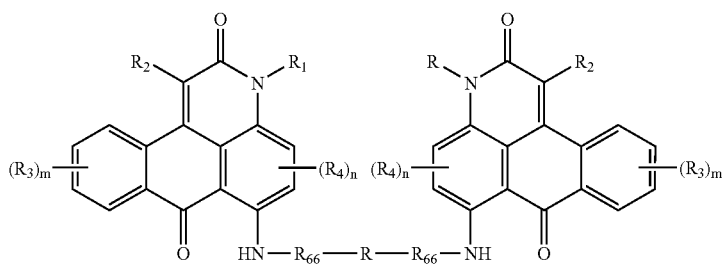

wherein R represents an alkyl, aryl, arylalkyl, or alkylaryl group as defined hereinabove having no substituents thereon and no hetero atoms therein, and the like.

Similarly, the above formula encompasses trimeric, tetrameric, and higher moieties as well as oligomeric materials and polymeric materials, said materials containing three or more moieties of the formula

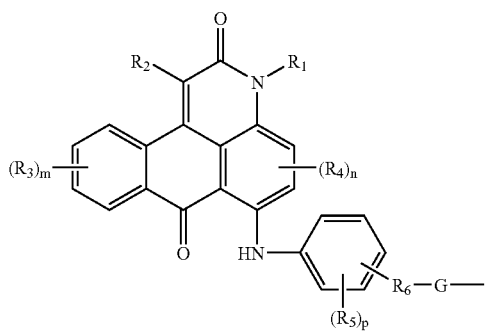

or

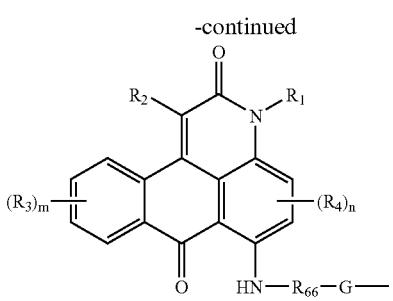

wherein each $R_1$, $R_2$, $R_3$, $R_4$, $R_5$, $R_6$, $R_{66}$, G, m, n, and p, independently of the others, has the definitions for $R_1$, $R_2$, $R_3$, $R_4$, $R_5$, $R_6$, $R_{66}$, G, m, n, and p set forth hereinabove and can be either the same as or different from one another, said moieties being linked by a central atom or group of atoms or bonded to a polymeric chain. These materials can be made by processes analogous to those illustrated herein for the monomeric and dimeric compounds.

The compounds disclosed herein can be any of a wide variety of colors. In one specific embodiment, the compound is of a red color. In another specific embodiment, the compound is of a magenta color.

The colorant compounds disclosed herein can be prepared by any desired or effective method. Starting materials such as 4-bromo-1:9-N-methylanthrapyridone, can be prepared as disclosed in, for example, "British Intelligence Objectives Subcommittee Report 1484", Publication Board No. 86139, Library of Congress, Washington, D.C., 1947, p. 46–47, the disclosure of which is totally incorporated by reference. This material is also commercially available from, for example, Hangsu Aolunda High Tech Industry Co. Ltd., Shanghai, China. Further background on syntheses of starting materials and related compounds is disclosed in, for example, U.S. Pat. No. 6,152,969, U.S. Pat. No. 5,340,910, U.S. Pat. No. 4,386,206, U.S. Pat. No. 4,745,174, and U.S. Pat. No. 2,644,821, the disclosures of each of which are totally incorporated herein by reference.

Compounds of the formula

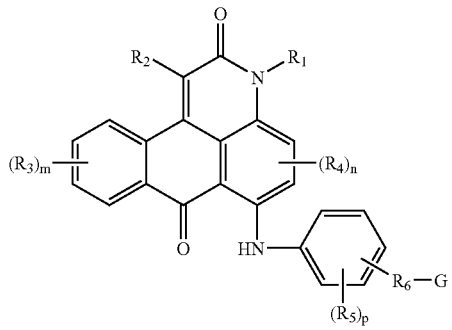

and compounds of the formula

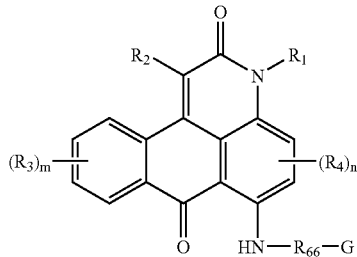

can be prepared by analogous processes. Hereinafter, exemplary synthetic methods will be provided for compounds of the formula

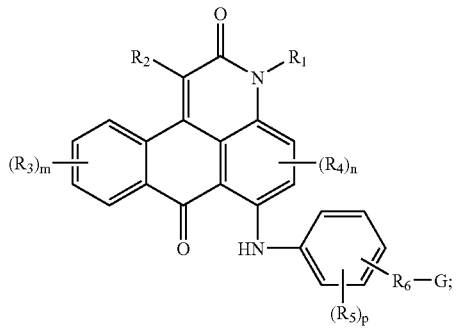

it is to be understood that these methods can also be used to prepare compounds of the formula

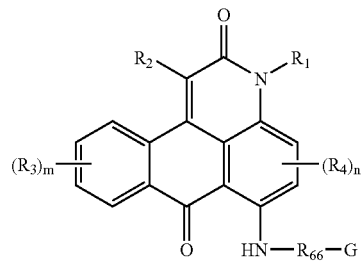

by employing analogous starting materials.

Compounds of the formula

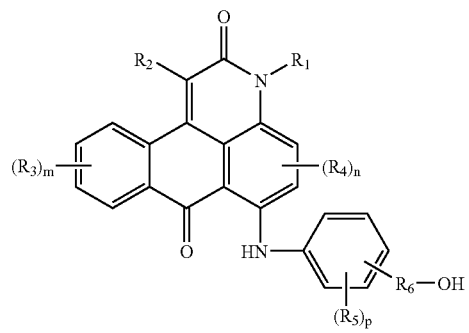

can be prepared from brominated compounds of the formula

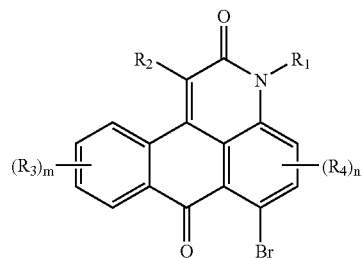

by reacting the brominated starting material with the corresponding aminobenzene having the desired alcohol group of the formula —R$_6$OH in the presence of a base and heating, as follows:

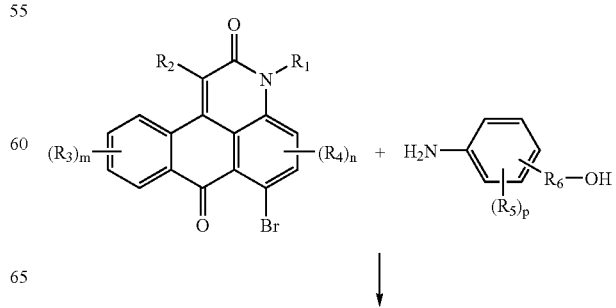

-continued

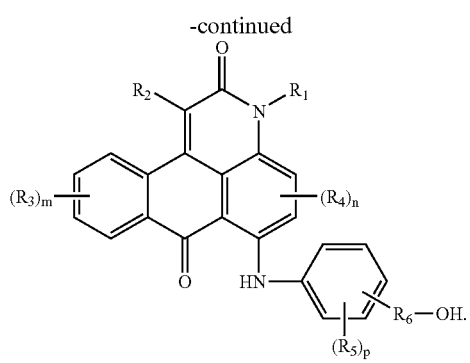

The brominated starting material and the aminobenzene are present in any desired or effective relative amounts, in one embodiment at least about 1 mole of aminobenzene per every one mole of brominated starting material, in another embodiment at least about 5 moles of aminobenzene per every one mole of brominated starting material, and in yet another embodiment at least about 12 moles of aminobenzene per every one mole of brominated starting material, and in one embodiment no more than about 20 moles of aminobenzene per every one mole of brominated starting material, in another embodiment no more than about 15 moles of aminobenzene per every one mole of brominated starting material, and in yet another embodiment no more than about 13 moles of aminobenzene per every one mole of brominated starting material, although the relative amounts of aminobenzene and brominated starting material can be outside of these ranges.

Any desired or effective base can be employed. Examples of suitable bases include (but are not limited to) sodium carbonate, potassium carbonate, calcium carbonate, calcium oxide, zinc oxide, and the like, as well as mixtures thereof. The base is present in any desired or effective amount, in one embodiment at least about 0.5 mole of base per every one mole of brominated starting material, in another embodiment at least about 1 mole of base per every one mole of brominated starting material, and in yet another embodiment at least about 2 moles of base per every one mole of brominated starting material, and in one embodiment no more than about 5 moles of base per every one mole of brominated starting material, in another embodiment no more than about 4 moles of base per every one mole of brominated starting material, and in yet another embodiment no more than about 3 moles of base per every one mole of brominated starting material, although the relative amounts of aniline and brominated starting material can be outside of these ranges.

Optionally, if desired, a catalyst for the reaction can be employed, such as a copper salt, including (but not limited to) cupric acetate, copper sulfate, copper II acetate monohydrate, copper powder, and the like, in any desired or effective amount.

While not required, if desired, an optional solvent can be employed. If used, any desired or effective solvent can be used, including polar aprotic solvents such as N-methyl pyrrolidinone, dimethyl formamide, dimethyl sulfoxide, sulfolane, or the like, as well as mixtures thereof, in any desired or effective amount, in one embodiment in a ratio by weight of at least about 1 part by weight brominated starting material per every hundred parts by weight solvent, and in one embodiment in a ratio by weight of no more than about 20 parts by weight brominated starting material per every hundred parts by weight solvent, although the relative amounts of solvent and brominated starting material can be outside of these ranges.

The reaction mixture containing the aminobenzene and the brominated starting material is heated to any desirable or effective temperature to effect the reaction, in one embodiment at least about 100° C., in another embodiment at least about 120° C., and in yet another embodiment at least about 180° C., and in one embodiment no more than about 250° C., in another embodiment no more than about 200° C., and in yet another embodiment no more than about 190° C., although the temperature can be outside of these ranges.

The reaction between the aminobenzene and the brominated starting material is allowed to proceed for any desired or effective period of time, in one embodiment at least about 10 minutes, in another embodiment at least about 1 hour, and in yet another embodiment at least about 1.5 hour, and in one embodiment no more than about 4 days, in another embodiment no more than about 1 day, and in yet another embodiment no more than about 2 hours, although the reaction time can be outside of these ranges.

Upon completion of the reaction, the compound of the formula

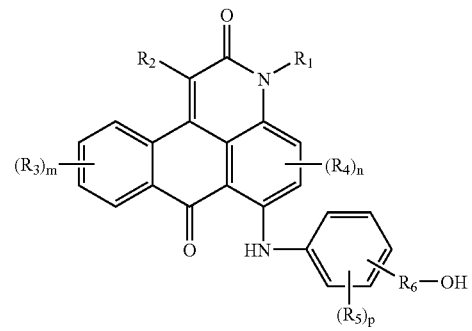

can be recovered by quenching the reaction mixture with a mixture of acid and water, followed by filtration, washing, and drying. Any desired or effective acid can be employed, such as hydrochloric acid, sulfuric acid, phosphoric acid, or the like, as well as mixtures thereof, in any desired or effective concentration, in one specific embodiment at least about 1 percent by weight acid in water, and in one specific embodiment no more than about 20 percent by weight acid in water, although the concentration can be outside of these ranges.

The alcohol-substituted compound of the formula

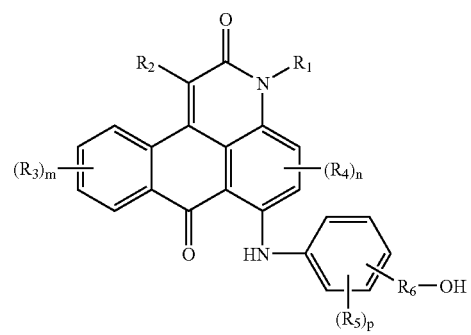

can be converted to an ester-substituted compound of the formula

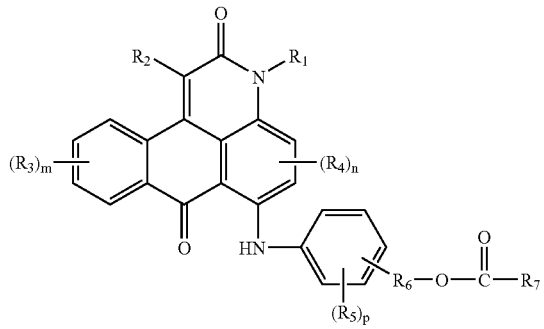

by preparing a reaction mixture by admixing (1) the alcohol-substituted compound, (2) a solvent, and (3) an esterification compound such as an anhydride of the formula

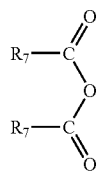

in which reaction mixture upon heating is formed an ester-substituted compound as follows

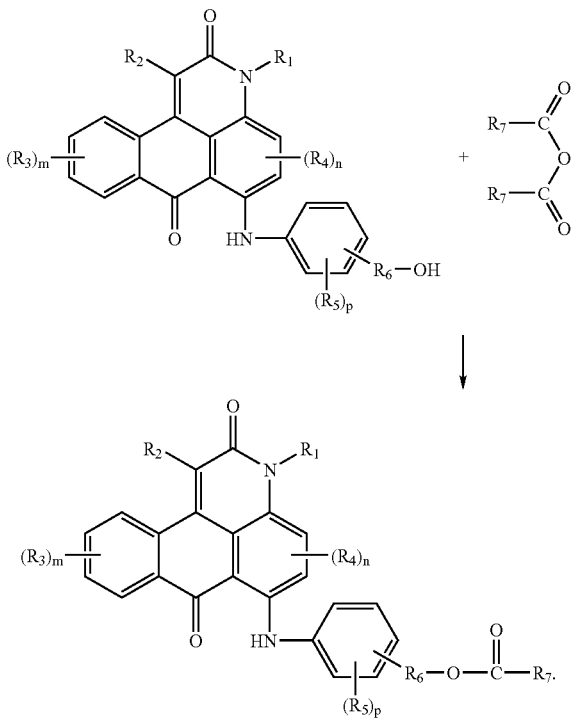

The alcohol-substituted compound and the anhydride are present in any desired or effective relative amounts, in one embodiment at least about 1 mole of anhydride per every one mole of alcohol-substituted compound, and in one embodiment no more than about 1.1 moles of anhydride per every one mole of alcohol-substituted compound, although the amount of anhydride can be outside of these ranges.

Examples of suitable solvents include acetic acid, propionic acid, formic acid, butyric acid, dimethyl formamide, dimethyl sulfoxide, hexamethyl phosphorus triamide (HMPA), tetrahydrofuran, or the like, as well as mixtures thereof. The solvent is present in any desired or effective amount, in one embodiment at least about 25 grams of alcohol-substituted compound per every one liter of solvent, and in another embodiment at least about 100 grams of alcohol-substituted compound per every one liter of solvent, and in one embodiment no more than about 200 grams of alcohol-substituted compound per every one liter of solvent, although the amount of solvent can be outside of these ranges.

The reaction mixture containing the alcohol-substituted compound, the solvent, and the anhydride is heated to any desirable or effective temperature, in one embodiment at least about 25° C., and in another embodiment at least about 40° C., and in one embodiment no more than about 100° C., and in another embodiment no more than about 60° C., although the temperature can be outside of these ranges.

The reaction mixture containing the alcohol-substituted compound, the solvent, and the anhydride is heated for any desirable or effective period of time, in one embodiment at least about 2.5 hours, and in another embodiment at least about 3 hours, and in one embodiment no more than about 5 hours, although the heating time can be outside of these ranges. Reaction completion can be determined by thin layer chromatography of the reaction mixture to detect the presence of unreacted reactants.

The alcohol-substituted compound of the formula

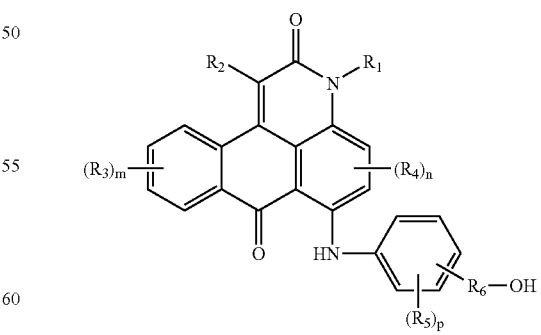

can also be converted to an ester-substituted compound of the formula

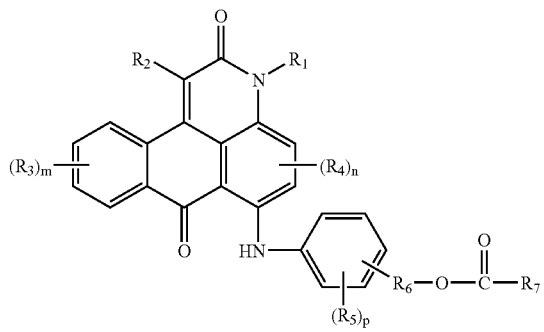

by admixing (1) the alcohol-substituted compound, (2) an esterification compound such as a carboxylic acid of the formula $R_7COOH$, (3) a solvent, and (4) an optional esterification catalyst and heating the reaction mixture, as follows:

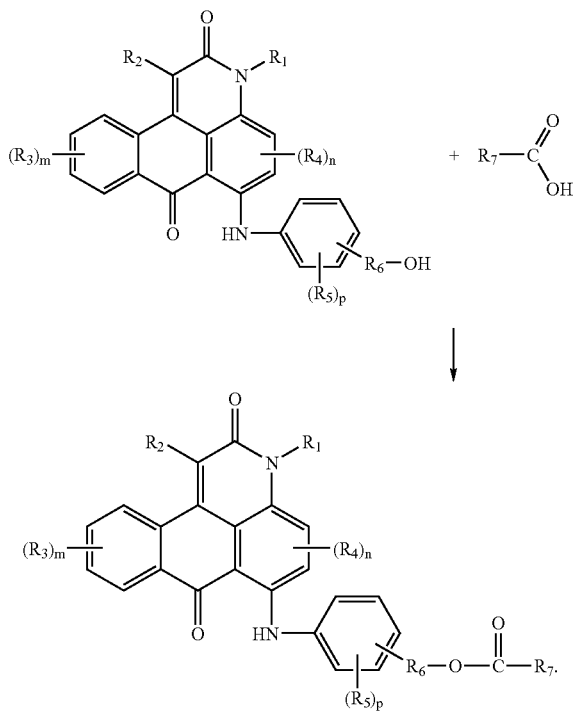

The alcohol-substituted compound and the carboxylic acid are present in any desired or effective relative amounts, in one embodiment at least about 0.9 mole of carboxylic acid per every one mole of alcohol-substituted compound, in another embodiment at least about 0.95 mole of carboxylic acid per mole of alcohol-substituted compound, and in yet another embodiment at least about 1 mole of carboxylic acid per mole of alcohol-substituted compound, and in one embodiment no more than about 2 moles of carboxylic acid per mole of alcohol-substituted compound, in another embodiment no more than about 1.05 moles of carboxylic acid per mole of alcohol-substituted compound, and in yet another embodiment no more than about 1 mole of carboxylic acid per mole of alcohol-substituted compound, although the relative amounts of carboxylic acid and alcohol-substituted compound can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of alcohol-substituted compound, and in one embodiment no more than about 0.5 mole of esterification catalyst per mole of alcohol-substituted compound, although the amount of esterification catalyst can be outside of these ranges.

Any desired or effective solvent can be used. Examples of suitable solvents include xylene, toluene, benzene, chlorobenzene, nitrobenzene, dichlorobenzene, and the like, as well as mixtures thereof. The reactants are present in the solvent in any desired or effective amount, in one embodiment at least about 25 grams of alcohol-substituted compound per every one liter of solvent, in another embodiment at least about 50 grams of alcohol-substituted compound per every one liter of solvent, and in yet another embodiment at least about 100 grams of alcohol-substituted compound per every one liter of solvent, and in one embodiment no more than about 200 grams of alcohol-substituted compound per every one liter of solvent, in another embodiment no more than about 150 grams of alcohol-substituted compound per every one liter of solvent, and in yet another embodiment no more than about 100 grams of alcohol-substituted compound per every one liter of solvent, although the amount of solvent can be outside of these ranges.

The reaction mixture containing the alcohol-substituted compound, the carboxylic acid, the solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the alcohol-substituted compound, the carboxylic acid, the solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The compound of the formula

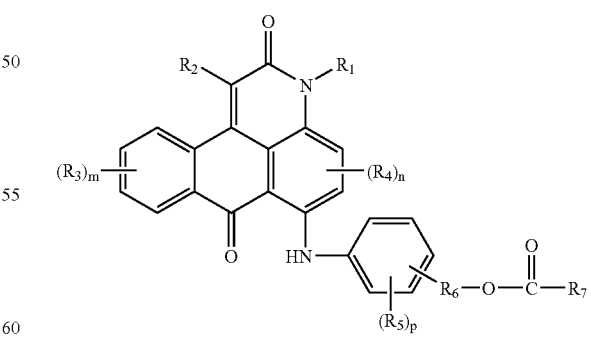

can be recovered from the reaction mixture as a solid by filtration, followed by washing and drying. If desired, purification can be carried out by filtration, redissolution in the solvent, heating, cooling, precipitating the compound from the solution, filtering, washing the compound with a solvent such as methanol, ethanol, or the like, and repeating this cycle until thin layer chromatography of the collected solid indicates that there is no detectable unreacted reactant present in the solid.

The alcohol-substituted compound of the formula

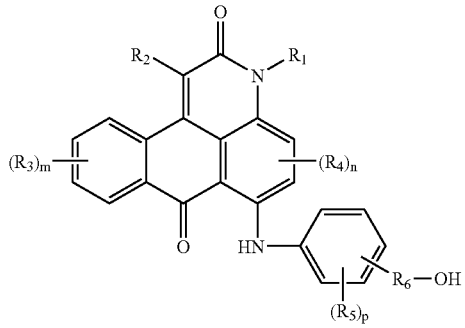

can be converted to a urethane-substituted compound of the formula

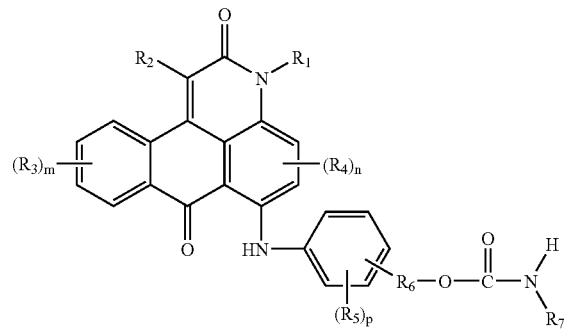

by reacting the alcohol-substituted compound with an isocyanate, as follows:

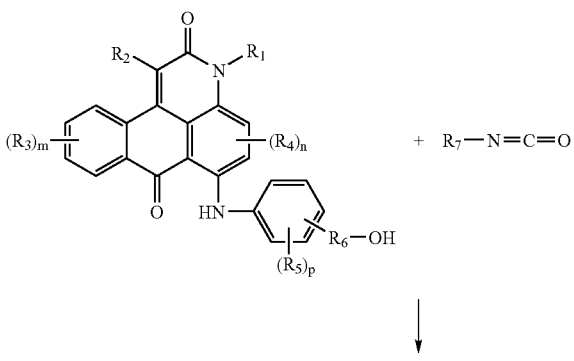

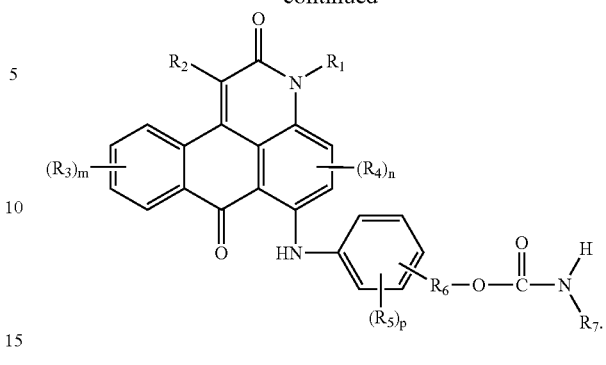

Isocyanates react with alcohols to form urethanes. For example, a monoisocyanate reacts with an alcohol to form a urethane as follows:

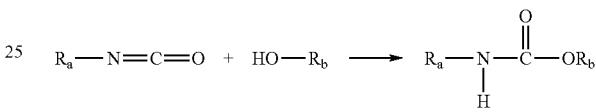

wherein $R_a$ and $R_b$ each, independently of the other, is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from about 5 to about 100 carbon atoms, although the number of carbon atoms can be outside of this range, an aryl group (including unsubstituted and substituted aryl groups, and wherein hetero atoms, such as oxygen, nitrogen, sulfur, silicon, phosphorus, and the like either may or may not be present in the aryl group), typically with from about 5 to about 20 carbon atoms, although the number of carbon atoms can be outside of this range, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), typically with from about 6 to about 50 carbon atoms, although the number of carbon atoms can be outside of this range, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), typically with from about 6 to about 50 carbon atoms, although the number of carbon atoms can be outside of this range, and wherein the substituents on the substituted alkyl, alkylene, aryl, arylene, arylalkyl, arylalkylene, alkylaryl, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, mixtures thereof, and the like, wherein two or more substituents can be joined together to form a ring. Diisocyanates react similarly; for example, isophorone diisocyanate reacts with two moles of alcohol to form a diurethane as follows:

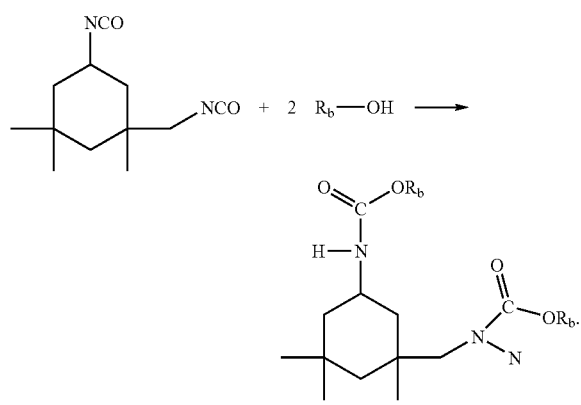

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI); hexamethylene-1, 6-diisocyanate; naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylol-propane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Any suitable reaction condition for making urethane compounds by condensing alcohols with isocyanates can be used to prepare the urethane-substituted compounds. Typically (although not necessarily), the reaction is carried out at elevated temperatures (for example, from about 60 to about 160° C.) in the presence of an optional urethane reaction catalyst, such as dibutyl tin dilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol-substituted colorant typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules in the antioxidant-containing material, or the like. When doing these adjustments, the different reactivities to isocyanates of alcohols versus amines can be employed, as well as the different reactivities of the two separate isocyanate groups on IPDI. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, the disclosures of each of which are totally incorporated herein by reference, which provide further explanation of this chemistry.

Compounds of the formula

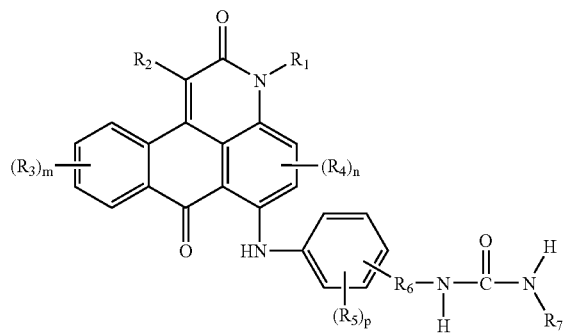

can be prepared by first preparing a urea-substituted precursor from a diamino compound by reacting the diamino compound with an isocyanate, either neat or, optionally, in the presence of a solvent, as follows:

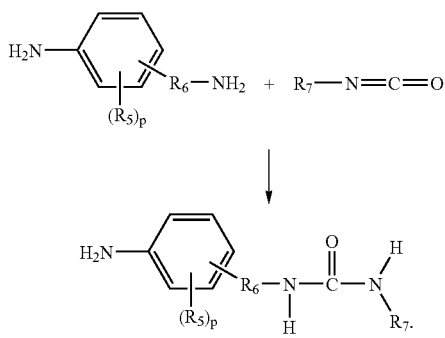

Thereafter, the resulting urea precursor can be reacted with a brominated compound of the formula

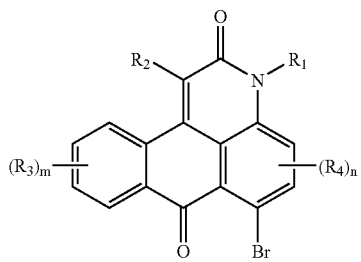

by reacting the brominated starting material with the urea precursor in the presence of a base and an optional catalyst and heating, as follows:

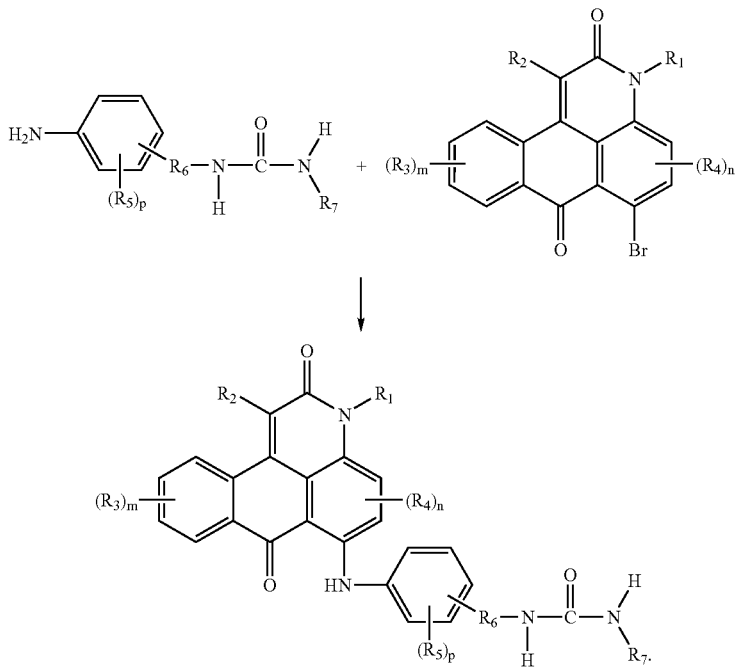

The diamino compound and the isocyanate are present in any desired or effective relative amounts, in one embodiment at least about 0.85 mole of isocyanate group per every one mole of diamino compound, in another embodiment at least about 0.95 mole of isocyanate group per every one mole of diamino compound, and in yet another embodiment at least about 0.99 mole of isocyanate group per every one mole of diamino compound, and in one embodiment no more than about 1.02 moles of isocyanate group per every one mole of diamino compound, in another embodiment no more than about 1.01 moles of isocyanate group per every one mole of diamino compound, and in yet another embodiment no more than about 1.005 moles of isocyanate group per every one mole of diamino compound, although the relative amounts of diamino compound and isocyanate group can be outside of these ranges.

The brominated starting material and the urea precursor are present in any desired or effective relative amounts, in one embodiment at least about 1 mole of urea precursor per every one mole of brominated starting material, in another embodiment at least about 5 moles of urea precursor per every one mole of brominated starting material, and in yet another embodiment at least about 12 moles of urea precursor per every one mole of brominated starting material, and in one embodiment no more than about 20 moles of urea precursor per every one mole of brominated starting material, in another embodiment no more than about 15 moles of urea precursor per every one mole of brominated starting material, and in yet another embodiment no more than about 13 moles of urea precursor per every one mole of brominated starting material, although the relative amounts of urea precursor and brominated starting material can be outside of these ranges.

Any desired or effective base can be employed. Examples of suitable bases include (but are not limited to) sodium carbonate, potassium carbonate, calcium carbonate, calcium oxide, zinc oxide, and the like, as well as mixtures thereof. The base is present in any desired or effective amount, in one embodiment at least about 0.5 mole of base per every one mole of brominated starting material, in another embodiment at least about 1 mole of base per every one mole of brominated starting material, and in yet another embodiment at least about 2 moles of base per every one mole of brominated starting material, and in one embodiment no more than about 5 moles of base per every one mole of brominated starting material, in another embodiment no more than about 4 moles of base per every one mole of brominated starting material, and in yet another embodiment no more than about 3 moles of base per every one mole of brominated starting material, although the relative amounts of base and brominated starting material can be outside of these ranges.

When an optional solvent is employed for the reaction between the brominated starting material and the urea precursor, any desired or effective solvent can be employed, such as xylene, toluene, benzene, chlorobenzene, nitrobenzene, dichlorobenzene, N-methyl pyrrolidinone, dimethyl formamide, dimethyl sulfoxide, sulfolane, hexanol, octanol, or the like, as well as mixtures thereof.

When an optional catalyst is employed, any desired or effective catalyst can be employed, including copper salts, such as cupric acetate, copper sulfate, copper II acetate monohydrate, copper powder, and the like, as well as mixtures thereof.

The reaction mixture containing the brominated starting material, the urea precursor, the optional solvent, the base, and the optional catalyst is heated to any desired or effective temperature, typically the reflux temperature of the selected solvent, in one embodiment at least about 100° C., and in one embodiment no more than about 200° C., although the temperature can be outside of these ranges.

The reaction mixture is heated for any desired or effective period of time, in one embodiment at least about 2 hours, and in another embodiment at least about 24 hours, and in one embodiment no more than about 72 hours, and in another embodiment no more than about 48 hours, although the heating time can be outside of these ranges.

The urea-substituted colorant compound can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

Compounds of the formula

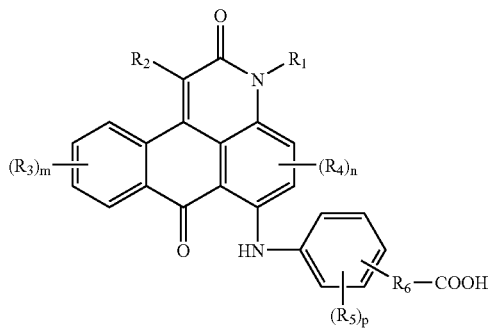

can be prepared from brominated compounds of the formula

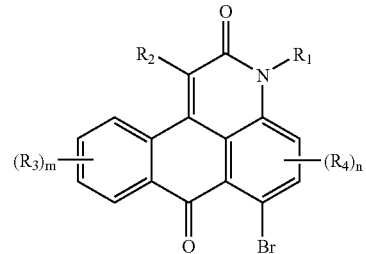

by reacting the brominated starting material with the corresponding aminobenzene having the desired acid group of the formula —$R_6$COOH, generally with an excess of the aminobenzene adduct, either neat or, optionally, in the presence of a solvent, at elevated temperatures. Workup usually entails quenching in water if run neat or in a water soluble solvent, filtering, washing, and drying, or if run in a water insoluble solvent, cooling and allowing the product to precipitate followed by filtering, washing, and drying. The reaction proceeds as follows:

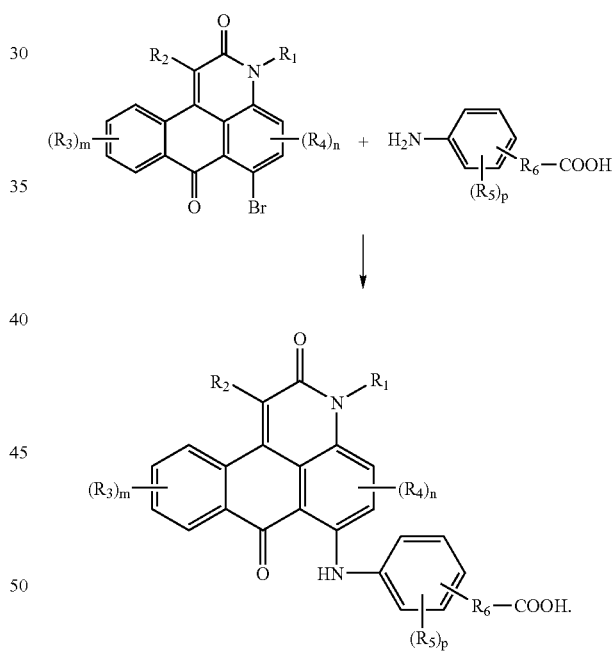

The brominated starting material and the aminobenzene are present in any desired or effective relative amounts, in one embodiment at least about 1 mole of aminobenzene per every one mole of brominated starting material, in another embodiment at least about 5 moles of aminobenzene per every one mole of brominated starting material, and in yet another embodiment at least about 12 moles of aminobenzene per every one mole of brominated starting material, and in one embodiment no more than about 20 moles of aminobenzene per every one mole of brominated starting material, in another embodiment no more than about 15 moles of aminobenzene per every one mole of brominated starting material, and in yet another embodiment no more than about 13 moles of aminobenzene per every one mole of brominated starting material, although the relative amounts of aminobenzene and brominated starting material can be outside of these ranges.

Any desired or effective base can be employed. Examples of suitable bases include (but are not limited to) sodium carbonate, potassium carbonate, calcium carbonate, calcium oxide, zinc oxide, and the like, as well as mixtures thereof. The base is present in any desired or effective amount, in one embodiment at least about 0.5 mole of base per every one mole of brominated starting material, in another embodiment at least about 1 mole of base per every one mole of brominated starting material, and in yet another embodiment at least about 2 moles of base per every one mole of brominated starting material, and in one embodiment no more than about 5 moles of base per every one mole of brominated starting material, in another embodiment no more than about 4 moles of base per every one mole of brominated starting material, and in yet another embodiment no more than about 3 moles of base per every one mole of brominated starting material, although the relative amounts of aniline and brominated starting material can be outside of these ranges.

Optionally, if desired, a catalyst for the reaction can be employed, such as a copper salt, including (but not limited to) cupric acetate, copper sulfate, copper II acetate monohydrate, copper powder, and the like, in any desired or effective amount.

While not required, if desired, an optional solvent can be employed. If used, any desired or effective solvent can be used, including polar aprotic solvents such as N-methyl pyrrolidinone, dimethyl formamide, dimethyl sulfoxide, sulfolane, or the like, as well as mixtures thereof, in any desired or effective amount, in one embodiment in a ratio by weight of at least about 1 part by weight brominated starting material per every hundred parts by weight solvent, and in one embodiment in a ratio by weight of no more than about 20 parts by weight brominated starting material per every hundred parts by weight solvent, although the relative amounts of solvent and brominated starting material can be outside of these ranges.

The reaction mixture containing the aminobenzene and the brominated starting material is heated to any desirable or effective temperature to effect the reaction, in one embodiment at least about 100° C., in another embodiment at least about 120° C., and in yet another embodiment at least about 180° C., and in one embodiment no more than about 250° C., in another embodiment no more than about 200° C., and in yet another embodiment no more than about 190° C., although the temperature can be outside of these ranges.

The reaction between the aminobenzene and the brominated starting material is allowed to proceed for any desired or effective period of time, in one embodiment at least about 10 minutes, in another embodiment at least about 1 hour, and in yet another embodiment at least about 1.5 hour, and in one embodiment no more than about 4 days, in another embodiment no more than about 1 day, and in yet another embodiment no more than about 2 hours, although the reaction time can be outside of these ranges.

Upon completion of the reaction, the compound of the formula

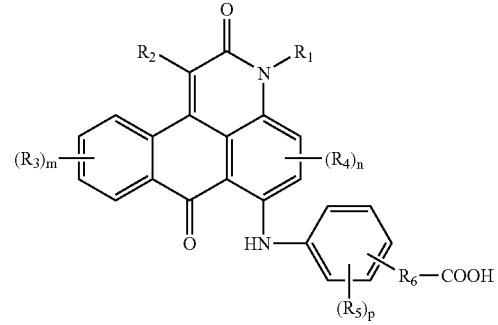

can be recovered by quenching the reaction mixture with a mixture of acid and water, followed by filtration, washing, and drying. Any desired or effective acid can be employed, such as hydrochloric acid, sulfuric acid, phosphoric acid, or the like, as well as mixtures thereof, in any desired or effective concentration, in one specific embodiment at least about 1 percent by weight acid in water, and in one specific embodiment no more than about 20 percent by weight acid in water, although the concentration can be outside of these ranges.

The acid-substituted compound of the formula

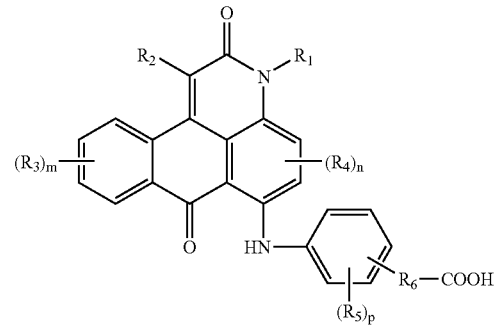

can be converted to an ester-substituted compound of the formula

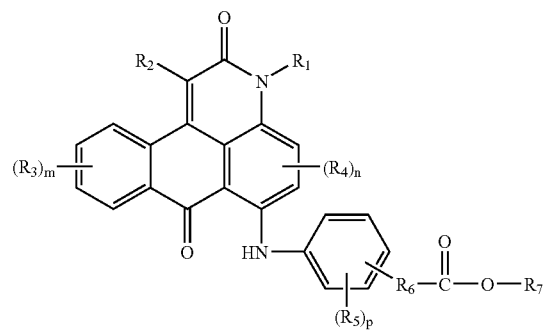

by reacting the acid-substituted compound with an alcohol of the formula $R_7$—OH, an optional solvent, and an optional esterification catalyst and heating, as follows:

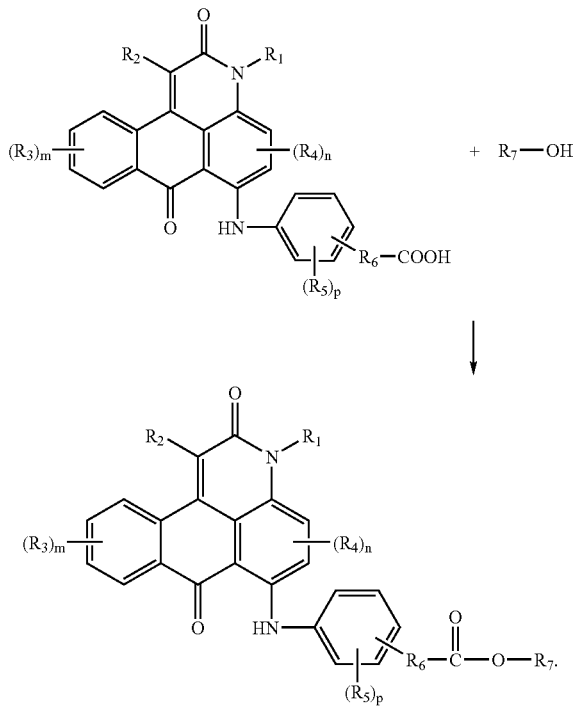

The acid-substituted compound and the alcohol are present in any desired or effective relative amounts, in one embodiment at least about 1 mole of alcohol per every one mole of acid-substituted compound, in another embodiment at least about 1.05 moles of alcohol per every one mole of acid-substituted compound, and in yet another embodiment at least about 1.1 moles of alcohol per every one mole of acid-substituted compound, and in one embodiment no more than about 2 moles of alcohol per every one mole of acid-substituted compound, in another embodiment no more than about 1.5 moles of alcohol per every one mole of acid-substituted compound, and in yet another embodiment no more than about 1.25 moles of alcohol per every one mole of acid-substituted compound, although the relative amounts of acid-substituted compound and alcohol can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of alcohol, and in one embodiment no more than about 0.5 mole of esterification catalyst per mole of alcohol, although the amount of esterification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of alcohol per every one liter of solvent, in another embodiment at least about 50 grams of alcohol per every one liter of solvent, and in yet another embodiment at least about 100 grams of alcohol per every one liter of solvent, and in one embodiment no more than about 200 grams of alcohol per every one liter of solvent, in another embodiment no more than about 150 grams of alcohol per every one liter of solvent, and in yet another embodiment no more than about 100 grams of alcohol per every one liter of solvent, although the amount of solvent can be outside of these ranges.

The reaction mixture containing the alcohol, the acid-substituted compound, the optional solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the alcohol, the acid-substituted compound, the optional solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The esterified compound can be recovered from the reaction mixture as a solid by filtration, followed by washing and drying. If desired, purification can be carried out by filtration, redissolution in the solvent, heating, cooling, precipitating the colorant from the solution, filtering, washing the compound with a solvent such as methanol, ethanol, or the like, and repeating this cycle until thin layer chromatography of the collected solid indicates that there is no detectable unreacted reactant present in the solid.

The acid-substituted compound of the formula

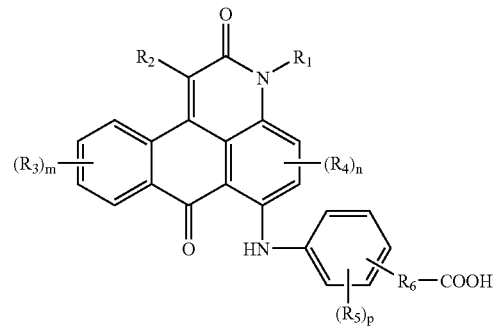

can be converted to an amide-substituted compound of the formula

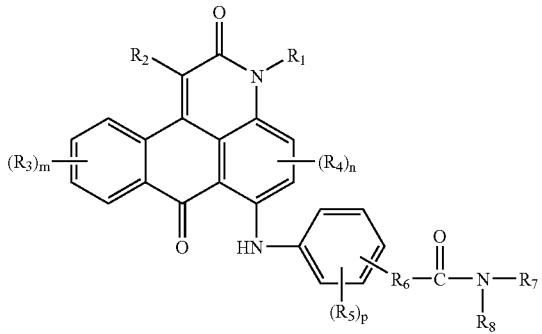

by reacting the acid-substituted compound with an amine of the formula R₇—NH₂, an optional solvent, and an optional amidification catalyst and heating, as follows:

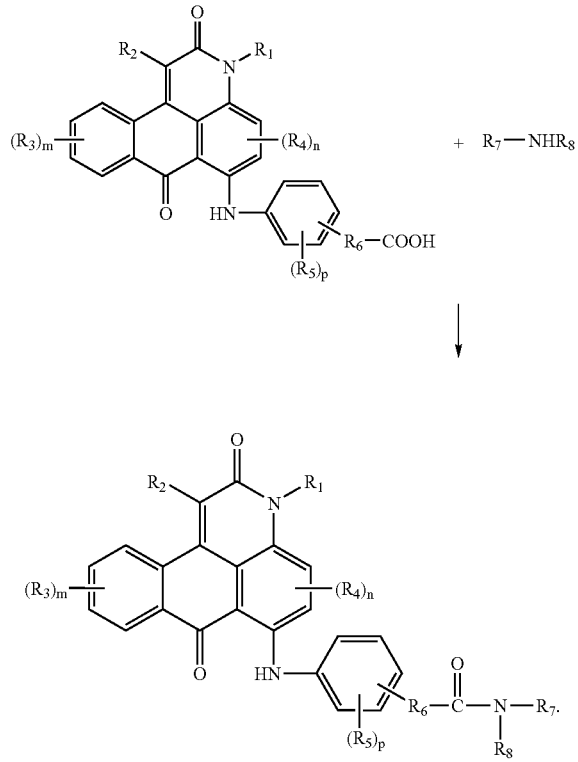

The acid-substituted compound and the amine are present in any desired or effective relative amounts, in one embodiment at least about 1 mole of amine per every one mole of acid-substituted compound, in another embodiment at least about 1.05 moles of amine per every one mole of acid-substituted compound, and in yet another embodiment at least about 1.1 moles of amine per every one mole of acid-substituted compound, and in one embodiment no more than about 2 moles of amine per every one mole of acid-substituted compound, in another embodiment no more than about 1.5 moles of amine per every one mole of acid-substituted compound, and in yet another embodiment no more than about 1.25 moles of amine per every one mole of acid-substituted compound, although the relative amounts of acid-substituted compound and amine can be outside of these ranges.

When the optional amidification catalyst is present, any desired or effective amidification catalyst can be used, such as phosphoric acid or the like. The amidification catalyst is present in any desired or effective amount, in one embodiment at least about 0.05 mole of amidification catalyst per every one mole of amine, and in one embodiment no more than about 0.5 mole of amidification catalyst per mole of amine, although the amount of amidification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of amine per every one liter of solvent, in another embodiment at least about 50 grams of amine per every one liter of solvent, and in yet another embodiment at least about 100 grams of amine per every one liter of solvent, and in one embodiment no more than about 200 grams of amine per every one liter of solvent, in another embodiment no more than about 150 grams of amine per every one liter of solvent, and in yet another embodiment no more than about 100 grams of amine per every one liter of solvent, although the amount of solvent can be outside of these ranges.

The reaction mixture containing the amine, the acid-substituted compound, the optional solvent, and the optional amidification catalyst is heated to any desirable or effective temperature, typically the reflux temperature of the selected solvent, in one embodiment at least about 100° C., and in one embodiment no more than about 200° C., although the temperature can be outside of these ranges.

The reaction mixture containing the amine, the acid-substituted compound, the optional solvent, and the optional amidification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The amidified compound can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The acid-substituted compound of the formula

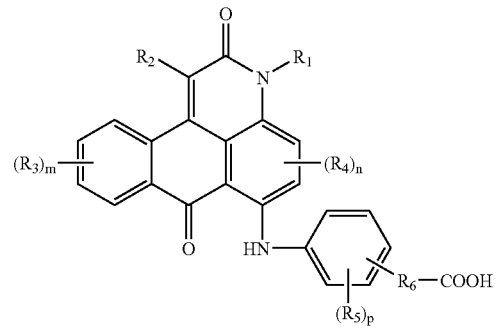

can also be converted to an amide-substituted compound of the formula

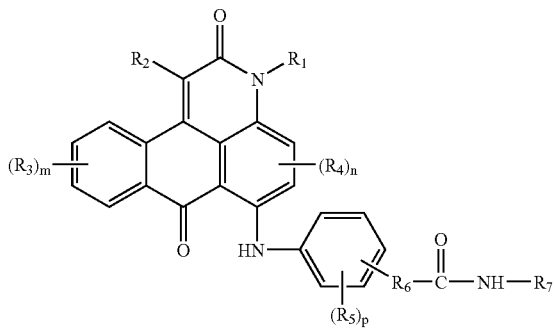

by reacting the acid-substituted compound with an isocyanate of the formula R$_7$—NCO, optionally in the presence of a catalyst, either neat or, optionally, in the presence of a solvent, at elevated temperatures as follows:

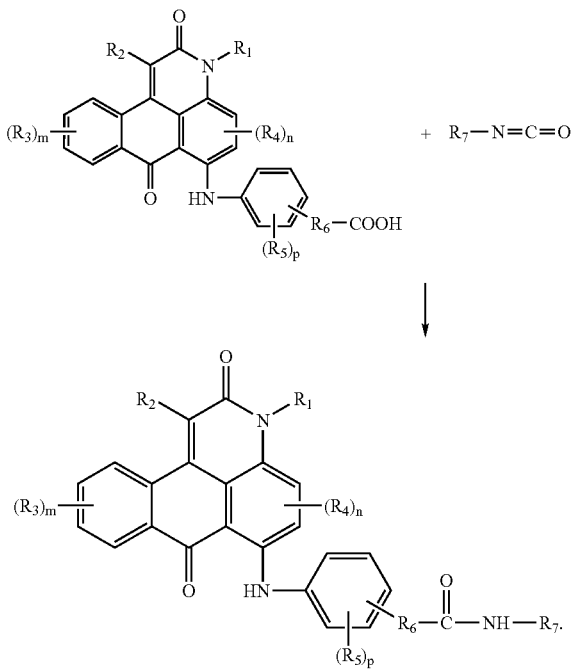

The carboxylic acid-substituted compound and the isocyanate are present in any desired or effective relative amounts, in one embodiment at least about 1 mole of isocyanate group per every one mole of carboxylic acid-substituted compound, in another embodiment at least about 1.05 moles of isocyanate group per every one mole of carboxylic acid-substituted compound, and in yet another embodiment at least about 1.1 moles of isocyanate group per every one mole of carboxylic acid-substituted compound, and in one embodiment no more than about 2 moles of isocyanate group per every one mole of carboxylic acid-substituted compound, in another embodiment no more than about 1.5 moles of isocyanate group per every one mole of carboxylic acid-substituted compound, and in yet another embodiment no more than about 1.25 moles of isocyanate group per every one mole of carboxylic acid-substituted compound, although the relative amounts of carboxylic acid-substituted compound and isocyanate group can be outside of these ranges.

When the optional catalyst is present, any desired or effective catalyst can be used, such as dibutyl tin dilaurate or the like. The catalyst is present in any desired or effective amount, in one embodiment at least about 0.05 mole of catalyst per every one mole of isocyanate, and in one embodiment no more than about 0.5 mole of catalyst per mole of isocyanate, although the amount of catalyst can be outside of these ranges.

When present, any desired or effective aprotic solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of isocyanate per every one liter of solvent, in another embodiment at least about 50 grams of isocyanate per every one liter of solvent, and in yet another embodiment at least about 100 grams of isocyanate per every one liter of solvent, and in one embodiment no more than about 200 grams of isocyanate per every one liter of solvent, in another embodiment no more than about 150 grams of isocyanate per every one liter of solvent, and in yet another embodiment no more than about 100 grams of isocyanate per every one liter of solvent, although the amount of solvent can be outside of these ranges.

The reaction mixture containing the isocyanate, the carboxylic acid-substituted compound, the optional solvent, and the optional catalyst is heated to any desired or effective temperature, typically the reflux temperature of the selected solvent, in one embodiment at least about 100° C., and in one embodiment no more than about 200° C., although the temperature can be outside of these ranges.

The reaction mixture containing the isocyanate, the carboxylic acid-substituted compound, the optional solvent, and the optional catalyst is heated for any desired or effective period of time, in one embodiment at least about 2 hours, and in another embodiment at least about 24 hours, and in one embodiment no more than about 72 hours, and in another embodiment no more than about 48 hours, although the heating time can be outside of these ranges.

The amide-substituted compound can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

Phase change inks as disclosed herein contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks contain a colorant compound of the formula

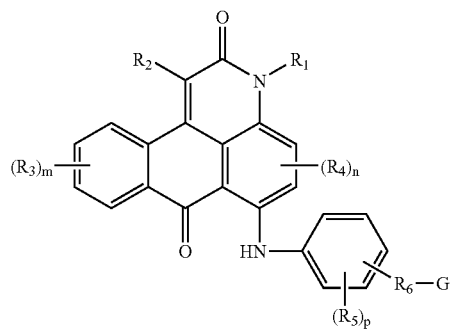

or

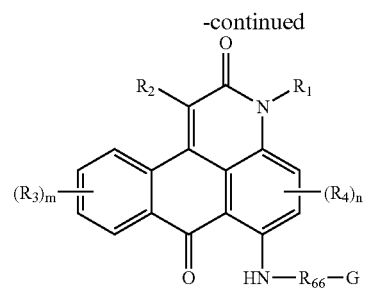

wherein $R_1$ is (i) a hydrogen atom, (ii) an alkyl group, (iii) an aryl group, (iv) an arylalkyl group, or (v) an alkylaryl group, $R_2$ is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, $R_3$ is (i) an alkyl group, (ii) an aryl group, (iii) an arylalkyl group, (iv) an alkylaryl group, or (v) a substituent other than an alkyl, aryl, arylalkyl, or alkylaryl group, m is an integer of 0, 1, 2, 3, or 4, $R_4$ is (i) an alkyl group, (ii) an aryl group, (iii) an arylalkyl group, (iv) an alkylaryl group, or (v) a substituent other than an alkyl, aryl, arylalkyl, or alkylaryl group, n is an integer of 0, 1, 2, 3, or 4, $R_5$ is (i) an alkyl group, (ii) an aryl group, (iii) an arylalkyl group, (iv) an alkylaryl group, or (v) a substituent other than an alkyl, aryl, arylalkyl, or alkylaryl group, p is an integer of 0, 1, 2, 3, or 4, $R_6$ is (i) a direct bond, (ii) an alkylene group, (iii) an arylene group, (iv) an arylalkylene group, or (v) an alkylarylene group, $R_{66}$ is (i) an alkylene group, (ii) an arylene group, (iii) an arylalkylene group, or (iv) an alkylarylene group, G is (1) a hydroxy group, (2) a carboxylic acid group, (3) an alkyl group having at least about 8 carbon atoms, (4) an aryl group, (5) an arylalkyl group having at least about 14 carbon atoms, (6) an alkylaryl group having at least about 14 carbon atoms, (7) a group of the formula

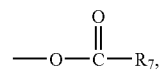

(8) a group of the formula

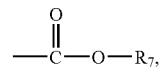

(9) a group of the formula

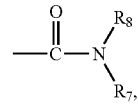

or (10) a group of the formula

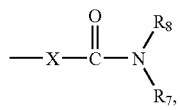

$R_7$ is (i) an alkyl group, (ii) an aryl group, (iii) an arylalkyl group, or (iv) an alkylaryl group, $R_8$ is (i) a hydrogen atom, (ii) an alkyl group, (iii) an aryl group, (iv) an arylalkyl group, or (v) an alkylaryl group, X is —O— or —NR$_9$—, and $R_9$ is (i) a hydrogen atom, (ii) an alkyl group, (iii) an aryl group, (iv) an arylalkyl group, or (v) an alkylaryl group. This colorant is present in the ink in any desired or effective amount to obtain the desired color or hue, in one embodiment of at least about 0.1 percent by weight of the ink, in another embodiment of at least about 0.5 percent by weight of the ink, in yet another embodiment of at least about 1 percent by weight of the ink, in still another embodiment of at least about 2 percent by weight of the ink, and in another embodiment of at least about 3 percent by weight of the ink, and in one embodiment of no more than about 20 percent by weight of the ink, in another embodiment of no more than about 13 percent by weight of the ink, and in yet another embodiment of no more than about 6 percent by weight of the ink, although the amount can be outside of these ranges. The colorant as disclosed herein can either be the sole colorant in the ink or can be present in combination with other colorants, such as dyes, pigments, mixtures thereof, and the like.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

To a 500 milliliter round bottom flask with stir magnet was charged 250 grams of 4-aminophenethyl alcohol (obtained from Aceto Corporation, Lake Success, N.Y.) and 15.6 grams of sodium carbonate (obtained from Aldrich Chemical Co., Milwaukee, Wis.). The mixture was heated to 140° C. in an oil bath with stirring. After the mixture was molten, 50 grams of 4-bromo-1,9-N-methyl anthrapyridone (obtained from Hangsu Aolunda High Tech Industry Co. Ltd., Shanghai, China) was added and the temperature of the oil bath was increased to 185° C. while stirring was continued. After 1 hour, the reaction mixture was quenched into 1,500 milliliters of a 0.5 percent solution of HCl in water while stirring. After several hours, the solids were collected by vacuum filtration and washed two additional times in HCl/H$_2$O, filtering after each wash. The filtrant (a brown solution) decreased in color as each subsequent wash was performed. The solids were collected and dried in a vacuum oven at 60° C. The spectral strength of the product was determined using a spectrophotographic procedure based on the measurement of the product in solution by dissolving the product in toluene and measuring the absorbance using a Perkin Elmer Lambda 2S UV/VIS spectrophotometer. The spectral strength of the product was measured as about 28,552 mL Absorbance Units per gram at absorption $\lambda_{max}$, 544 nanometers. The hydroxyethyl substituted product was believed to be of the formula

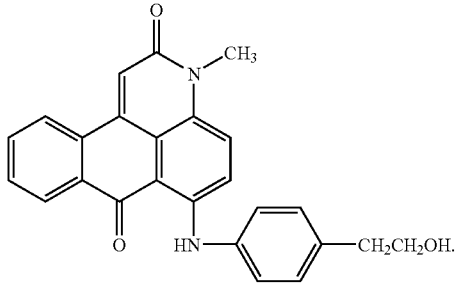

EXAMPLE II

To a 1 liter flask with stir magnet was charged 50 grams of the hydroxyethyl substituted product prepared in Example I, 137.6 grams of UNILIN 700 (a long chain fatty alcohol believed to be of the formula $CH_3(CH_2)_nOH$ wherein n represents an average number having an average value of about 47 and is believed to have a range of from about 30 to about 70, obtained from Baker Petrolite Corp., Sugarland, Tex.), 400 grams of xylene (obtained from Aldrich Chemical Co.), and 2 grams of p-toluene sulfonic acid (obtained from Aldrich Chemical Co.). The flask, equipped with a Dean-Stark trap and condenser, was placed in an oil bath at 150° C. and allowed to reflux for 4 days. The reaction product was then poured into a 1 liter beaker and allowed to cool and precipitate. The solids were then filtered, collected, and triturated in methanol (about 500 milliliters), followed by refiltering and repeating the process three times. The solids were then dried overnight in a vacuum oven at 60° C. The spectral strength of the product was determined using a spectrophotographic procedure based on the measurement of the product in solution by dissolving the product in a 1:1 mixture of tetrahydrofuran and toluene and measuring the absorbance using a Perkin Elmer Lambda 2S UV/VIS spectrophotometer. The spectral strength of the product was measured as about 8,921 mL Absorbance Units per gram at absorption $\lambda_{max}$, 543 nanometers. The C50 ester substituted product was believed to be of the formula

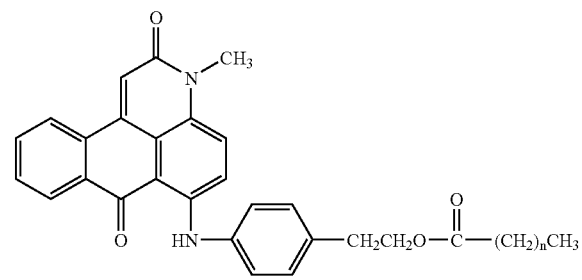

wherein n represents an average number and has an average value of about 47 and is believed to have a range of from about 30 to about 70.

EXAMPLE III

To a 125 milliliter flask with stir magnet was charged 15.1 grams of the hydroxyethyl substituted product prepared in Example I, 11.9 grams of PRIPOL® dimer acid (a dimer diol believed to be of the formula $HOOC-C_{36}H_{64+n}-COOH$ wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was believed to be of the formula

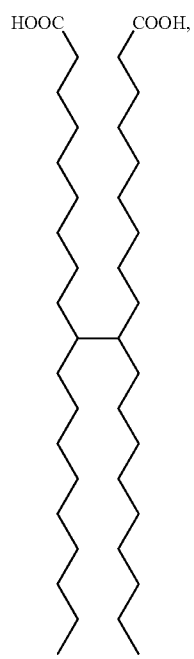

obtained from Uniqema, New Castle, Del.), 52.5 grams of xylene (obtained from Aldrich Chemical Co.), and 0.1 grams of p-toluene sulfonic acid (obtained from Aldrich Chemical Co.). The flask, equipped with a Dean-Stark trap and condenser, was placed in an oil bath at 150° C. and allowed to reflux for 4 days. The reaction product was then poured into a 1 liter beaker and allowed to cool and precipitate. The solids were then filtered, collected, and triturated in methanol (about 500 milliliters), followed by refiltering and repeating the process three times. The solids were then dried overnight in a vacuum oven at 60° C. The product was believed to be of the formula

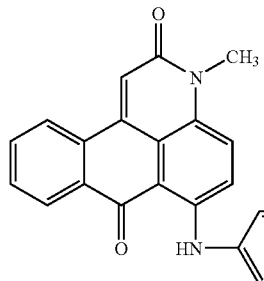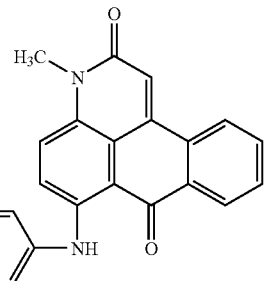

wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was believed to be of the formula

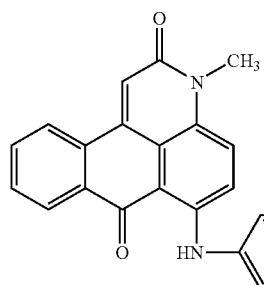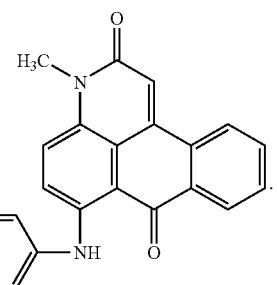

EXAMPLE IV

To a 250 milliliter flask with stir magnet was charged 15.1 grams of the hydroxyethyl substituted product prepared in Example I, 11.4 grams of Dime Diisocyanate 1410 (a dimer diisocyanate believed to be of the formula HOOC—$C_{36}H_{64+n}$—COOH wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was believed to be of the formula

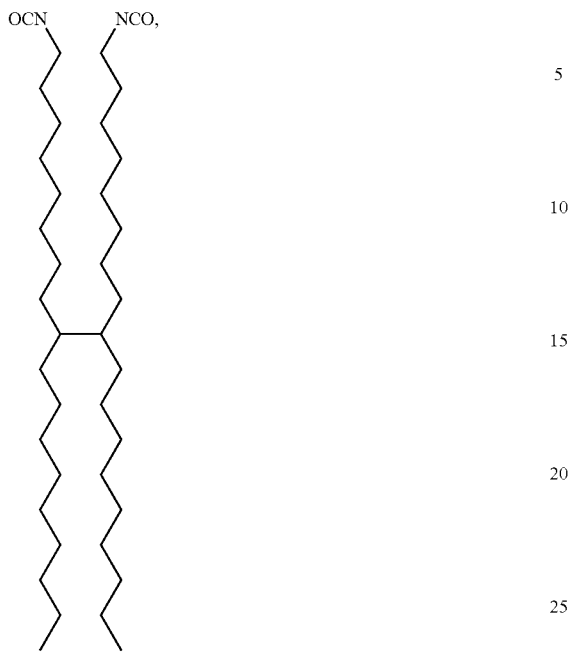

obtained from Cognis Corp, Cincinnati, Ohio), 129.7 grams of xylene (obtained from Aldrich Chemical Co.), and 2 drops of FASCAT 4202 catalyst (obtained from Elf Atochem North America Inc., Philadelphia, Pa.). The flask, equipped with a condenser, was placed in an oil bath at 155° C. and allowed to reflux for 5 hours. An infrared spectrum of the reaction was taken to ensure that no isocyanate reactant remained and that the reaction was complete. The reaction product was then poured into 1,500 milliliters of methanol and allowed to cool and precipitate. The solids were then filtered, collected, and triturated in methanol (about 500 milliliters), followed by refiltering and repeating the process three times. The solids were then dried overnight in a vacuum oven at 60° C. The product was believed to be of the formula

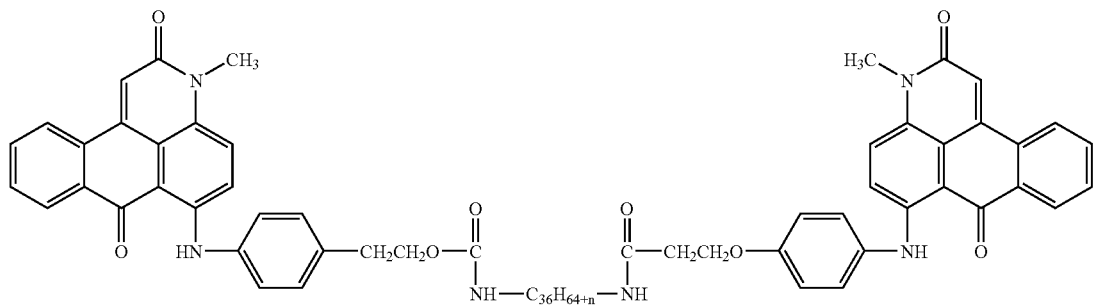

wherein $C_{36}H_{64+n}$ was a branched alkylene group which may include unsaturations and cyclic groups, wherein n is an integer of 0, 1, 2, 3, 4, 5, 6, 7, 8, 9, or 10, and wherein one isomer thereof was believed to be of the formula

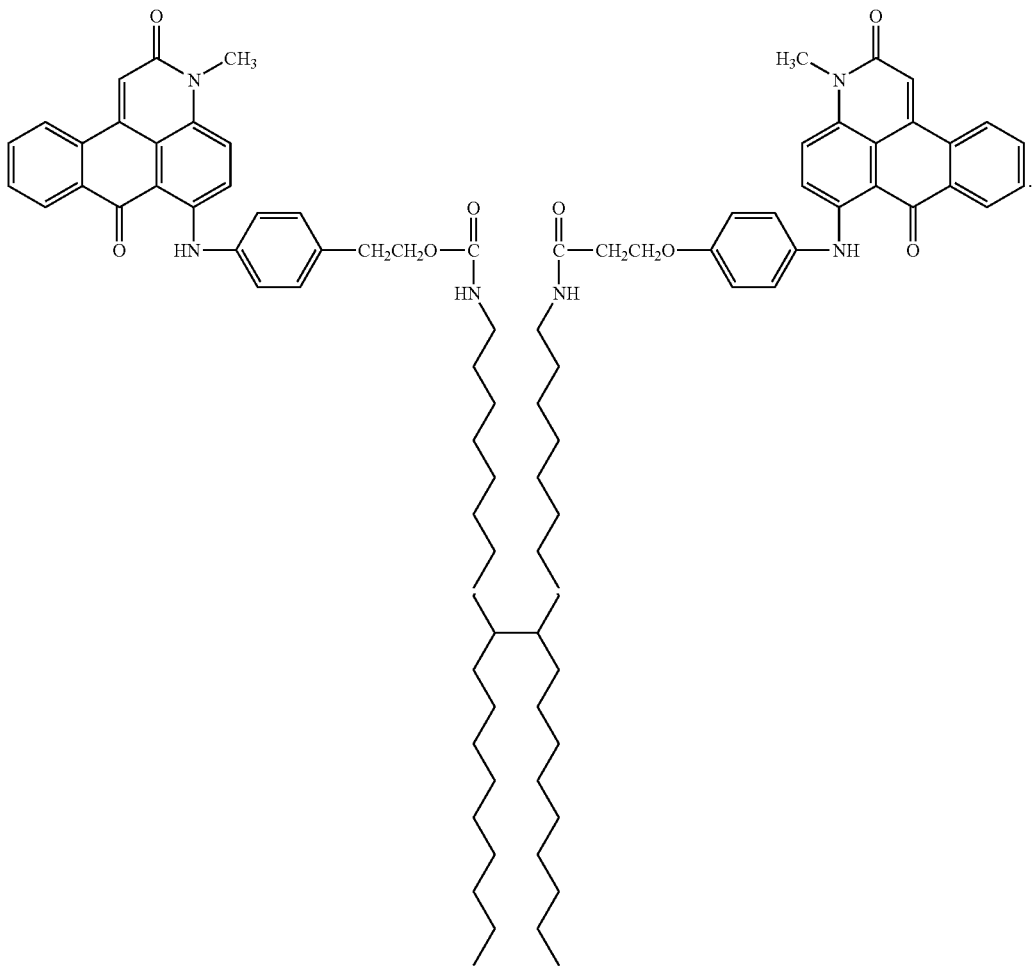

EXAMPLE V

To a 500 milliliter round bottom flask equipped with stir magnet is charged 275 grams of p-aminophenylacetic acid (available from TCI America, Portland Oreg.) and 15.6 grams of sodium carbonate (available from Aldrich Chemical Co., Milwaukee, Wis.). The mixture is heated to 140° C. in an oil bath with stirring. After the mixture is molten, 50 grams of 4-bromo-1,9-N-methyl anthrapyridone (available from Hangsu Aolunda High Tech Industry Co. Ltd., Shanghai, China) is added and the temperature of the oil bath is increased to 185° C. while stirring is continued. After 1 hour, the reaction mixture is quenched into 1,500 milliliters of 5 percent HCl in water while stirring. After several hours, the solids are collected by vacuum filtration and washed two additional times in $HCl/H_2O$, filtering after each wash. The solids are collected and dried in a vacuum oven at 60° C. It is believed that the product will be of the formula

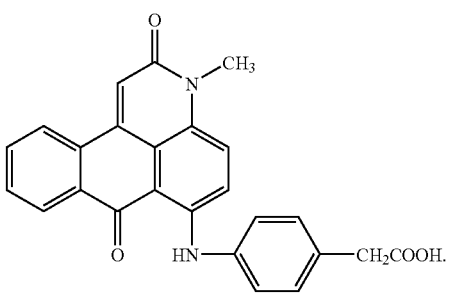

EXAMPLE VI

To a 1 liter flask with stir magnet is charged 55.1 grams of the phenylacetic acid substituted product prepared in Example V, 137.6 grams of UNICID 700 (a long chain fatty acid believed to be of the formula $CH_3(CH_2)_{46}COOH$, available from Baker Petrolite Corp., Sugarland, Tex.), 400 grams of xylene (available from Aldrich Chemical Co.), and 2 grams of p-toluene sulfonic acid (available from Aldrich Chemical Co.). The flask, equipped with a Dean-Stark trap and condenser, is placed in an oil bath at 150° C. and allowed to reflux for 4 days. The reaction product is then poured into a 1 liter beaker and allowed to cool and precipitate. The solids are then filtered, collected, and triturated in methanol (about 500 milliliters), followed by refiltering and repeating the process three times. The solids are then dried overnight in a vacuum oven at 60° C. It is believed that the product will be of the formula

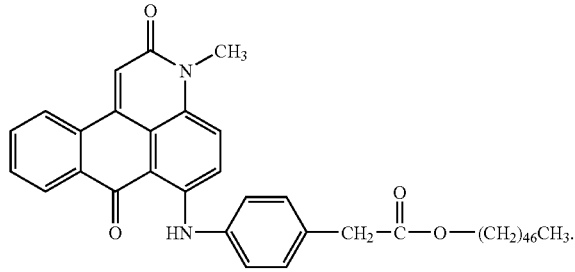

EXAMPLE VII

To a 250 milliliter round bottom flask equipped with magnetic stir bar is added 5 grams of the compound formed in Example V, 7.6 grams of octadecyl amine (ARMEEN 18 D, available from Akzo Nobel Chemicals Inc., McCook, Ill.), and 70 grams of xylene. The flask is placed under stirring and a condenser and Dean Stark trap in a hot oil bath at 150° C. for 48 hours. Thin layer chromatography (TLC) by normal phase in 10 percent methanol in toluene is used to determine reaction completion. Thereafter, the solvent is distilled off and the product is collected. It is believed that the product will be of the formula

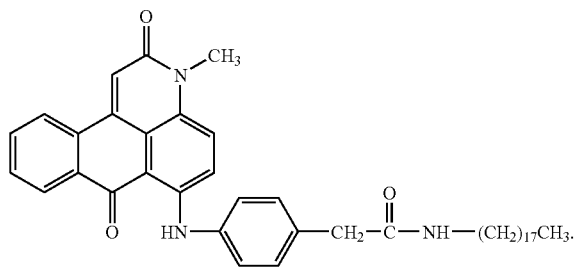

EXAMPLE VIII

To a 250 milliliter round bottom flask equipped with magnetic stir bar is added 5 grams of the compound formed in Example V, 7.6 grams of octadecyl isocyanate (Mondur O, available from Bayer Corp., Pittsburgh, Pa.), 2 drops of FASCAT 4202 catalyst (available from Elf Atochem North America Inc., Philadelphia, Pa.) and 70 grams of xylene. The flask is placed under stirring and a condenser and Dean Stark trap in a hot oil bath at 150° C. for 5 hours. Thin layer chromatography (TLC) by normal phase in 10 percent methanol in toluene is used to determine reaction completion. Thereafter, the solvent is distilled off and the product is collected. It is believed that the product will be of the formula

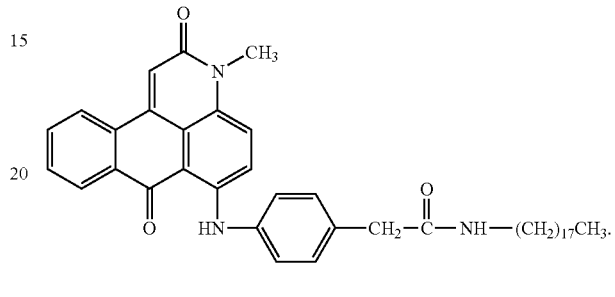

EXAMPLE IX

To a 250 milliliter round bottom flask in an oil bath with stir magnet is charged 10.2 grams of octadecyl amine (available from Aldrich Chemicals), 10.6 grams of sodium carbonate (available from Aldrich Chemical Co.), 150 milliliters of 2-methylpyrrolidinone (available from Aldrich Chemical Co.), 0.2 grams of copper II acetate (available from Aldrich Chemical Co.), and 33.9 grams of 4-bromo-1,9-N-methyl anthrapyridone (available from Hangsu Aolunda High Tech Industry Co. Ltd., Shanghai, China), and the temperature of the oil bath is increased to 150° C. while stirring is maintained for 16 hours. The reaction mixture is then quenched into 500 milliliters of methanol. The resulting solid product is then filtered, collected, and triturated in methanol (about 500 milliliters), followed by refiltering and repeating the process three times. The solid is then dried overnight in a vacuum oven at 60° C. It is believed that the product will be of the formula

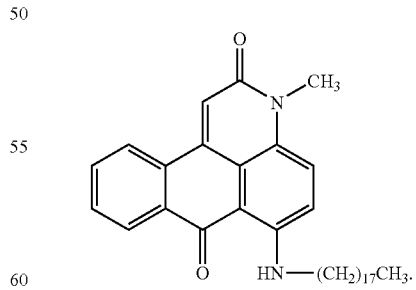

EXAMPLE X

To a 250 milliliter round bottom flask with stir magnet is charged 13.6 grams of 2-(aminophenyl)ethylamine (available from Aldrich Chemical Co.) and 150 milliliters of dry 2-methylpyrrolidinone (available from Aldrich Chemical Co.) under a nitrogen blanket with stirring. 29.6 grams of octadecylisocyanate (Mondur O, available from Bayer Corp. of Pittsburgh, Pa.) is then slowly added over 15 minutes. Normally an exotherm is observed as the reaction of an isocyanate and aliphatic primary amine is quite exothermic. Heat is applied so as to keep the reaction mixture in solution. The reaction progress is followed by FTIR analysis as the NCO peak (approx. 2250 cm$^{-1}$) disappears as the isocyanate is consumed. The mixture is then heated to 140° C. and 33.9 grams of 4-bromo-1,9-N-methyl anthrapyridone (available from Hangsu Aolunda High Tech Industry Co. Ltd., Shanghai, China) and 0.2 grams of copper II acetate (available from Aldrich Chemical Co.) are added and the reaction is continued for 16 hours. Thereafter, the reaction mixture is quenched into 500 milliliters of methanol. The resulting solid product is then filtered, collected, and triturated in methanol (about 500 milliliters), followed by refiltering and repeating the process three times. The solid is then dried overnight in a vacuum oven at 60° C. It is believed that the product will be of the formula

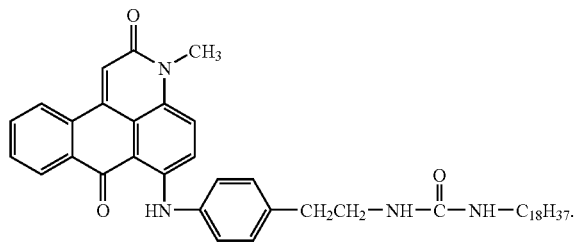

EXAMPLE XI

To a 500 milliliter round bottom flask with stir magnet was charged 10.2 grams of dodecyl aniline (obtained from EMS Dottikon AG, Montvale, N.J.) and 0.3 grams of sodium carbonate (obtained from Aldrich Chemicals). The mixture was heated to 140° C. in an oil bath with stirring. After the mixture was molten, 1.0 grams of 4-bromo-1,9-N-methyl anthrapyridone (obtained from Hangsu Aolunda High Tech Industry Co. Ltd., Shanghai, China) was added and the temperature of the oil bath was increased to 185° C. while stirring was continued. After 1 hour, the reaction mixture was quenched into 450 milliliters of 5 percent HCl in water. The crude product, a viscous liquid, was dissolved in 250 milliliters of toluene, placed in a 1 liter separatory funnel, and washed with 450 milliliters of 5 percent HCl. The toluene layer containing the purified product was transferred to a 1 liter round bottom flask and placed on a rotary evaporator and the toluene was distilled off, leaving the product. The product was believed to be of the formula

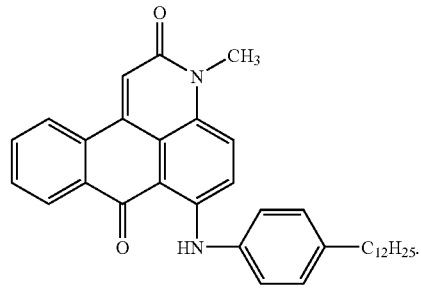

EXAMPLE XII

To a 500 milliliter round bottom flask with stir magnet is charged 250 grams of 3-aminopropyl diethyleneglycol (DCA 163, available from Dixie Chemical Co., Pasadena, Tex.) and 15.6 grams of sodium carbonate (available from Aldrich Chemical Co., Milwaukee, Wis.). The mixture is heated to 140° C. in an oil bath with stirring. When the mixture is molten, 50 grams of 4-bromo-1,9-N-methyl anthrapyridone (available from Hangsu Aolunda High Tech Industry Co. Ltd., Shanghai, China) is added and the temperature of the oil bath is increased to 185° C. while stirring is continued. After 1 hour, the reaction mixture is quenched into 1,500 milliliters of a 0.5 percent solution of HCl in water while stirring. After several hours, the solids are collected by vacuum filtration and washed two additional times in HCl/H$_2$O, filtering after each wash. It is believed that the product will be of the formula

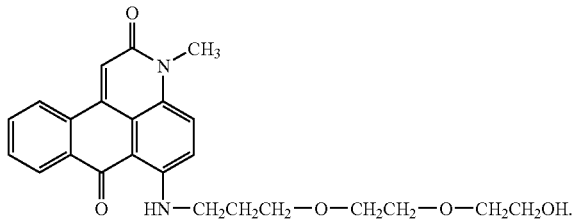

EXAMPLE XIII

To a 150 milliliter round bottom flask equipped with magnetic stir bar is added 5 grams of the compound formed in Example XII, 3.5 grams of octadecyl isocyanate (Mondur O, available from Bayer Corp., Pittsburgh, Pa.), 2 drops of FASCAT 4202 catalyst (available from Elf Atochem North America Inc., Philadelphia, Pa.) and 70 grams of xylene. The flask is placed under stirring and a condenser and Dean Stark trap in a hot oil bath at 150° C. for 5 hours. The solvent is distilled off and the product is collected. It is believed that the product will be of the formula

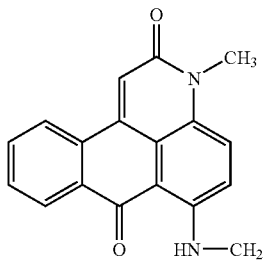
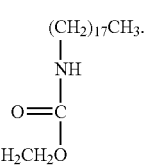

EXAMPLE XIV

An ink base was prepared by melting, admixing, and filtering the following ingredients:
polyethylene wax (PE 655, obtained from Baker Petrolite, Tulsa, Okla., of the formula $CH_3(CH_2)_{50}CH_3$), 42.01 parts by weight;
stearyl stearamide wax (KEMAMIDE® S-180, obtained from Crompton Corporation, Greenwich, Conn.), 18.82 parts by weight;
tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla. a long chain hydrocarbon having a terminal carboxylic acid group), prepared as described in Example 1 of U.S. Pat. No. 6,174,937, the disclosure of which is totally incorporated herein by reference, 24.99 parts by weight;
urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 8.82 parts by weight;
urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 5.21 parts by weight; and
NAUGUARD® 445 antioxidant (available from Uniroyal Chemical Co., Middlebury, Conn.), 0.15 parts by weight.

Thereafter, 566.4 grams of the ink carrier and 15.0 grams of the colorant prepared in Example II (2.58 percent by weight) were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman # 3 and 0.2 micron NAE filters and placed in a Mott filter assembly. Filtration was supported by the addition of 1 percent by weight FILTER-AID, obtained from Fluka Chemika, Switzerland, and proceeded at a temperature of 135° C. until complete after 6 hours. The dynamic viscosity of the inks was measured using a stress-controlled Dynamic Stress Rheometer (DSR) 2000 from Rheometric Scientific (now TA Instruments). Geometry was 40 mm diameter Cone and Plate. A stress of 1 Pascal was constantly maintained during a step-stress experiment, and viscosity data points were gathered at an approximate rate of 0.5 points per second. Each measurement lasted approximately 5 minutes, with an equilibration period of about 80 seconds; subsequently, data measured between 100 and 300 seconds were averaged. The dynamic viscosity of this ink at 140° C. was 10.80 milliPascal seconds. The spectral strength of the ink was determined using a spectrophotographic procedure based on the measurement of the ink in solution by dissolving the ink in toluene and measuring the absorbance using a Perkin Elmer Lambda 2S UV/VIS spectrophotometer. The spectral strength of this ink was measured as about 105 mL Absorbance Units per gram at absorption $\lambda_{max}$ of 543 nanometers.

EXAMPLE XV

The procedure of Example XIV was repeated except that the amounts of the ink ingredients (weight percent) were changed as follows:
polyethylene wax: 40.77
stearyl stearamide: 18.27
tetra-amide resin: 22.64
first urethane resin: 8.00
second urethane resin: 4.72
antioxidant: 0.13
colorant: 5.47

The dynamic viscosity of this ink at 140° C. was 10.70 milliPascal seconds. The spectral strength of this ink was measured as about 301 mL Absorbance Units per gram at absorption $\lambda_{max}$ of 543 nanometers. The ink was then cast into ink sticks and allowed to solidify.

COMPARATIVE EXAMPLE A

The procedure of Example XIV was repeated except that an anthraquinone colorant prepared as described in Example 2 of U.S. Pat. No. 6,395,078, the disclosure of which is totally incorporated herein by reference, was used instead of the colorant prepared in Example II and except that the amounts of the ink ingredients (weight percent) were changed as follows:
polyethylene wax: 41.11
stearyl stearamide: 18.41
tetra-amide resin: 25.55
first urethane resin: 8.63
second urethane resin: 5.10
antioxidant: 0.15
colorant: 1.04

The ink thus prepared was cast into ink sticks and allowed to solidify. The dynamic viscosity of this ink at 140° C. was 10.61 mPas. The spectral strength of this ink was measured as about 239 mL Absorbance Units per gram at absorption $\lambda_{max}$ of 533 nanometers.

Thermal Analysis

Thermal analysis of the inks from Example XV and Comparative Example A was carried out by means of Dynamic Mechanical Analysis (DMA) using a RSA II Solids Analyzer (obtained from Rheometric Scientific) and Differential Scanning Calorimetry (DSC) using a DSC 2920 (obtained from TA Instruments). Dual-cantilever DMA analysis was carried out to measure mechanical properties of the ink samples, such as modulus of elasticity (e.g. Young's Modulus, E), or loss-angle tangent (which is defined to be Loss Modulus E″, divided by Storage Modulus E′), usually as functions of frequency. The measurement can be conducted at different temperatures, which makes it a useful tool in the thermo-mechanical analysis of an ink. In preparation of the measurement, the ink is cast into thin sticks or rods. Each specimen is subsequently inserted into the instrument in such a way that the two ends of the rod rest on a fork-shaped tool connected with a load cell, while a thin tool touches the rod in its center. The upper tool is moved by a special type of actuator with a constant frequency, and the lower tool measures the response of the solid ink material. As a result, the loss angle tangent is measured as a function of temperature. Maxima of this curve can be associated with glass transition temperatures in many cases, and the areas under the maxima of the same curve are a relative measure of sample toughness (high values indicating high toughness). Both values are reported for the ink samples from Example XII and Comparative Example A in the table below.

DSC is a well-known method of thermal analysis, done in a special kind of calorimeter, which in case of a calibrated measurement system is able to determine the heat capacity of a sample by comparing it with a reference. If this calibration is lacking, the method is still of significant analytical use, since it permits the measurement of any heat effects in the sample specimen. In the case of inks, the method can be used to determine heats of fusion (or solidification) and temperatures which are associated with these phase-transition processes. The typical heat flow curve of a phase transition shows one or several maxima (peaks). The temperature of the crossover point of the baseline with the left-flank tangent line of a peak (for heating experiments) is reported as an "onset" temperature $T_{m(onset)}$ of the fusing process. In the case that such a tangent line cannot be readily determined (e.g. several broad, fused maxima of the curve), we have instead reported the temperatures of the peak maxima $T_{m(max)}$ in the table. In addition, the specific heat of fusion $\Delta H_m$ (in J/g) was calculated by integration of the area under the peak. Since glass transitions manifest themselves as step-shaped patterns in heat capacity-temperature (or heat-flow-temperature) curves, DSC offers a convenient way to determine an estimate for glass transition temperatures and intervals. In the table, the temperature of the point of inflection of such a step-shaped curve is reported as glass transition temperature $T_g$. The results were as follows:

|  | Comparative Ink A | Example XV Ink |
|---|---|---|
| DSC |  |  |
| $T_g$ | 8° C. | 12° C. |
| $T_{m1(onset)}$ | 76.2° C. | 75.3° C. |
| $T_{m1(max)}$ | 85.7° C. | 85.2° C. |
| $T_{m2(max)}$ | 106° C. | 106° C. |
| $\Delta H_m (Jg^{-1})$ | 177.0 | 179.5 |
| DMA |  |  |
| $T_g$ (according to tan δ) | 8° C. | 15° C. |
| Area under log(tan δ) | 18.3 | 15.6 |

These calorimetric data indicate that the inks will exhibit very similar transfix properties. The increase in glass transition temperature is confirmed by dual-cantilever Dynamic Mechanical Analysis. The slightly reduced area under the log(tan δ) curve indicates a simultaneous increase in brittleness. It is believed that this change was not caused by the colorant but by the slightly reduced content of the second urethane resin, which can act as a toughening agent.

Print Performance: Tape Diffusion

The inks prepared in Example XV and Comparative Example A were each incorporated into different reservoirs of the printhead of a XEROX® PHASER® 850 phase change ink jet printer and used to generate prints of different text sizes and resolutions onto HAMMERMILL LASER-PRINT® paper. The resulting prints were then partially covered with SCOTCH® brand transparent tape. Some prints were maintained at room temperature and other prints were maintained at 60° C. After 5 days, the prints were inspected. Whereas the characters generated with the Comparative Example A ink and maintained at 60° C. appeared blurred, the characters generated with the Example XV ink and maintained at 60° C. were clearly legible.

To assess the result of this test in numbers, a comparative qualitative scale ranging from −3.0 to +3.0 was defined. On this scale, negative values indicated undesirable performance and inferiority with respect to the reference sample (that of Comparative Example A, which by itself therefore was rated to be ±0.0), and positive values indicated a desirable performance and hence superiority with respect to the reference sample. For the purpose of number assessment, all character sizes and print resolutions of the text were combined. A 5-day exposure to 60° C. (accelerated test) led to a comparative subjective rating of +2.5 for the prints generated with the ink of Example XV. In comparison, the diffusion process was significantly slower at room temperature, which immediately after the end of the 5-day test led to a lower comparative subjective rating. By estimate, this rating value was located between +0.5 and +1.0 for a 5-day room temperature exposure. The samples were then kept in storage in a dark location at room temperature for another 2¼ years. An inspection of the samples after this time period showed that the room temperature sample of the reference was totally blurred and illegible, whereas the sample with the ink from Example XV appeared virtually unchanged and legible, increasing its comparative subjective rating to a value very close to +3.0.

Print Performance: Showthrough Diffusion

One disadvantage of some magenta colorants is their relatively rapid diffusion through paper, resulting in discoloration of the rear side of the paper over time. The inks prepared in Example XV and Comparative Example A were each incorporated into different reservoirs of the printhead of a XEROX® PHASER® 850 phase change ink jet printer and used to generate solid fill prints onto HAMMERMILL LASERPRINT® paper. A standard resolution of 355×464 dpi was applied. Shortly after printing, the rear sides of the printed papers were scanned with an ACS Photometer, and the respective L*a*b* coordinates were recorded. Thereafter, some of the prints were maintained at room temperature and some of the prints were maintained at 60° C. In defined time intervals of approximately 1 day, 3 days, 5 days, 10 days, and 30 days as reported in the tables, the same sites on the rear sides of the printed papers were again scanned for their color values, and decolorations were quantified by calculating the ΔE values with respect to the initial scan. To different degrees in different parts of the visible light spectrum, color differences with ΔE values exceeding 1.0 are perceptible to the eye of the average observer. Low ΔE values are desirable. The results were as follows:

a) Room Temperature:

| Comparative Example A | | Example XV | |
|---|---|---|---|
| Time (Days) | ΔE | Time (Days) | ΔE |
| 0.00 | 0.00 | 0.00 | 0.00 |
| 1.02 | 0.05 | 0.88 | 0.09 |
| 2.00 | 0.22 | 2.93 | 0.09 |
| 4.72 | 0.66 | 5.09 | 0.14 |
| 8.77 | 1.59 | 9.86 | 0.13 |
| 27.99 | 5.19 | 32.87 | 0.39 | b) 60° C.:

| Comparative Example A | | Example XV | |
|---|---|---|---|
| Time (Days) | ΔE | Time (Days) | ΔE |
| 0.00 | 0.00 | 0.00 | 0.00 |
| 1.02 | 1.88 | 0.88 | 0.44 |
| 2.00 | 4.60 | 2.93 | 0.49 |
| 4.72 | 7.42 | 5.09 | 0.50 |
| 8.77 | 7.51 | 9.86 | 0.63 |
| 27.99 | 6.58 | 32.87 | 0.92 |

The data indicate the superior performance of the ink of Example XV compared to the ink containing the ink of Comparative Example A. Diffusion through the paper was virtually stopped. The difference became clear after 2 days during the room temperature test and within the first 24 hours during the 60° C. test.

Print Performance: Colorant Diffusion into Ink Carrier

Another disadvantage of some magenta colorants is their tendency to diffuse relatively quickly from their ink pixels into neighboring pixels on the front side of prints. This process can lead to undesirable discoloration effects over a period of time. The inks prepared in Example XV and Comparative Example A were each incorporated into different reservoirs of the printhead of a XEROX® PHASER® 850 phase change ink jet printer. Into a third reservoir was incorporated the phase change ink carrier described in Example I. Solid fill prints were generated on HAMMERMILL LASERPRINT® paper with both inks by dithering during printing with the colorless phase change ink carrier at a standard resolution of 355×464 dpi and at 20%, 50% and 80% ink coverage. Shortly after printing, the front (printed) sides of the printed papers were scanned with an ACS Photometer, and the respective L*a*b* coordinates were recorded. Thereafter, some of the prints were maintained at room temperature and some of the prints were maintained at 60° C. In defined time intervals of approximately 1 day, 3 days, 5 days, 10 days, and 30 days as indicated in the tables, the same sites on the front sides of the printed papers were again scanned for their color values, and decolorations were quantified by calculating the ΔE values with respect to the initial scan. Low ΔE values are desirable. The results were as follows:

a) Room Temperature

| Comparative Example A | | Example XV | |
|---|---|---|---|
| Time (Days) | ΔE | Time (Days) | ΔE |
| 20% Ink Coverage | | | |
| 0.00 | 0.00 | 0.00 | 0.00 |
| 0.27 | 0.38 | 0.76 | 0.13 |
| 1.05 | 1.22 | 2.8 | 0.26 |
| 3.34 | 1.83 | 4.82 | 0.30 |
| 6.26 | 2.30 | 9.74 | 0.31 |
| 10.04 | 2.75 | 32.75 | 0.57 |
| 30.18 | 3.29 | | |
| 50% Ink Coverage | | | |
| 0.00 | 0.00 | 0.00 | 0.00 |
| 0.27 | 1.09 | 0.76 | 0.16 |
| 1.05 | 1.95 | 2.8 | 0.25 |
| 3.34 | 2.88 | 4.82 | 0.35 |
| 6.26 | 3.33 | 9.74 | 0.35 |
| 10.04 | 4.08 | 32.75 | 0.67 |
| 30.18 | 4.99 | | |
| 80% Ink Coverage | | | |
| 0.00 | 0.00 | 0.00 | 0.00 |
| 0.27 | 0.80 | 0.76 | 0.23 |
| 1.05 | 1.46 | 2.8 | 0.34 |
| 3.34 | 2.04 | 4.82 | 0.39 |
| 6.26 | 1.86 | 9.74 | 0.46 |
| 10.04 | 2.31 | 32.75 | 0.78 |
| 30.18 | 2.54 | | | b) 60° C.

| Comparative Example A | | Example XV | |
|---|---|---|---|
| Time (Days) | ΔE | Time (Days) | ΔE |
| 20% Ink Coverage | | | |
| 0.00 | 0.00 | 0.00 | 0.00 |
| 0.35 | 5.86 | 0.76 | 0.33 |
| 1.05 | 8.44 | 2.80 | 0.76 |
| 2.04 | 8.50 | 4.82 | 1.06 |
| 3.04 | 8.25 | 9.74 | 1.33 |
| 5.13 | 8.24 | 32.75 | 1.46 |
| 10.06 | 8.00 | | |
| 36.20 | 7.75 | | |
| 50% Ink Coverage | | | |
| 0.00 | 0.00 | 0.00 | 0.00 |
| 0.35 | 5.25 | 0.76 | 1.93 |
| 1.05 | 5.82 | 2.80 | 2.33 |
| 2.04 | 5.63 | 4.82 | 2.56 |
| 3.04 | 5.68 | 9.74 | 3.06 |
| 5.13 | 5.34 | 32.75 | 4.38 |

-continued

| Comparative Example A | | Example XV | |
|---|---|---|---|
| Time (Days) | ΔE | Time (Days) | ΔE |
| 10.06 | 5.39 | | |
| 36.20 | 5.40 | | |
| | | 80% Ink Coverage | |
| 0.00 | 0.00 | 0.00 | 0.00 |
| 0.35 | 3.30 | 0.76 | 4.09 |
| 1.05 | 4.46 | 2.80 | 4.88 |
| 2.04 | 4.42 | 4.82 | 5.32 |
| 3.04 | 4.39 | 9.74 | 6.13 |
| 5.13 | 4.04 | 32.75 | 8.00 |
| 10.06 | 3.92 | | |
| 36.20 | 3.45 | | |

As the data indicate, at room temperature, the ink prepared in Example XV exhibited superior performance at all degrees of ink coverage. The diffusion of dye was minimal and was equal to zero within the error limits of the instrument. The difference became clear after the first 24 hours. At 60° C., the ink prepared in Example XV exhibited superior performance at 20% and 50% ink coverage, although not at 80% coverage.

Print Performance: Fingerprint Diffusion

The inks prepared in Example XV and Comparative Example A were each incorporated into different reservoirs of the printhead of a XEROX® PHASER® 850 phase change ink jet printer and used to generate solid fill prints onto HAMMERMILL LASERPRINT® paper. Resolutions of 355×464 dpi and 600×600 dpi were applied. Horizontal solid-fill stripes of different ink fill were generated, varying from 20% fill to 90% fill in 10% increments. Fingerprint diffusion tests were then carried out on the prints by having a test person rub fingers two times with fragrance-free LUBRIDERM® hand lotion. After each rub, the fingers were dried with a towel. The surfaces of the prints were then contaminated by touching them with the fingers, exerting an equal and moderate pressure. Thereafter, the prints were placed into manila folders with sheets of paper between the samples and maintained at room temperature for five days, after which the prints were inspected for changes. Fingerprints appeared quickly in the prints generated with the ink prepared in Comparative Example A, but were almost not visible in the prints generated with the ink prepared in Example XV. To characterize this result in numbers, a comparative qualitative scale, ranging from −3.0 to +3.0, was established. On this scale, the reference from Comparative Example A was assigned a value of ±0.0. Negative values represented undesirable performance and positive values represented desirable performance superior to the reference. The prints generated with the ink of Example XV were subjectively rated +1.5 for the prints at 355×464 dpi resolution and +2.0 for the prints at 600×600 dpi resolution. These ratings reflect the total impression, gained from all coverages between 20% and 90%, for the same resolution. The samples were then stored in a dark place at room temperature for 2¼ years. After this time period, the samples were inspected again, and it was noted that the prints from Example XV still appeared fresh and unaltered, with almost no fingerprints visible. In contrast, the reference showed a significant amount of fading dye and a speckled appearance of the surface, indicating the presence of a degrading processes.

Other embodiments and modifications may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a phase change ink carrier and a colorant compound of the formula

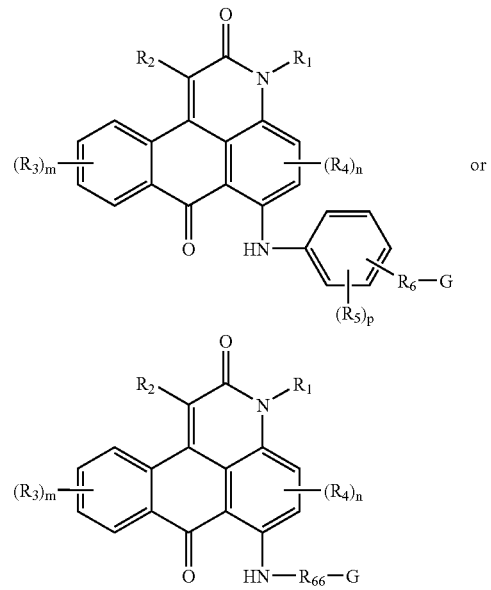

wherein $R_1$ is (i) a hydrogen atom, (ii) an alkyl group, (iii) an aryl group, (iv) an arylalkyl group, or (v) an alkylaryl group, $R_2$ is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, $R_3$ is (i) an alkyl group, (ii) an aryl group, (iii) an arylalkyl group, (iv) an alkylaryl group, or (v) a substituent other than an alkyl, aryl, arylalkyl, or alkylaryl group, m is an integer of 0, 1, 2, 3, or 4, $R_4$ is (i) an alkyl group, (ii) an aryl group, (iii) an arylalkyl group, (iv) an alkylaryl group, or (v) a substituent other than an alkyl, aryl, arylalkyl, or alkylaryl group, n is an integer of 0, 1, 2, 3, or 4, $R_5$ is (i) an alkyl group, (ii) an aryl group, (iii) an arylalkyl group, (iv) an alkylaryl group, or (v) a substituent other than an alkyl, aryl, arylalkyl, or alkylaryl group, p is an integer of 0, 1, 2, 3, or 4, $R_6$ is (i) a direct bond, (ii) an alkylene group, (iii) an arylene group, (iv) an arylalkylene group, or (v) an alkylarylene group, $R_{66}$ is (i) an alkylene group, (ii) an arylene group, (iii) an arylalkylene group, or (iv) an alkylarylene group, G is (1) a hydroxy group, (2) a carboxylic acid group, (3) an alkyl group having at least about 8 carbon atoms, (4) an aryl group, (5) an arylalkyl group having at least about 14 carbon atoms, (6) an alkylaryl group having at least about 14 carbon atoms, (7) a group of the formula

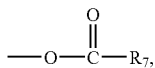

(8) a group of the formula

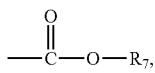

(9) a group of the formula

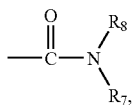

or (10) a group of the formula

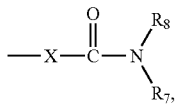

$R_7$ is (i) an alkyl group, (ii) an aryl group, (iii) an arylalkyl group, or (iv) an alkylaryl group, $R_8$ is (i) a hydrogen atom, (ii) an alkyl group, (iii) an aryl group, (iv) an arylalkyl group, or (v) an alkylaryl group, X is —O— or —$NR_9$—, and $R_9$ is (i) a hydrogen atom, (ii) an alkyl group, (iii) an aryl group, (iv) an arylalkyl group, or (v) an alkylaryl group.

2. An ink according to claim 1 wherein the phase change ink carrier comprises a monoamide, a tetra-amide, or a mixture thereof.

3. An ink according to claim 1 wherein the phase change ink carrier comprises (a) stearyl stearamide, (b) a dimer acid based tetra-amide that is the reaction product of dimer acid, ethylene diamine, and stearic acid, or (c) mixtures thereof.

4. An ink according to claim 1 wherein the phase change ink carrier comprises (a) stearyl stearamide, (b) a dimer acid based tetra-amide that is the reaction product of dimer acid, ethylene diamine, and a carboxylic acid having at least about 36 carbon atoms, or (c) mixtures thereof.

5. An ink according to claim 4 wherein the carboxylic acid has at least about 40 carbon atoms, and wherein the carboxylic acid has no more than about 200 carbon atoms.

6. An ink according to claim 1 wherein the phase change ink carrier comprises an isocyanate-derived material.

7. An ink according to claim 1 wherein the phase change ink carrier comprises a urethane isocyanate-derived material, a urea isocyanate-derived material, a urethane/urea isocyanate-derived material, or mixtures thereof.

8. An ink according to claim 1 wherein the phase change ink carrier comprises a mixture of one or more amides and one or more isocyanate-derived materials.

9. An ink according to claim 1 wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

10. An ink according to claim 1 wherein the phase change ink carrier is present in the ink in an amount of at least about 0.1 percent by weight of the ink and wherein the phase change ink carrier is present in the ink in an amount of no more than about 99 percent by weight of the ink.

11. An ink according to claim 1 wherein the phase change ink carrier is present in the ink in an amount of at least about 50 percent by weight of the ink and wherein the phase change ink carrier is present in the ink in an amount of no more than about 98 percent by weight of the ink.

12. An ink according to claim 1 wherein the phase change ink carrier is present in the ink in an amount of at least about 90 percent by weight of the ink and wherein the phase change ink carrier is present in the ink in an amount of no more than about 95 percent by weight of the ink.

13. An ink according to claim 1 wherein the ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

14. An ink according to claim 1 wherein the ink carrier comprises (a) a polyethylene wax in an amount of at least about 25 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

15. An ink according to claim 1 wherein the colorant is present in the ink in an amount of at least about 0.1 percent by weight of the ink.

16. An ink according to claim 1 wherein the colorant is present in the ink in an amount of at least about 1 percent by weight of the ink.

17. An ink according to claim 1 wherein the colorant is present in the ink in an amount of at least about 3 percent by weight of the ink.

18. An ink according to claim 1 wherein the colorant is present in the ink in an amount of no more than about 20 percent by weight of the ink.

19. An ink according to claim 1 wherein the colorant is present in the ink in an amount of no more than about 13 percent by weight of the ink.

20. An ink according to claim 1 wherein the colorant is present in the ink in an amount of no more than about 6 percent by weight of the ink.

21. An ink according to claim 1 wherein the ink has a melting point of no lower than about 50° C. and wherein the ink has a melting point of no higher than about 160° C.

22. An ink according to claim 1 wherein the ink has a melting point of no lower than about 70° C. and wherein the ink has a melting point of no higher than about 140° C.

23. An ink according to claim 1 wherein the ink has a melting point of no lower than about 80° C. and wherein the ink has a melting point of no higher than about 100° C.

24. An ink according to claim 1 wherein the ink has a melt viscosity at a temperature of about 140° C. of no more than about 30 centipoise.

25. An ink according to claim 1 wherein the ink has a melt viscosity at a temperature of about 140° C. of no more than about 20 centipoise.

26. An ink according to claim 1 wherein the ink has a melt viscosity at a temperature of about 140° C. of no more than about 15 centipoise.

27. An ink according to claim 1 wherein the ink has a melt viscosity at a temperature of about 140° C. of no less than about 2 centipoise.

28. An ink according to claim 1 wherein the ink has a melt viscosity at a temperature of about 140° C. of no less than about 5 centipoise.

29. An ink according to claim 1 wherein the ink has a melt viscosity at a temperature of about 140° C. of no less than about 7 centipoise.

30. A process which comprises (1) incorporating into an ink jet printing apparatus a phase change ink composition comprising a phase change ink carrier and a colorant compound of the formula

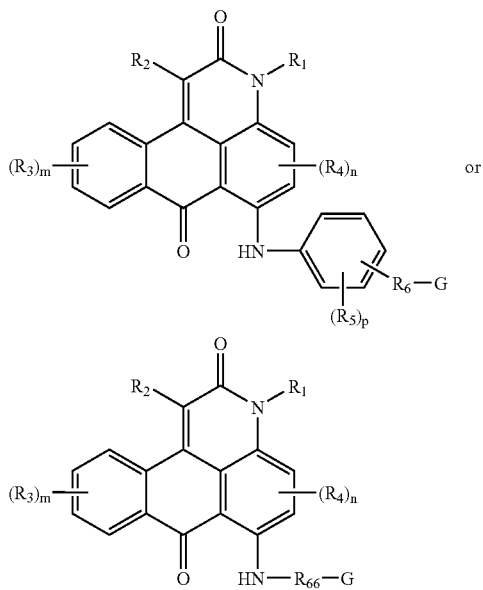

wherein $R_1$ is (i) a hydrogen atom, (ii) an alkyl group, (iii) an aryl group, (iv) an arylalkyl group, or (v) an alkylaryl group, $R_2$ is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, $R_3$ is (i) an alkyl group, (ii) an aryl group, (iii) an arylalkyl group, (iv) an alkylaryl group, or (v) a substituent other than an alkyl, aryl, arylalkyl, or alkylaryl group, m is an integer of 0, 1, 2, 3, or 4, $R_4$ is (i) an alkyl group, (ii) an aryl group, (iii) an arylalkyl group, (iv) an alkylaryl group, or (v) a substituent other than an alkyl, aryl, arylalkyl, or alkylaryl group, n is an integer of 0, 1, 2, 3, or 4, $R_5$ is (i) an alkyl group, (ii) an aryl group, (iii) an arylalkyl group, (iv) an alkylaryl group, or (v) a substituent other than an alkyl, aryl, arylalkyl, or alkylaryl group, p is an integer of 0, 1, 2, 3, or 4, $R_6$ is (i) a direct bond, (ii) an alkylene group, (iii) an arylene group, (iv) an arylalkylene group, or (v) an alkylarylene group, $R_{66}$ is (i) an alkylene group, (ii) an arylene group, (iii) an arylalkylene group, or (iv) an alkylarylene group, G is (1) a hydroxy group, (2) a carboxylic acid group, (3) an alkyl group having at least about 8 carbon atoms, (4) an aryl group, (5) an arylalkyl group having at least about 14 carbon atoms, (6) an alkylaryl group having at least about 14 carbon atoms, (7) a group of the formula

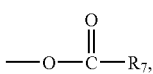

(8) a group of the formula

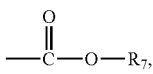

(9) a group of the formula

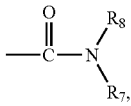

or (10) a group of the formula

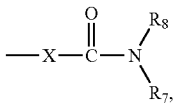

$R_7$ is (i) an alkyl group, (ii) an aryl group, (iii) an arylalkyl group, or (iv) an alkylaryl group, $R_8$ is (i) a hydrogen atom, (ii) an alkyl group, (iii) an aryl group, (iv) an arylalkyl group, or (v) an alkylaryl group, X is —O— or —$NR_9$—, and $R_9$ is (i) a hydrogen atom, (ii) an alkyl group, (iii) an aryl group, (iv) an arylalkyl group, or (v) an alkylaryl group; (2) melting the ink; and (3) causing droplets of the melted ink to be ejected in an imagewise pattern onto a substrate.

31. A process according to claim 30 wherein the printing apparatus employs a piezoelectric printing process wherein droplets of the ink are caused to be ejected in imagewise pattern by oscillations of piezoelectric vibrating elements.

32. A process according to claim 30 wherein the substrate is a final recording sheet and droplets of the melted ink are ejected in an imagewise pattern directly onto the final recording sheet.

33. A process according to claim 30 wherein the substrate is an intermediate transfer member and droplets of the melted ink are ejected in an imagewise pattern onto the intermediate transfer member followed by transfer of the imagewise pattern from the intermediate transfer member to a final recording sheet.

34. A process according to claim 33 wherein the intermediate transfer member is heated to a temperature above that of the final recording sheet and below that of the melted ink in the printing apparatus.

35. An ink according to claim 1 wherein the colorant compound is of the formula

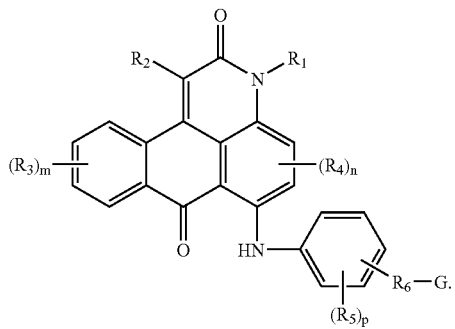

36. An ink according to claim 35 wherein $R_1$ is a methyl group, $R_2$ is a hydrogen atom, m, n, and p are all 0, $R_6$ is —$CH_2$— or —$CH_2CH_2$—, and G is a group of the formula

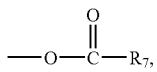

a group of the formula

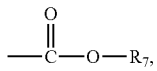

a group of the formula

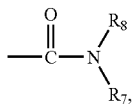

or a group of the formula

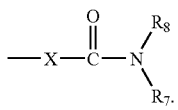

37. An ink according to claim 35 wherein $R_6$ is a direct bond.

38. An ink according to claim 35 wherein $R_6$ is an alkylene group, an arylene group, an arylalkylene group, or an alkylarylene group.

39. An ink according to claim 1 wherein the colorant compound is of the formula

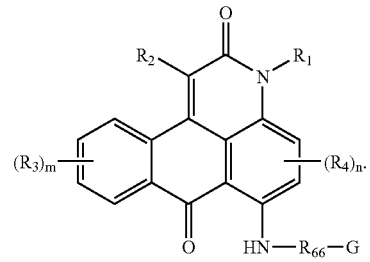

40. An ink according to claim 1 wherein G is a hydroxy group.

41. An ink according to claim 1 wherein G is a carboxylic acid group.

42. An ink according to claim 1 wherein G is an alkyl group having at least about 8 carbon atoms.

43. An ink according to claim 1 wherein G is an alkyl group having at least about 18 carbon atoms.

44. An ink according to claim 1 wherein G is a linear alkyl group.

45. An ink according to claim 1 wherein G is a substituted alkyl group.

46. An ink according to claim 1 wherein G is an unsubstituted alkyl group.

47. An ink according to claim 1 wherein G is an alkyl group wherein hetero atoms selected from oxygen, nitrogen, sulfur, silicon, phosphorus, or mixtures thereof are present in the alkyl group.

48. An ink according to claim 1 wherein G is an alkyl group wherein no hetero atoms are present in the alkyl group.

49. An ink according to claim 1 wherein G is an arylalkyl group having at least about 14 carbon atoms.

50. An ink according to claim 1 wherein G is an arylalkyl group having at least about 24 carbon atoms.

51. An ink according to claim 1 wherein G is an arylalkyl group wherein the alkyl portion thereof has at least about 8 carbon atoms.

52. An ink according to claim 1 wherein G is an arylalkyl group wherein the alkyl portion thereof has at least about 18 carbon atoms.

53. An ink according to claim 1 wherein G is a substituted arylalkyl group.

54. An ink according to claim 1 wherein G is an unsubstituted arylalkyl group.

55. An ink according to claim 1 wherein G is an arylalkyl group wherein hetero atoms selected from oxygen, nitrogen, sulfur, silicon, phosphorus, or mixtures thereof are present in the arylalkyl group.

56. An ink according to claim 1 wherein G is an arylalkyl group wherein no hetero atoms are present in the arylalkyl group.

57. An ink according to claim 1 wherein G is an alkylaryl group having at least about 14 carbon atoms.

58. An ink according to claim 1 wherein G is an alkylaryl group having at least about 24 carbon atoms.

59. An ink according to claim 1 wherein G is an alkylaryl group wherein the alkyl portion thereof has at least about 8 carbon atoms.

60. An ink according to claim 1 wherein G is an alkylaryl group wherein the alkyl portion thereof has at least about 18 carbon atoms.

61. An ink according to claim 1 wherein G is a substituted alkylaryl group.

62. An ink according to claim 1 wherein G is an unsubstituted alkylaryl group.

63. An ink according to claim 1 wherein G is an alkylaryl group wherein hetero atoms selected from oxygen, nitrogen, sulfur, silicon, phosphorus, or mixtures thereof are present in the alkylaryl group.

64. An ink according to claim 1 wherein G is an alkylaryl group wherein no hetero atoms are present in the alkylaryl group.

65. An ink according to claim 1 wherein G is a group of the formula

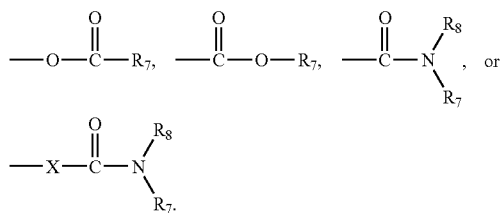

66. An ink according to claim 65 wherein $R_7$ is an alkyl group.

67. An ink according to claim 66 wherein the alkyl group has at least about 8 carbon atoms.

68. An ink according to claim 66 wherein the alkyl group has at least about 18 carbon atoms.

69. An ink according to claim 66 wherein the alkyl group is a linear alkyl group.

70. An ink according to claim 66 wherein the alkyl group is a substituted alkyl group.

71. An ink according to claim 66 wherein the alkyl group is an unsubstituted alkyl group.

72. An ink according to claim 66 wherein the alkyl group is an alkyl group wherein hetero atoms selected from oxygen, nitrogen, sulfur, silicon, phosphorus, or mixtures thereof are present in the alkyl group.

73. An ink according to claim 66 wherein the alkyl group is an alkyl group wherein no hetero atoms are present in the alkyl group.

74. An ink according to claim 65 wherein $R_7$ is an arylalkyl group.

75. An ink according to claim 74 wherein the arylalkyl group has at least about 14 carbon atoms.

76. An ink according to claim 74 wherein the arylalkyl group has at least about 24 carbon atoms.

77. An ink according to claim 74 wherein the alkyl portion of the arylalkyl group has at least about 8 carbon atoms.

78. An ink according to claim 74 wherein the alkyl portion of the arylalkyl group has at least about 18 carbon atoms.

79. An ink according to claim 74 wherein the arylalkyl group is a substituted arylalkyl group.

80. An ink according to claim 74 wherein the arylalkyl group is an unsubstituted arylalkyl group.

81. An ink according to claim 74 wherein the arylalkyl group is an arylalkyl group wherein hetero atoms selected from oxygen, nitrogen, sulfur, silicon, phosphorus, or mixtures thereof are present in the arylalkyl group.

82. An ink according to claim 74 wherein the arylalkyl group is an arylalkyl group wherein no hetero atoms are present in the arylalkyl group.

83. An ink according to claim 65 wherein $R_7$ is an alkylaryl group.

84. An ink according to claim 83 wherein the alkylaryl group has at least about 14 carbon atoms.

85. An ink according to claim 83 wherein the alkylaryl group has at least about 24 carbon atoms.

86. An ink according to claim 83 wherein the alkyl portion of the alkylaryl group has at least about 8 carbon atoms.

87. An ink according to claim 83 wherein the alkyl portion of the alkylaryl group has at least about 18 carbon atoms.

88. An ink according to claim 83 wherein the alkylaryl group is a substituted alkylaryl group.

89. An ink according to claim 83 wherein the alkylaryl group is an unsubstituted alkylaryl group.

90. An ink according to claim 83 wherein the alkylaryl group is an alkylaryl group wherein hetero atoms selected from oxygen, nitrogen, sulfur, silicon, phosphorus, or mixtures thereof are present in the alkylaryl group.

91. An ink according to claim 83 wherein the alkylaryl group is an alkylaryl group wherein no hetero atoms are present in the alkylaryl group.

92. An ink according to claim 65 wherein $R_7$ is an aryl group.

93. An ink according to claim 1 wherein G is a group of the formula

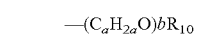

or

wherein a is an integer representing the number of carbon atoms, b is an integer representing the number of repeat units, and $R_{10}$ is a hydrogen atom, an alkyl group, an aryl group, an arylalkyl group, or an alkylaryl group.

94. An ink according to claim 1 wherein G is a group of the formula

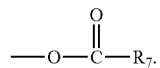

95. An ink according to claim 1 wherein G is a group of the formula

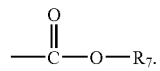

96. An ink according to claim 1 wherein G is a group of the formula

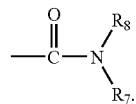

97. An ink according to claim 1 wherein G is a group of the formula

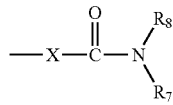

wherein X is —O—.

98. An ink according to claim 1 wherein G is a group of the formula

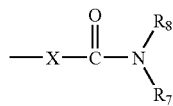

wherein X is —NR$_9$—.

99. An ink according to claim 1 wherein the total number of carbon atoms in R$_1$+R$_2$+R$_3$+R$_4$+R$_5$+(R$_6$ or R$_{66}$)+R$_7$+R$_8$+R$_9$ is no more than about 200.

100. An ink according to claim 1 wherein the total number of carbon atoms in R$_1$+R$_2$+R$_3$+R$_4$+R$_5$+(R$_6$ or R$_{66}$)+R$_7$+R$_8$+R$_9$ is no more than about 100.

101. An ink according to claim 1 wherein the total number of carbon atoms in R$_1$+R$_2$+R$_3$+R$_4$+R$_5$+(R$_6$ or R$_{66}$)+R$_7$+R$_8$+R$_9$ is at least about 12.

102. An ink according to claim 1 wherein the total number of carbon atoms in R$_1$+R$_2$+R$_3$+R$_4$+R$_5$+(R$_6$ or R$_{66}$)+R$_7$+R$_8$+R$_9$ is at least about 24.

103. An ink according to claim 1 wherein the total number of carbon atoms in R$_1$+R$_2$+R$_3$+R$_4$+R$_5$+(R$_6$ or R$_{66}$)+R$_7$+R$_8$+R$_9$ is at least about 36.

104. An ink according to claim 1 wherein the total number of carbon atoms in R$_1$+R$_2$+R$_3$+R$_4$+R$_5$+(R$_6$ or R$_{66}$)+R$_7$+R$_8$+R$_9$ is at least about 48.

105. An ink according to claim 1 wherein the colorant is of the formula

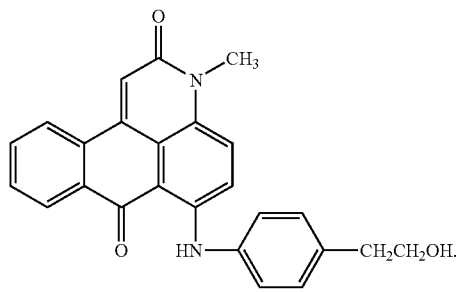

106. An ink according to claim 1 wherein the colorant is of the formula

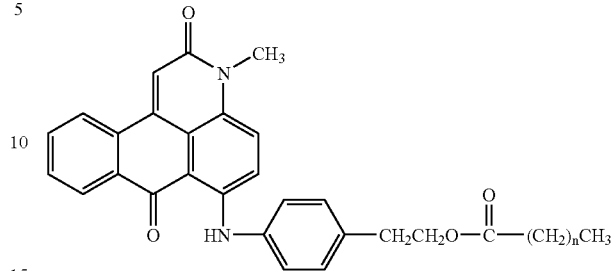

wherein n represents an average number and has an average value of about 47.

107. An ink according to claim 1 wherein the colorant is of the formula

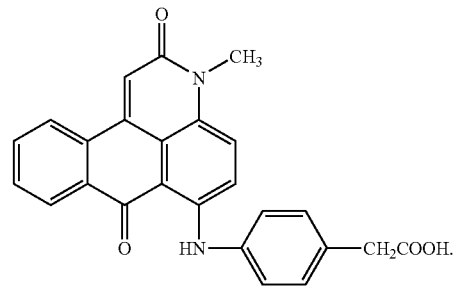

108. An ink according to claim 1 wherein the colorant is of the formula

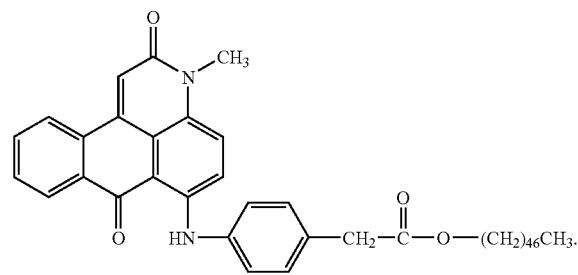

109. An ink according to claim 1 wherein the colorant is of the formula

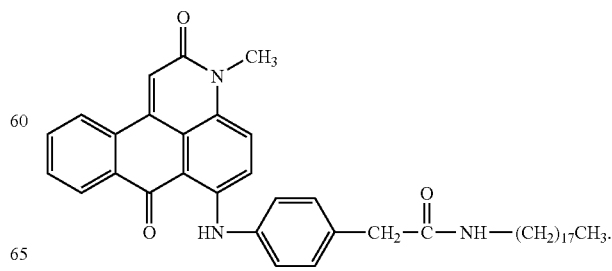

110. An ink according to claim 1 wherein the colorant is of the formula

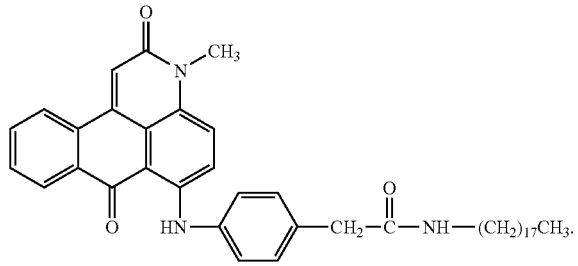

111. An ink according to claim 1 wherein the colorant is of the formula

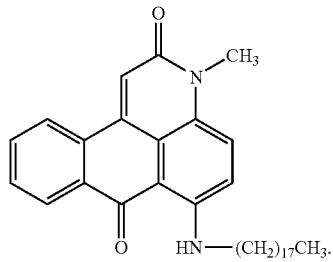

112. An ink according to claim 1 wherein the colorant is of the formula

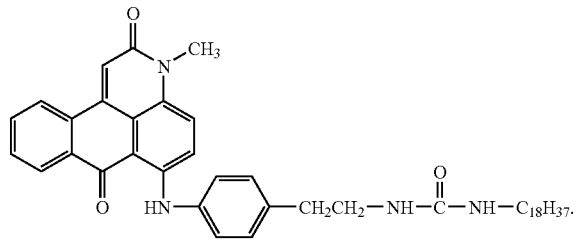

113. An ink according to claim 1 wherein the colorant is of the formula

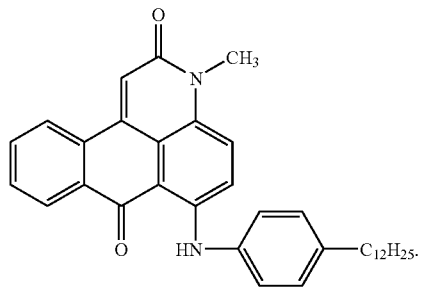

114. A phase change ink composition comprising a phase change ink carrier and a colorant compound which is a dimeric material comprising two moieties of the formula

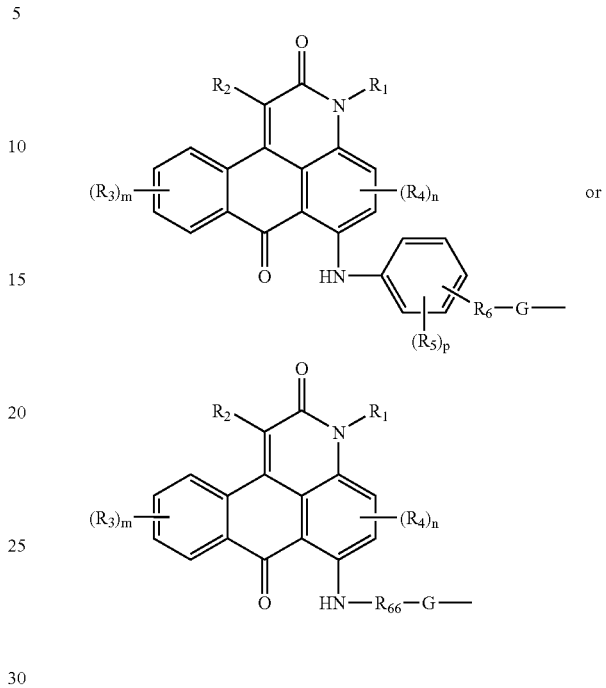

wherein each $R_1$, independently of the other, is (i) a hydrogen atom, (ii) an alkyl group, (iii) an aryl group, (iv) an arylalkyl group, or (v) an alkylaryl group, each $R_2$, independently of the other, is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, each $R_3$, independently of the other, is (i) an alkyl group, (ii) an aryl group, (iii) an arylalkyl group, (iv) an alkylaryl group, or (v) a substituent other than an alkyl, aryl, arylalkyl, or alkylaryl group, each m, independently of the other, is an integer of 0, 1, 2, 3, or 4, each $R_4$, independently of the other, is (i) an alkyl group, (ii) an aryl group, (iii) an arylalkyl group, (iv) an alkylaryl group, or (v) a substituent other than an alkyl, aryl, arylalkyl, or alkylaryl group, each n, independently of the other, is an integer of 0, 1, 2, 3, or 4, each $R_5$, independently of the other, is (i) an alkyl group, (ii) an aryl group, (iii) an arylalkyl group, (iv) an alkylaryl group, or (v) a substituent other than an alkyl, aryl, arylalkyl, or alkylaryl group, each p, independently of the other, is an integer of 0, 1, 2, 3, or 4, each $R_6$, independently of the other, is (i) a direct bond, (ii) an alkylene group, (iii) an arylene group, (iv) an arylalkylene group, or (v) an alkylarylene group, each $R_{66}$, independently of the other, is (i) an alkylene group, (ii) an arylene group, (iii) an arylalkylene group, or (iv) an alkylarylene group, each G, independently of the other, is (1) an alkylene group, (2) an arylene group, (3) an arylalkylene group, (4) an alkylarylene group, (5) a group of the formula $$-O-\overset{O}{\underset{\|}{C}}-R_7-,$$

(6) a group of the formula

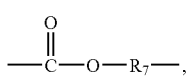

(7) a group of the formula

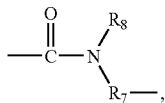

or (8) a group of the formula

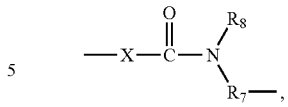

each $R_7$, independently of the other, is (i) an alkylene group, (ii) an arylene group, (iii) an arylalkylene group, or (iv) an alkylarylene group, each $R_8$, independently of the other, is (i) a hydrogen atom, (ii) an alkyl group, (iii) an aryl group, (iv) an arylalkyl group, or (v) an alkylaryl group, each X, independently of the other, is —O— or —$NR_9$—, and each $R_9$, independently of the other, is (i) a hydrogen atom, (ii) an alkyl group.

115. An ink according to claim 114 wherein the colorant is of the formula

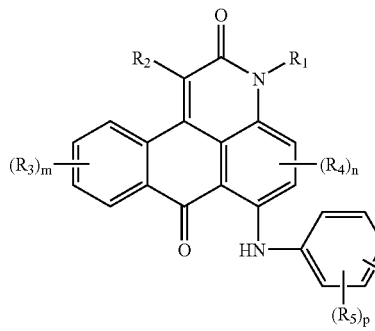
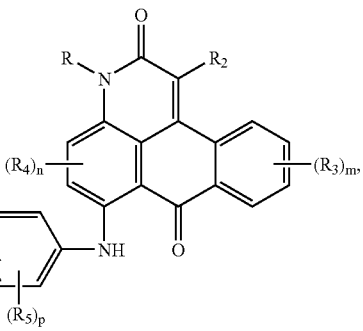
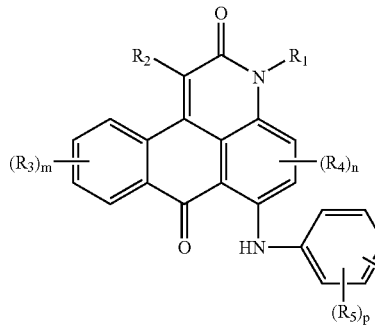
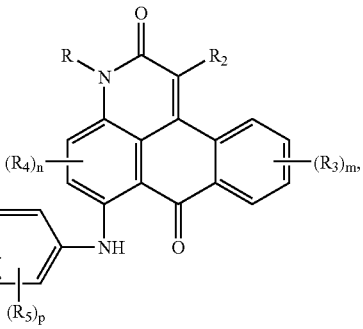
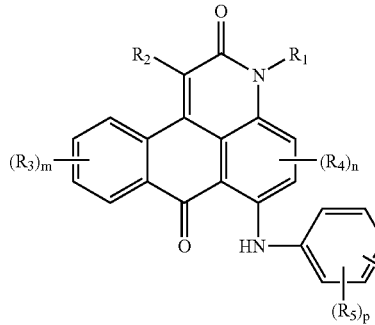
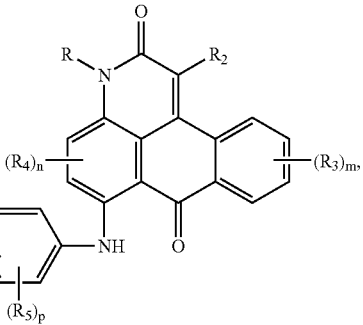

119    120
-continued
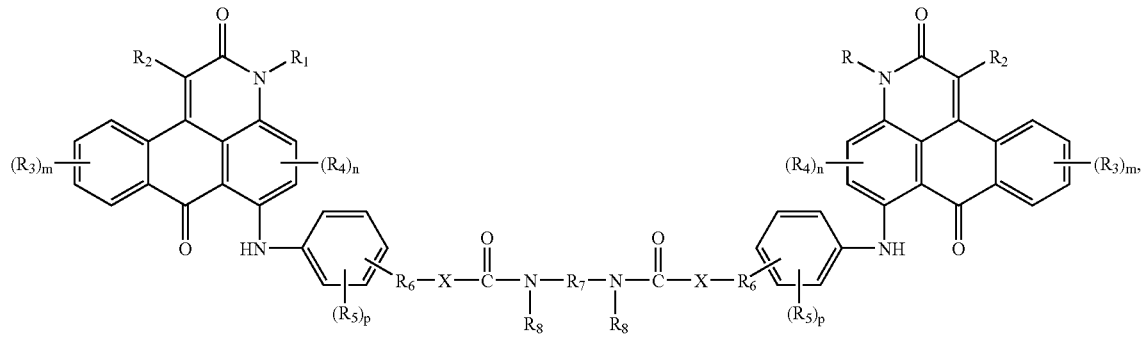
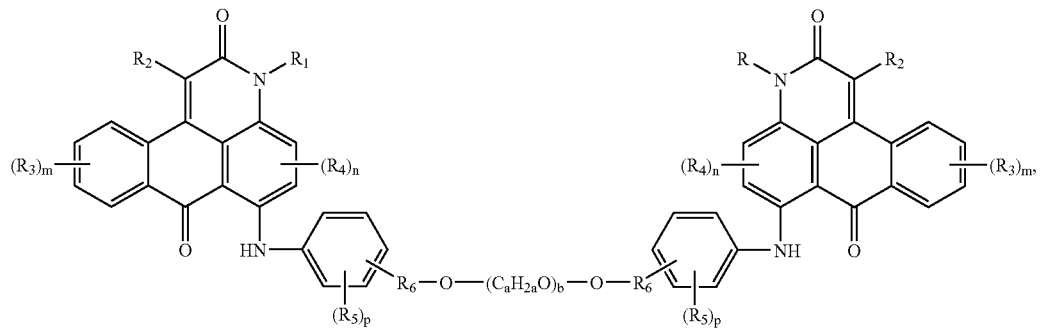
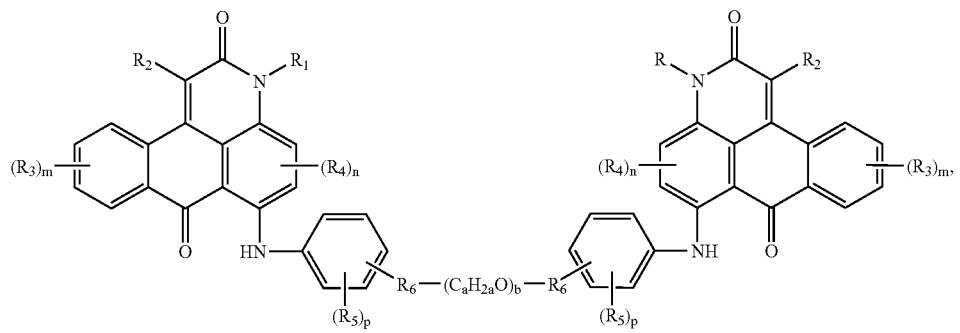
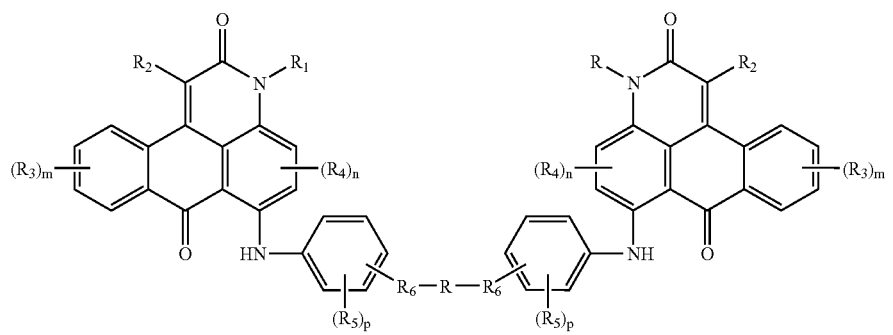

wherein R represents an alkyl, aryl, arylalkyl, or alkylaryl group having no substituents thereon and no hetero atoms therein,
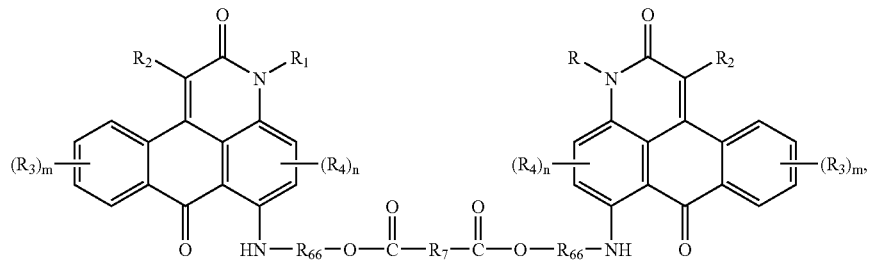
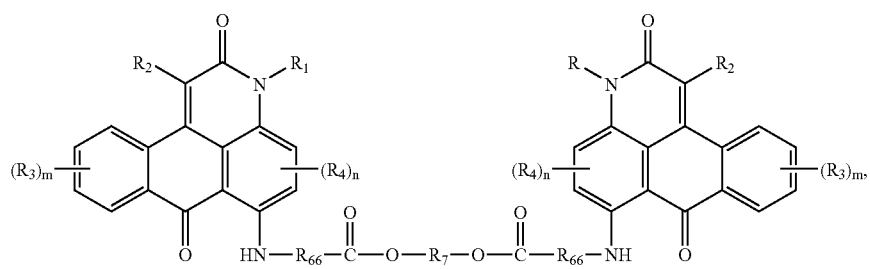
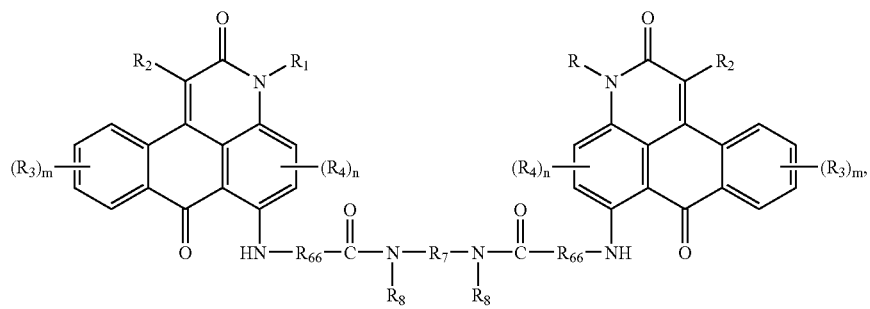
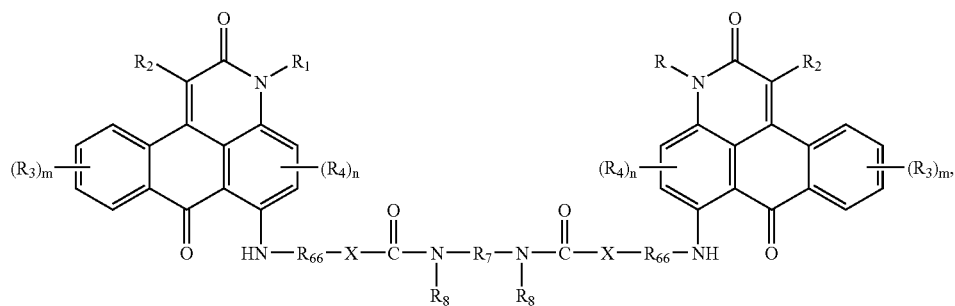

-continued

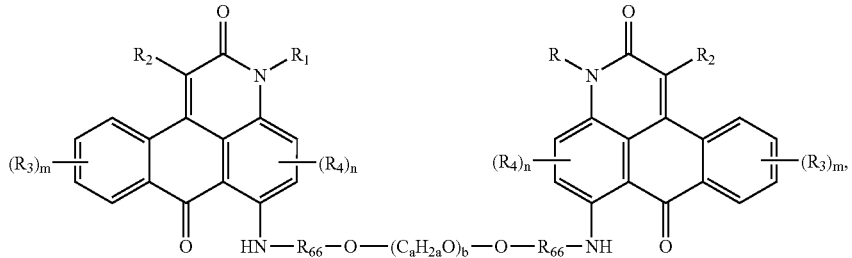

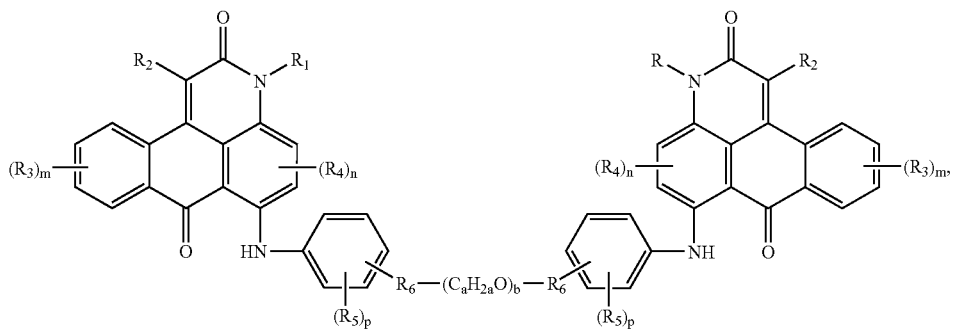

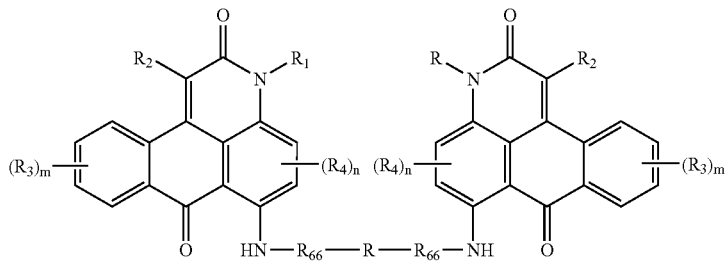

wherein R represents an alkyl, aryl, arylalkyl, or alkylaryl group as defined hereinabove having no substituents thereon and no hetero atoms therein, or mixtures thereof.

116. An ink according to claim 114 wherein the colorant is of the formula wherein $C_{36}H_{64+n}$ is a branched alkylene group which may include unsaturations and cyclic groups, wherein n is an integer of 0, 1, 2, 3, 4, 5, 6, 7, 8, 9, or 10.

117. An ink according to claim 114 wherein the colorant is of the formula

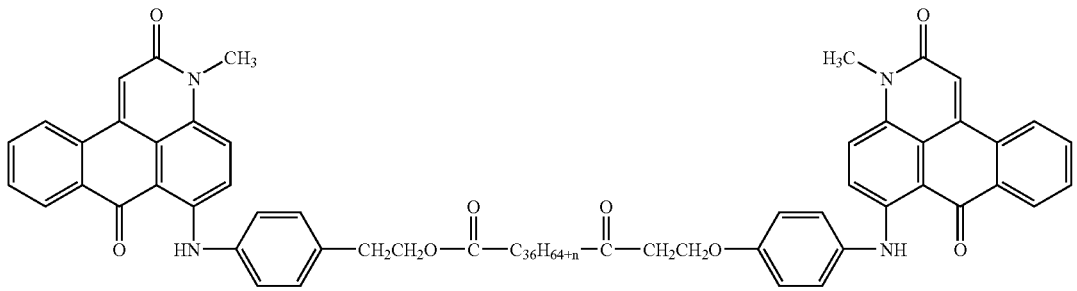

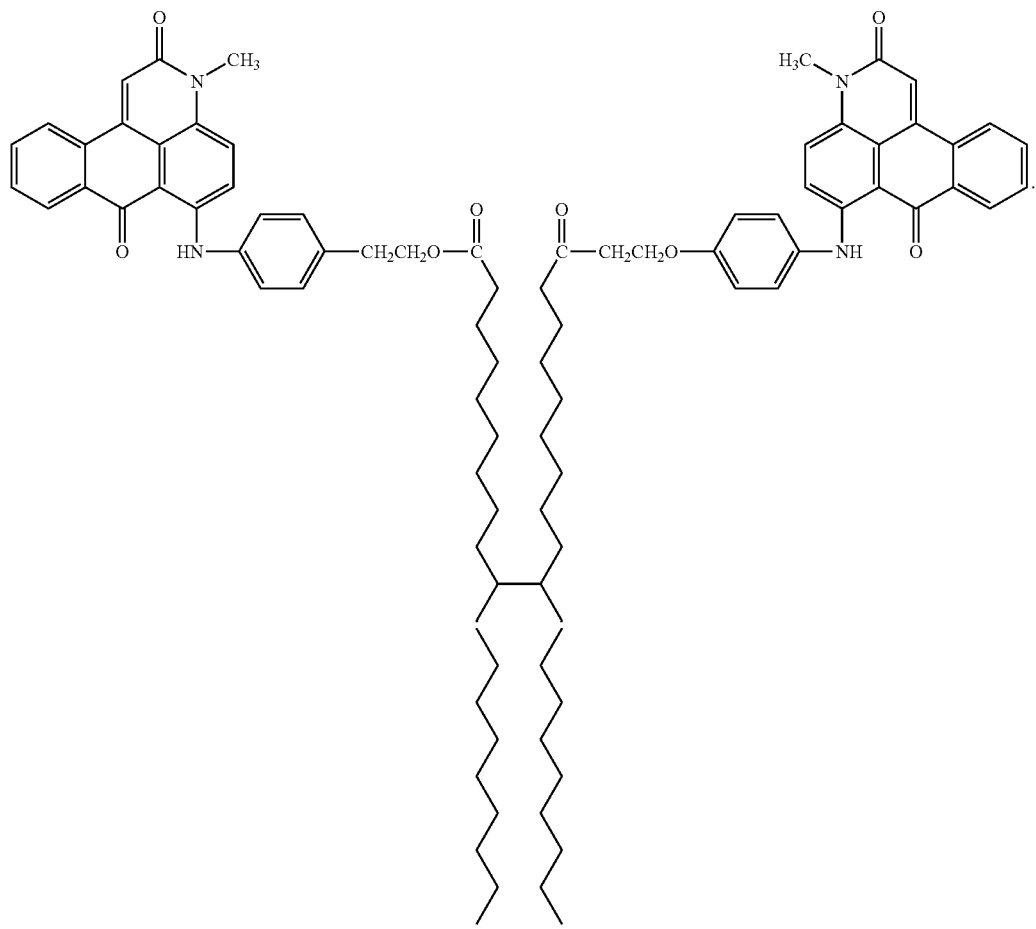
118. An ink according to claim 114 wherein the colorant is of the formula
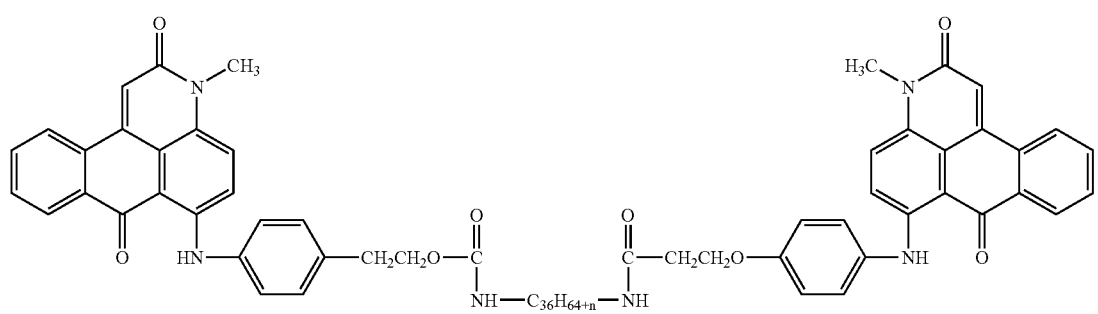

wherein $C_{36}H_{64+n}$ is a branched alkylene group which may include unsaturations and cyclic groups, wherein n is an integer of 0, 1, 2, 3, 4, 5, 6, 7, 8, 9, or 10.

119. An ink according to claim 114 wherein the colorant is of the formula

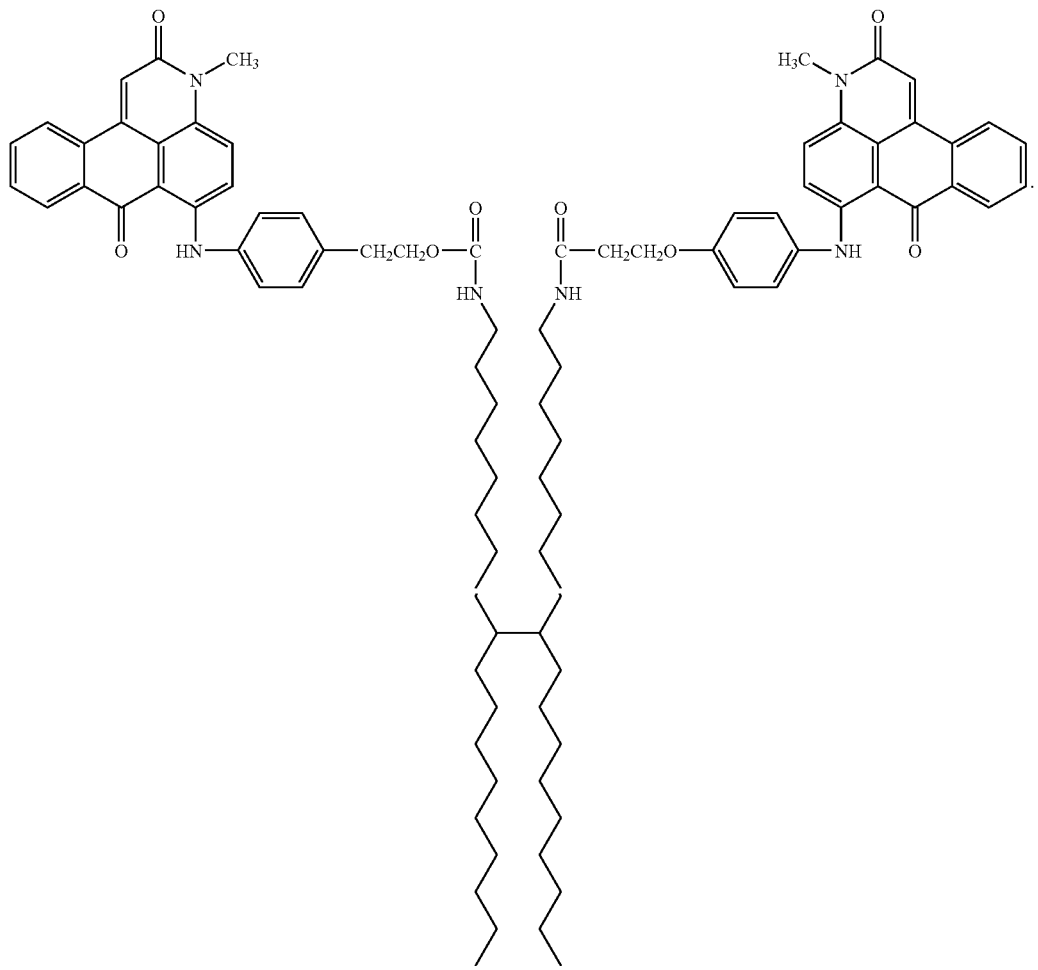

120. A phase change ink composition comprising a phase change ink carrier and a colorant compound comprising three or more moieties of the formula

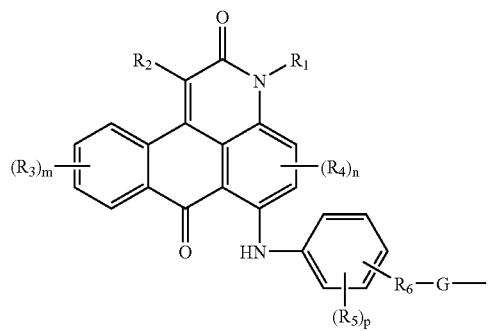

or

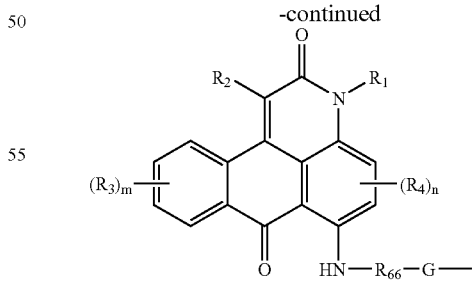

-continued wherein each $R_1$, independently of the other, is (i) a hydrogen atom, (ii) an alkyl group, (iii) an aryl group, (iv) an arylalkyl group, or (v) an alkylaryl group, each $R_2$, independently of the other, is (i) a hydrogen atom, (ii) an alkyl group, (iii) an aryl group, (iv) an arylalkyl group, (v) an alkylaryl group, or (vi) a substituent other than an alkyl, aryl, arylalkyl, or alkylaryl group, each $R_3$, independently of the other, is (i) an alkyl group, (ii) an aryl group, (iii) an arylalkyl group, (iv) an alkylaryl group, or (v) a substituent other than an alkyl, aryl, arylalkyl, or alkylaryl group, each m, independently of the other, is an integer of 0, 1, 2, 3, or 4, each $R_4$, independently of the other, is (i) an alkyl group, (ii) an aryl group, (iii) an arylalkyl group, (iv) an alkylaryl group, or (v) a substituent other than an alkyl, aryl, arylalkyl, or alkylaryl group, each n, independently of the other, is an integer of 0, 1, 2, 3, or 4, each $R_5$, independently of the other, is (i) an alkyl group, (ii) an aryl group, (iii) an arylalkyl group, (iv) an alkylaryl group, or (v) a substituent other than an alkyl, aryl, arylalkyl, or alkylaryl group, each p, independently of the other, is an integer of 0, 1, 2, 3, or 4, each $R_6$, independently of the other, is (i) a direct bond, (ii) an alkylene group, (iii) an arylene group, (iv) an arylalkylene group, or (v) an alkylarylene group, each $R_{66}$, independently of the other, is (i) an alkylene group, (ii) an arylene group, (iii) an arylalkylene group, or (iv) an alkylarylene group, each G, independently of the other, is (1) an alkylene group, (2) an arylene group, (3) an arylalkylene group, (4) an alkylarylene group, (5) a group of the formula

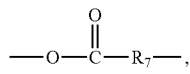

(6) a group of the formula

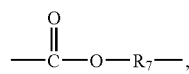

(7) a group of the formula

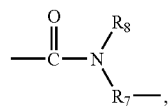

or (8) a group of the formula

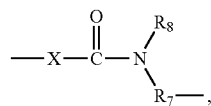

each $R_7$, independently of the other, is (i) an alkylene group, (ii) an arylene group, (iii) an arylalkylene group, or (iv) an alkylarylene group, each $R_8$, independently of the other, is (i) a hydrogen atom, (ii) an alkyl group, (iii) an aryl group, (iv) an arylalkyl group, or (v) an alkylaryl group, each X, independently of the other, is —O— or —$NR_9$—, and each $R_9$, independently of the other, is (i) a hydrogen atom, (ii) an alkyl group.

* * * * *